US009641736B2

(12) United States Patent
Lapstun et al.

(10) Patent No.: US 9,641,736 B2
(45) Date of Patent: *May 2, 2017

(54) WIDE-AREA AERIAL CAMERA SYSTEMS

(71) Applicant: nearmap Australia Pty Ltd., Sydney (AU)

(72) Inventors: Paul Lapstun, Rodd Point (AU); Todd William Lupton, Marsfield (AU); Mark Harold Tarlinton, Marrickville (AU); David Arnold Bleads, Tennyson (AU); Zoltan Toth, Arncliffe (AU); Andrew Millin, Scarborough (AU)

(73) Assignee: nearmap Australia Pty Ltd., Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/009,181

(22) Filed: Jan. 28, 2016

(65) Prior Publication Data

US 2016/0150142 A1 May 26, 2016

Related U.S. Application Data

(63) Continuation-in-part of application No. 14/928,542, filed on Oct. 30, 2015, which is a continuation of
(Continued)

(51) Int. Cl.
*H04N 5/232* (2006.01)
*G03B 15/00* (2006.01)
(Continued)

(52) U.S. Cl.
CPC ......... *H04N 5/2259* (2013.01); *B64D 47/08* (2013.01); *G01C 11/02* (2013.01); *G02B 26/08* (2013.01);
(Continued)

(58) Field of Classification Search
CPC ...... G03B 15/006; G03B 37/00; G03B 37/04; B64D 47/08; G01C 11/02; H04N 5/23238; H04N 5/2328; H04N 7/18
See application file for complete search history.

(56) References Cited

U.S. PATENT DOCUMENTS 1,735,109 A 11/1929 Eliel
1,797,849 A 3/1931 Aschenbrenner
(Continued)

FOREIGN PATENT DOCUMENTS

WO WO 2012/020413 A1 2/2012
WO WO 2012/107751 A1 8/2012

OTHER PUBLICATIONS

Wolf, et al., Elements of Photogrammetry with Application in GIS, McGraw-Hill, 2000, pp. 383-390.
(Continued)

*Primary Examiner* — WB Perkey
(74) *Attorney, Agent, or Firm* — Oblon, McClelland, Maier & Neustadt, L.L.P.

(57) ABSTRACT

A system for capturing aerial images, the system comprising four steerable detail camera modules, each steerable detail camera module comprising a detail camera and a beam-steering mechanism in an optical path of the detail camera module whereby the pointing direction of the detail camera is time-multiplexed to provide a wider effective field of view, the beam-steering mechanism comprising a first steerable mirror.

19 Claims, 81 Drawing Sheets

Related U.S. Application Data application No. 14/735,504, filed on Jun. 10, 2015, now Pat. No. 9,185,290, which is a continuation-in-part of application No. 14/687,544, filed on Apr. 15, 2015, which is a continuation-in-part of application No. 14/478,380, filed on Sep. 5, 2014, now Pat. No. 9,052,571, which is a continuation-in-part of application No. 14/310,523, filed on Jun. 20, 2014, now Pat. No. 9,046,759.

(51) Int. Cl.

| | |
|---|---|
| G03B 37/04 | (2006.01) |
| B64D 47/08 | (2006.01) |
| H04N 5/225 | (2006.01) |
| G01C 11/02 | (2006.01) |
| G02B 26/08 | (2006.01) |
| H04N 5/341 | (2011.01) |
| G03B 17/56 | (2006.01) |
| G03B 35/02 | (2006.01) |
| G03B 37/02 | (2006.01) |
| H04N 5/372 | (2011.01) |

(52) U.S. Cl.
CPC ......... *G02B 26/0816* (2013.01); *G03B 15/00* (2013.01); *G03B 15/006* (2013.01); *G03B 17/561* (2013.01); *G03B 35/02* (2013.01); *G03B 37/02* (2013.01); *G03B 37/04* (2013.01); *H04N 5/2328* (2013.01); *H04N 5/23238* (2013.01); *H04N 5/23258* (2013.01); *H04N 5/23287* (2013.01); *H04N 5/3415* (2013.01); *H04N 5/2257* (2013.01); *H04N 5/37206* (2013.01)

(56) References Cited

U.S. PATENT DOCUMENTS

| | | | |
|---|---|---|---|
| 2,665,481 A | | 1/1954 | Henry |
| 3,212,420 A | | 10/1965 | De La Cierva |
| 3,580,150 A | * | 5/1971 | Watson ................. G03B 37/02 352/106 |
| 3,610,825 A | | 10/1971 | Fritzel |
| 4,044,364 A | * | 8/1977 | Prinzo ................... F16M 11/04 348/373 |
| 5,550,669 A | | 8/1996 | Patel |
| 5,668,593 A | * | 9/1997 | Lareau ................ G01C 11/025 348/146 |
| 5,894,323 A | | 4/1999 | Kain et al. |
| 6,834,163 B2 | | 12/2004 | Trunz et al. |
| 7,597,489 B2 | | 10/2009 | Horak et al. |
| 7,899,311 B1 | | 3/2011 | Kearney et al. |
| 8,031,177 B2 | | 10/2011 | Lapstun et al. |
| 8,331,615 B2 | | 12/2012 | Furukawa et al. |
| 8,497,905 B2 | | 7/2013 | Nixon |
| 8,675,068 B2 | | 3/2014 | Nixon |
| 9,046,759 B1 | | 6/2015 | Tarlinton et al. |
| 9,052,571 B1 | | 6/2015 | Lapstun et al. |
| 9,063,391 B2 | * | 6/2015 | Yavin .................. G01C 11/025 |
| 9,185,290 B1 | | 11/2015 | Lapstun |
| 9,188,838 B1 | | 11/2015 | Tarlinton et al. |
| 2007/0188610 A1 | | 8/2007 | Micotto et al. |
| 2010/0013927 A1 | | 1/2010 | Nixon |
| 2010/0026822 A1 | | 2/2010 | Hahm |
| 2010/0295855 A1 | | 11/2010 | Sasakawa et al. |
| 2012/0082441 A1 | * | 4/2012 | Krueger ................ G01C 11/02 396/7 |
| 2012/0200703 A1 | | 8/2012 | Nadir et al. |
| 2012/0320203 A1 | | 12/2012 | Liu |
| 2013/0235199 A1 | | 9/2013 | Nixon |
| 2013/0321626 A1 | * | 12/2013 | Finn .................... G01C 11/025 348/145 |
| 2014/0198211 A1 | | 7/2014 | Giuffrida et al. |
| 2015/0353205 A1 | | 12/2015 | Nixon |
| 2015/0373267 A1 | | 12/2015 | Lapstun et al. |
| 2016/0229555 A1 | | 8/2016 | Millin et al. |

OTHER PUBLICATIONS

The Manual of Photogrammetry, Chapter 10, Analytical Photogrammetric Operations, Sixth Edition, American Society for Photogrammetry and Remote Sensing (ASPRS), pp. 860-885.

Triggs, et al., Bundle Adjustment—A Modern Synthesis, Lecture Notes in Computer Science, vol. 1882, Jan. 2000, 75 pages.

* cited by examiner

|  | focal length | | | | | | | |
|---|---|---|---|---|---|---|---|---|
| altitude | 100mm | 200mm | 300mm | 400mm | 500mm | 600mm | 30° swath | 45° swath |
| 2,000' | 3.0cm | 1.5cm | 1.0cm | 0.7cm | 0.6cm | 0.5cm | 0.3km | 0.5km |
| 4,000' | 6.0cm | 3.0cm | 2.0cm | 1.5cm | 1.2cm | 1.0cm | 0.7km | 1.0km |
| 6,000' | 8.9cm | 4.5cm | 3.0cm | 2.2cm | 1.8cm | 1.5cm | 1.0km | 1.5km |
| 8,000' | 11.9cm | 6.0cm | 4.0cm | 3.0cm | 2.4cm | 2.0cm | 1.3km | 2.0km |
| 10,000' | 14.9cm | 7.4cm | 5.0cm | 3.7cm | 3.0cm | 2.5cm | 1.6km | 2.5km |
| 12,000' | 17.9cm | 8.9cm | 6.0cm | 4.5cm | 3.6cm | 3.0cm | 2.0km | 3.0km |
| 14,000' | 20.8cm | 10.4cm | 6.9cm | 5.2cm | 4.2cm | 3.5cm | 2.3km | 3.5km |
| 16,000' | 23.8cm | 11.9cm | 7.9cm | 6.0cm | 4.8cm | 4.0cm | 2.6km | 4.0km |
| 18,000' | 26.8cm | 13.4cm | 8.9cm | 6.7cm | 5.4cm | 4.5cm | 2.9km | 4.5km |
| 20,000' | 29.8cm | 14.9cm | 9.9cm | 7.4cm | 6.0cm | 5.0cm | 3.3km | 5.1km |
| 22,000' | 32.7cm | 16.4cm | 10.9cm | 8.2cm | 6.5cm | 5.5cm | 3.6km | 5.6km |
| 24,000' | 35.7cm | 17.9cm | 11.9cm | 8.9cm | 7.1cm | 6.0cm | 3.9km | 6.1km |
| 26,000' | 38.7cm | 19.3cm | 12.9cm | 9.7cm | 7.7cm | 6.4cm | 4.2km | 6.6km |
| 28,000' | 41.7cm | 20.8cm | 13.9cm | 10.4cm | 8.3cm | 6.9cm | 4.6km | 7.1km |
| 30,000' | 44.6cm | 22.3cm | 14.9cm | 11.2cm | 8.9cm | 7.4cm | 4.9km | 7.6km |
| 32,000' | 47.6cm | 23.8cm | 15.9cm | 11.9cm | 9.5cm | 7.9cm | 5.2km | 8.1km |
| 34,000' | 50.6cm | 25.3cm | 16.9cm | 12.6cm | 10.1cm | 8.4cm | 5.6km | 8.6km |
| 36,000' | 53.6cm | 26.8cm | 17.9cm | 13.4cm | 10.7cm | 8.9cm | 5.9km | 9.1km |
| 38,000' | 56.5cm | 28.3cm | 18.8cm | 14.1cm | 11.3cm | 9.4cm | 6.2km | 9.6km |
| 40,000' | 59.5cm | 29.8cm | 19.8cm | 14.9cm | 11.9cm | 9.9cm | 6.5km | 10.1km |
| 42,000' | 62.5cm | 31.2cm | 20.8cm | 15.6cm | 12.5cm | 10.4cm | 6.9km | 10.6km |
| 44,000' | 65.5cm | 32.7cm | 21.8cm | 16.4cm | 13.1cm | 10.9cm | 7.2km | 11.1km |
| 46,000' | 68.4cm | 34.2cm | 22.8cm | 17.1cm | 13.7cm | 11.4cm | 7.5km | 11.6km |
| 48,000' | 71.4cm | 35.7cm | 23.8cm | 17.9cm | 14.3cm | 11.9cm | 7.8km | 12.1km |
| 50,000' | 74.4cm | 37.2cm | 24.8cm | 18.6cm | 14.9cm | 12.4cm | 8.2km | 12.6km |
| 52,000' | 77.4cm | 38.7cm | 25.8cm | 19.3cm | 15.5cm | 12.9cm | 8.5km | 13.1km |
| 54,000' | 80.3cm | 40.2cm | 26.8cm | 20.1cm | 16.1cm | 13.4cm | 8.8km | 13.6km |
| 56,000' | 83.3cm | 41.7cm | 27.8cm | 20.8cm | 16.7cm | 13.9cm | 9.1km | 14.1km |
| 58,000' | 86.3cm | 43.1cm | 28.8cm | 21.6cm | 17.3cm | 14.4cm | 9.5km | 14.6km |
| 60,000' | 89.3cm | 44.6cm | 29.8cm | 22.3cm | 17.9cm | 14.9cm | 9.8km | 15.2km |
|  | 13.7° | 6.9° | 4.6° | 3.4° | 2.7° | 2.3° | longitudinal FOV | |
|  | 20.4° | 10.3° | 6.9° | 5.1° | 4.1° | 3.4° | lateral FOV | |
|  | 0.9° | 0.9° | 0.9° | 0.6° | 0.5° | 0.4° | lateral overlap | |
|  | 19.5° | 9.4° | 6.0° | 4.5° | 3.6° | 3.0° | lateral spacing | |
|  | 2 | 4 | 5 | 7 | 9 | 10 | 30° camera count | |
|  | 39.8° | 38.3° | 30.8° | 32.1° | 32.9° | 30.4° | actual FOV | |
|  | 3 | 5 | 8 | 10 | 13 | 15 | 45° camera count | |
|  | 59.3° | 47.7° | 48.8° | 45.6° | 47.3° | 45.4° | actual FOV | |

Fig. 22

|  | focal length | | | | | | | |
| --- | --- | --- | --- | --- | --- | --- | --- | --- |
| altitude | 700mm | 800mm | 900mm | 1000mm | 1100mm | 1200mm | 30° swath | 45° swath |
| 2,000' | 0.4cm | 0.4cm | 0.3cm | 0.3cm | 0.3cm | 0.2cm | 0.3km | 0.5km |
| 4,000' | 0.9cm | 0.7cm | 0.7cm | 0.6cm | 0.5cm | 0.5cm | 0.7km | 1.0km |
| 6,000' | 1.3cm | 1.1cm | 1.0cm | 0.9cm | 0.8cm | 0.7cm | 1.0km | 1.5km |
| 8,000' | 1.7cm | 1.5cm | 1.3cm | 1.2cm | 1.1cm | 1.0cm | 1.3km | 2.0km |
| 10,000' | 2.1cm | 1.9cm | 1.7cm | 1.5cm | 1.4cm | 1.2cm | 1.6km | 2.5km |
| 12,000' | 2.6cm | 2.2cm | 2.0cm | 1.8cm | 1.6cm | 1.5cm | 2.0km | 3.0km |
| 14,000' | 3.0cm | 2.6cm | 2.3cm | 2.1cm | 1.9cm | 1.7cm | 2.3km | 3.5km |
| 16,000' | 3.4cm | 3.0cm | 2.6cm | 2.4cm | 2.2cm | 2.0cm | 2.6km | 4.0km |
| 18,000' | 3.8cm | 3.3cm | 3.0cm | 2.7cm | 2.4cm | 2.2cm | 2.9km | 4.5km |
| 20,000' | 4.3cm | 3.7cm | 3.3cm | 3.0cm | 2.7cm | 2.5cm | 3.3km | 5.1km |
| 22,000' | 4.7cm | 4.1cm | 3.6cm | 3.3cm | 3.0cm | 2.7cm | 3.6km | 5.6km |
| 24,000' | 5.1cm | 4.5cm | 4.0cm | 3.6cm | 3.2cm | 3.0cm | 3.9km | 6.1km |
| 26,000' | 5.5cm | 4.8cm | 4.3cm | 3.9cm | 3.5cm | 3.2cm | 4.2km | 6.6km |
| 28,000' | 6.0cm | 5.2cm | 4.6cm | 4.2cm | 3.8cm | 3.5cm | 4.6km | 7.1km |
| 30,000' | 6.4cm | 5.6cm | 5.0cm | 4.5cm | 4.1cm | 3.7cm | 4.9km | 7.6km |
| 32,000' | 6.8cm | 6.0cm | 5.3cm | 4.8cm | 4.3cm | 4.0cm | 5.2km | 8.1km |
| 34,000' | 7.2cm | 6.3cm | 5.6cm | 5.1cm | 4.6cm | 4.2cm | 5.6km | 8.6km |
| 36,000' | 7.7cm | 6.7cm | 6.0cm | 5.4cm | 4.9cm | 4.5cm | 5.9km | 9.1km |
| 38,000' | 8.1cm | 7.1cm | 6.3cm | 5.7cm | 5.1cm | 4.7cm | 6.2km | 9.6km |
| 40,000' | 8.5cm | 7.4cm | 6.6cm | 6.0cm | 5.4cm | 5.0cm | 6.5km | 10.1km |
| 42,000' | 8.9cm | 7.8cm | 6.9cm | 6.2cm | 5.7cm | 5.2cm | 6.9km | 10.6km |
| 44,000' | 9.4cm | 8.2cm | 7.3cm | 6.5cm | 6.0cm | 5.5cm | 7.2km | 11.1km |
| 46,000' | 9.8cm | 8.6cm | 7.6cm | 6.8cm | 6.2cm | 5.7cm | 7.5km | 11.6km |
| 48,000' | 10.2cm | 8.9cm | 7.9cm | 7.1cm | 6.5cm | 6.0cm | 7.8km | 12.1km |
| 50,000' | 10.6cm | 9.3cm | 8.3cm | 7.4cm | 6.8cm | 6.2cm | 8.2km | 12.6km |
| 52,000' | 11.1cm | 9.7cm | 8.6cm | 7.7cm | 7.0cm | 6.4cm | 8.5km | 13.1km |
| 54,000' | 11.5cm | 10.0cm | 8.9cm | 8.0cm | 7.3cm | 6.7cm | 8.8km | 13.6km |
| 56,000' | 11.9cm | 10.4cm | 9.3cm | 8.3cm | 7.6cm | 6.9cm | 9.1km | 14.1km |
| 58,000' | 12.3cm | 10.8cm | 9.6cm | 8.6cm | 7.8cm | 7.2cm | 9.5km | 14.6km |
| 60,000' | 12.8cm | 11.2cm | 9.9cm | 8.9cm | 8.1cm | 7.4cm | 9.8km | 15.2km |
|  | 2.0° | 1.7° | 1.5° | 1.4° | 1.2° | 1.1° | longitudinal FOV | |
|  | 2.9° | 2.6° | 2.3° | 2.1° | 1.9° | 1.7° | lateral FOV | |
|  | 0.4° | 0.3° | 0.3° | 0.3° | 0.3° | 0.3° | lateral overlap | |
|  | 2.6° | 2.3° | 2.0° | 1.8° | 1.6° | 1.4° | lateral spacing | |
|  | 12 | 14 | 15 | 17 | 19 | 21 | 30° camera count | |
|  | 31.2° | 31.8° | 30.1° | 30.2° | 30.1° | 30.0° | actual FOV | |
|  | 18 | 20 | 23 | 26 | 29 | 32 | 45° camera count | |
|  | 46.7° | 45.3° | 46.0° | 46.0° | 45.8° | 45.6° | actual FOV | |

Fig. 23

EQ 1: $g = p \cdot a / f$
EQ 2: $w = s \cdot a / f$
EQ 3: $s = 2f \cdot \tan(\beta/2)$
EQ 4: $\beta = 2 \cdot \arctan(s/2f)$
EQ 5: $w = 2a \cdot \tan(\beta/2)$
EQ 6: $\beta = 2 \cdot \arctan(w/2a)$ EQ 7: γ = N · β − (N−1)ω
EQ 8: w(N) = 2a · tan(γ/2)

EQ 9: $g(\theta) = g \cdot \sec^2(\theta)$
EQ 10: $h(\theta) = g \cdot \sec(\theta)$ EQ 11: $b = 2a \cdot \tan(\delta/2)$
EQ 12: $d = b - c$
EQ 13: $r = v / d$ EQ 14: N = ceil((γ − ω) / (β − ω))
EQ 15: q = (N / C) · r / u
EQ 16: e = 2a · tan(φ/2)
EQ 17: R = e · v EQ 18: $d(\lambda) = d / \cos(\lambda)$
EQ 19: $r(\lambda) = r \cdot \cos(\lambda)$
EQ 20: $e(\lambda) = e \cdot \cos(\lambda)$
EQ 21: $q(\lambda) = q \cdot \cos(\lambda)$
EQ 22: $R(\lambda) = R \cdot \cos(\lambda)$

| altitude | speed | shot rate | frame rate | 30° capture rate | | 45° capture rate | |
|---|---|---|---|---|---|---|---|
| 2,000' | 200kts | 0.2Hz | 0.3Hz | 0.1k km2/h | 1k km2/day | 0.1k km2/h | 1k km2/day |
| 4,000' | 200kts | 0.2Hz | 0.6Hz | 0.2k km2/h | 1k km2/day | 0.3k km2/h | 2k km2/day |
| 6,000' | 200kts | 0.2Hz | 0.9Hz | 0.3k km2/h | 2k km2/day | 0.4k km2/h | 2k km2/day |
| 8,000' | 200kts | 0.2Hz | 1.1Hz | 0.3k km2/h | 2k km2/day | 0.5k km2/h | 3k km2/day |
| 10,000' | 200kts | 0.2Hz | 1.4Hz | 0.4k km2/h | 3k km2/day | 0.7k km2/h | 4k km2/day |
| 12,000' | 200kts | 0.2Hz | 1.7Hz | 0.5k km2/h | 3k km2/day | 0.8k km2/h | 5k km2/day |
| 14,000' | 200kts | 0.2Hz | 2.0Hz | 0.6k km2/h | 4k km2/day | 0.9k km2/h | 6k km2/day |
| 16,000' | 300kts | 0.2Hz | 3.4Hz | 1.0k km2/h | 6k km2/day | 1.6k km2/h | 10k km2/day |
| 18,000' | 300kts | 0.2Hz | 3.8Hz | 1.2k km2/h | 7k km2/day | 1.8k km2/h | 11k km2/day |
| 20,000' | 300kts | 0.2Hz | 4.3Hz | 1.3k km2/h | 8k km2/day | 2.0k km2/h | 12k km2/day |
| 22,000' | 300kts | 0.2Hz | 4.7Hz | 1.4k km2/h | 8k km2/day | 2.2k km2/h | 13k km2/day |
| 24,000' | 300kts | 0.2Hz | 5.1Hz | 1.5k km2/h | 9k km2/day | 2.4k km2/h | 14k km2/day |
| 26,000' | 400kts | 0.3Hz | 7.4Hz | 2.2k km2/h | 13k km2/day | 3.4k km2/h | 21k km2/day |
| 28,000' | 400kts | 0.3Hz | 7.9Hz | 2.4k km2/h | 14k km2/day | 3.7k km2/h | 22k km2/day |
| 30,000' | 400kts | 0.3Hz | 8.5Hz | 2.6k km2/h | 15k km2/day | 4.0k km2/h | 24k km2/day |
| 32,000' | 400kts | 0.3Hz | 9.1Hz | 2.7k km2/h | 16k km2/day | 4.2k km2/h | 25k km2/day |
| 34,000' | 400kts | 0.3Hz | 9.6Hz | 2.9k km2/h | 17k km2/day | 4.5k km2/h | 27k km2/day |
| 36,000' | 500kts | 0.4Hz | 12.8Hz | 3.9k km2/h | 23k km2/day | 6.0k km2/h | 36k km2/day |
| 38,000' | 500kts | 0.4Hz | 13.5Hz | 4.1k km2/h | 24k km2/day | 6.3k km2/h | 38k km2/day |
| 40,000' | 500kts | 0.4Hz | 14.2Hz | 4.3k km2/h | 26k km2/day | 6.6k km2/h | 40k km2/day |
| 42,000' | 500kts | 0.4Hz | 14.9Hz | 4.5k km2/h | 27k km2/day | 6.9k km2/h | 42k km2/day |
| 44,000' | 500kts | 0.4Hz | 15.6Hz | 4.7k km2/h | 28k km2/day | 7.3k km2/h | 44k km2/day |
| 46,000' | 500kts | 0.4Hz | 16.3Hz | 4.9k km2/h | 30k km2/day | 7.6k km2/h | 46k km2/day |
| 48,000' | 500kts | 0.4Hz | 17.0Hz | 5.1k km2/h | 31k km2/day | 7.9k km2/h | 48k km2/day |
| 50,000' | 500kts | 0.4Hz | 17.7Hz | 5.3k km2/h | 32k km2/day | 8.3k km2/h | 50k km2/day |
| 52,000' | 500kts | 0.4Hz | 18.4Hz | 5.6k km2/h | 33k km2/day | 8.6k km2/h | 52k km2/day |
| 54,000' | 500kts | 0.4Hz | 19.1Hz | 5.8k km2/h | 35k km2/day | 8.9k km2/h | 54k km2/day |
| 56,000' | 500kts | 0.4Hz | 19.8Hz | 6.0k km2/h | 36k km2/day | 9.3k km2/h | 56k km2/day |
| 58,000' | 500kts | 0.4Hz | 20.5Hz | 6.2k km2/h | 37k km2/day | 9.6k km2/h | 58k km2/day |
| 60,000' | 500kts | 0.4Hz | 21.2Hz | 6.4k km2/h | 39k km2/day | 9.9k km2/h | 60k km2/day |

Fig. 64

| altitude | speed | shot rate | frame rate | 30° capture rate | | 45° capture rate | |
|---|---|---|---|---|---|---|---|
| 2,000' | 200kts | 0.3Hz | 0.8Hz | 0.1k km2/h | 1k km2/day | 0.1k km2/h | 1k km2/day |
| 4,000' | 200kts | 0.3Hz | 1.5Hz | 0.2k km2/h | 1k km2/day | 0.3k km2/h | 2k km2/day |
| 6,000' | 200kts | 0.3Hz | 2.3Hz | 0.3k km2/h | 2k km2/day | 0.4k km2/h | 2k km2/day |
| 8,000' | 200kts | 0.3Hz | 3.1Hz | 0.3k km2/h | 2k km2/day | 0.5k km2/h | 3k km2/day |
| 10,000' | 200kts | 0.3Hz | 3.8Hz | 0.4k km2/h | 3k km2/day | 0.7k km2/h | 4k km2/day |
| 12,000' | 200kts | 0.3Hz | 4.6Hz | 0.5k km2/h | 3k km2/day | 0.8k km2/h | 5k km2/day |
| 14,000' | 200kts | 0.3Hz | 5.4Hz | 0.6k km2/h | 4k km2/day | 0.9k km2/h | 6k km2/day |
| 16,000' | 300kts | 0.5Hz | 9.2Hz | 1.0k km2/h | 6k km2/day | 1.6k km2/h | 10k km2/day |
| 18,000' | 300kts | 0.5Hz | 10.3Hz | 1.2k km2/h | 7k km2/day | 1.8k km2/h | 11k km2/day |
| 20,000' | 300kts | 0.5Hz | 11.5Hz | 1.3k km2/h | 8k km2/day | 2.0k km2/h | 12k km2/day |
| 22,000' | 300kts | 0.5Hz | 12.6Hz | 1.4k km2/h | 8k km2/day | 2.2k km2/h | 13k km2/day |
| 24,000' | 300kts | 0.5Hz | 13.8Hz | 1.5k km2/h | 9k km2/day | 2.4k km2/h | 14k km2/day |
| 26,000' | 400kts | 0.6Hz | 19.9Hz | 2.2k km2/h | 13k km2/day | 3.4k km2/h | 21k km2/day |
| 28,000' | 400kts | 0.6Hz | 21.4Hz | 2.4k km2/h | 14k km2/day | 3.7k km2/h | 22k km2/day |
| 30,000' | 400kts | 0.6Hz | 23.0Hz | 2.6k km2/h | 15k km2/day | 4.0k km2/h | 24k km2/day |
| 32,000' | 400kts | 0.6Hz | 24.5Hz | 2.7k km2/h | 16k km2/day | 4.2k km2/h | 25k km2/day |
| 34,000' | 400kts | 0.6Hz | 26.0Hz | 2.9k km2/h | 17k km2/day | 4.5k km2/h | 27k km2/day |
| 36,000' | 500kts | 0.8Hz | 34.5Hz | 3.9k km2/h | 23k km2/day | 6.0k km2/h | 36k km2/day |
| 38,000' | 500kts | 0.8Hz | 36.4Hz | 4.1k km2/h | 24k km2/day | 6.3k km2/h | 38k km2/day |
| 40,000' | 500kts | 0.8Hz | 38.3Hz | 4.3k km2/h | 26k km2/day | 6.6k km2/h | 40k km2/day |
| 42,000' | 500kts | 0.8Hz | 40.2Hz | 4.5k km2/h | 27k km2/day | 6.9k km2/h | 42k km2/day |
| 44,000' | 500kts | 0.8Hz | 42.1Hz | 4.7k km2/h | 28k km2/day | 7.3k km2/h | 44k km2/day |
| 46,000' | 500kts | 0.8Hz | 44.0Hz | 4.9k km2/h | 30k km2/day | 7.6k km2/h | 46k km2/day |
| 48,000' | 500kts | 0.8Hz | 45.9Hz | 5.1k km2/h | 31k km2/day | 7.9k km2/h | 48k km2/day |
| 50,000' | 500kts | 0.8Hz | 47.9Hz | 5.3k km2/h | 32k km2/day | 8.3k km2/h | 50k km2/day |
| 52,000' | 500kts | 0.8Hz | 49.8Hz | 5.6k km2/h | 33k km2/day | 8.6k km2/h | 52k km2/day |
| 54,000' | 500kts | 0.8Hz | 51.7Hz | 5.8k km2/h | 35k km2/day | 8.9k km2/h | 54k km2/day |
| 56,000' | 500kts | 0.8Hz | 53.6Hz | 6.0k km2/h | 36k km2/day | 9.3k km2/h | 56k km2/day |
| 58,000' | 500kts | 0.8Hz | 55.5Hz | 6.2k km2/h | 37k km2/day | 9.6k km2/h | 58k km2/day |
| 60,000' | 500kts | 0.8Hz | 57.4Hz | 6.4k km2/h | 39k km2/day | 9.9k km2/h | 60k km2/day |

Fig. 65

| altitude | speed | shot rate | frame rate | 30° capture rate | | 45° capture rate | |
|---|---|---|---|---|---|---|---|
| 2,000' | 200kts | 0.4Hz | 1.6Hz | 0.1k km2/h | 1k km2/day | 0.1k km2/h | 1k km2/day |
| 4,000' | 200kts | 0.4Hz | 3.2Hz | 0.2k km2/h | 1k km2/day | 0.3k km2/h | 2k km2/day |
| 6,000' | 200kts | 0.4Hz | 4.8Hz | 0.3k km2/h | 2k km2/day | 0.4k km2/h | 2k km2/day |
| 8,000' | 200kts | 0.4Hz | 6.4Hz | 0.3k km2/h | 2k km2/day | 0.5k km2/h | 3k km2/day |
| 10,000' | 200kts | 0.4Hz | 8.0Hz | 0.4k km2/h | 3k km2/day | 0.7k km2/h | 4k km2/day |
| 12,000' | 200kts | 0.4Hz | 9.6Hz | 0.5k km2/h | 3k km2/day | 0.8k km2/h | 5k km2/day |
| 14,000' | 200kts | 0.4Hz | 11.2Hz | 0.6k km2/h | 4k km2/day | 0.9k km2/h | 6k km2/day |
| 16,000' | 300kts | 0.6Hz | 19.1Hz | 1.0k km2/h | 6k km2/day | 1.6k km2/h | 10k km2/day |
| 18,000' | 300kts | 0.6Hz | 21.5Hz | 1.2k km2/h | 7k km2/day | 1.8k km2/h | 11k km2/day |
| 20,000' | 300kts | 0.6Hz | 23.9Hz | 1.3k km2/h | 8k km2/day | 2.0k km2/h | 12k km2/day |
| 22,000' | 300kts | 0.6Hz | 26.3Hz | 1.4k km2/h | 8k km2/day | 2.2k km2/h | 13k km2/day |
| 24,000' | 300kts | 0.6Hz | 28.7Hz | 1.5k km2/h | 9k km2/day | 2.4k km2/h | 14k km2/day |
| 26,000' | 400kts | 0.8Hz | 41.5Hz | 2.2k km2/h | 13k km2/day | 3.4k km2/h | 21k km2/day |
| 28,000' | 400kts | 0.8Hz | 44.7Hz | 2.4k km2/h | 14k km2/day | 3.7k km2/h | 22k km2/day |
| 30,000' | 400kts | 0.8Hz | 47.9Hz | 2.6k km2/h | 15k km2/day | 4.0k km2/h | 24k km2/day |
| 32,000' | 400kts | 0.8Hz | 51.1Hz | 2.7k km2/h | 16k km2/day | 4.2k km2/h | 25k km2/day |
| 34,000' | 400kts | 0.8Hz | 54.2Hz | 2.9k km2/h | 17k km2/day | 4.5k km2/h | 27k km2/day |
| 36,000' | 500kts | 1.0Hz | 71.8Hz | 3.9k km2/h | 23k km2/day | 6.0k km2/h | 36k km2/day |
| 38,000' | 500kts | 1.0Hz | 75.8Hz | 4.1k km2/h | 24k km2/day | 6.3k km2/h | 38k km2/day |
| 40,000' | 500kts | 1.0Hz | 79.8Hz | 4.3k km2/h | 26k km2/day | 6.6k km2/h | 40k km2/day |
| 42,000' | 500kts | 1.0Hz | 83.8Hz | 4.5k km2/h | 27k km2/day | 6.9k km2/h | 42k km2/day |
| 44,000' | 500kts | 1.0Hz | 87.7Hz | 4.7k km2/h | 28k km2/day | 7.3k km2/h | 44k km2/day |
| 46,000' | 500kts | 1.0Hz | 91.7Hz | 4.9k km2/h | 30k km2/day | 7.6k km2/h | 46k km2/day |
| 48,000' | 500kts | 1.0Hz | 95.7Hz | 5.1k km2/h | 31k km2/day | 7.9k km2/h | 48k km2/day |
| 50,000' | 500kts | 1.0Hz | 99.7Hz | 5.3k km2/h | 32k km2/day | 8.3k km2/h | 50k km2/day |
| 52,000' | 500kts | 1.0Hz | 103.7Hz | 5.6k km2/h | 33k km2/day | 8.6k km2/h | 52k km2/day |
| 54,000' | 500kts | 1.0Hz | 107.7Hz | 5.8k km2/h | 35k km2/day | 8.9k km2/h | 54k km2/day |
| 56,000' | 500kts | 1.0Hz | 111.7Hz | 6.0k km2/h | 36k km2/day | 9.3k km2/h | 56k km2/day |
| 58,000' | 500kts | 1.0Hz | 115.7Hz | 6.2k km2/h | 37k km2/day | 9.6k km2/h | 58k km2/day |
| 60,000' | 500kts | 1.0Hz | 119.6Hz | 6.4k km2/h | 39k km2/day | 9.9k km2/h | 60k km2/day |

Fig. 66

EQ 23: $y = A \cdot \sin(2\pi \cdot f \cdot t)$
EQ 24: $dy/dt = 2\pi \cdot f \cdot A \cdot \cos(2\pi \cdot f \cdot t)$
EQ 25: $\max(dy/dt) = 2\pi \cdot f \cdot A$
EQ 26: $\text{avg}(dy/dt) = (y_1 - y_0) / (t_1 - t_0)$

WIDE-AREA AERIAL CAMERA SYSTEMS

CROSS-REFERENCE TO RELATED APPLICATIONS

This is a continuation-in-part of application Ser. No. 14/928,542, filed Oct. 30, 2015, the entire contents of which are incorporated herein by reference. Application Ser. No. 14/928,542 is a continuation of application Ser. No. 14/735,504, filed Jun. 10, 2015, the entire contents of which are incorporated herein by reference. Application Ser. No. 14/735,504 is a continuation-in-part of application Ser. No. 14/687,544, filed Apr. 15, 2015, the entire contents of which are incorporated herein by reference. Application Ser. No. 14/687,544 is a continuation-in-part of application Ser. No. 14/478,380, filed Sep. 5, 2014, the entire contents of which are incorporated herein by reference. Application Ser. No. 14/478,380 is a continuation-in-part of application Ser. No. 14/310,523, filed Jun. 20, 2014, the entire contents of which are incorporated herein by reference.

FIELD OF THE INVENTION

The present invention relates to efficient aerial camera systems and efficient methods for creating orthomosaics from aerial photos.

BACKGROUND OF THE INVENTION

Accurately georeferenced mosaics of orthophotos, referred to as orthomosaics, are becoming popular alternatives to traditional pictorial maps because they can be created automatically from aerial photos, and because they show actual useful detail on the ground.

The creation of accurate orthomosaics from aerial photos is well described in the literature. See, for example, Elements of Photogrammetry with Application in GIS, Fourth Edition (Wolf et al.) (McGraw-Hill 2014), and the Manual of Photogrammetry, Sixth Edition (American Society for Photogrammetry and Remote Sensing (ASPRS) 2013).

The creation of an orthomosaic requires the systematic capture of overlapping aerial photos of the area of interest, both to ensure complete coverage of the area of interest, and to ensure that there is sufficient redundancy in the imagery to allow accurate bundle adjustment, orthorectification and alignment of the photos.

Bundle adjustment is the process by which redundant estimates of ground points and camera poses are refined. Modern bundle adjustment is described in detail in "Bundle Adjustment—A Modern Synthesis" (Triggs et al.) in Vision Algorithms: Theory and Practice (Lecture Notes in Computer Science, Volume 1883, Springer 2000).

Bundle adjustment may operate on the positions of manually-identified ground points, or, increasingly, on the positions of automatically-identified ground features which are automatically matched between overlapping photos.

Overlapping aerial photos are typically captured by navigating a survey aircraft in a serpentine pattern over the area of interest. The survey aircraft carries an aerial camera system, and the serpentine flight pattern ensures that the photos captured by the camera system overlap both along flight lines within the flight pattern and between adjacent flight lines.

The aerial camera system carried by a survey aircraft sees a larger view of the ground when the aircraft is operated at a higher altitude. This allows the spacing of flight lines to be increased and hence survey efficiency to be improved. However, to maintain a particular ground sampling distance, i.e. the spacing of camera pixels on the ground, larger camera image sensors or more cameras may need to used.

SUMMARY OF THE INVENTION

In a first aspect, the present invention provides a system for capturing aerial images, the system comprising four steerable detail camera modules, each steerable detail camera module comprising a detail camera and a beam-steering mechanism in an optical path of the detail camera module whereby the pointing direction of the detail camera is time-multiplexed to provide a wider effective field of view, the beam-steering mechanism comprising a first steerable mirror.

The first steerable mirror may be adapted to tilt with respect to an optical axis of the detail camera module to effect beam steering.

The first steerable mirror may be tilted with respect to an optical axis of the detail camera module, and the first steerable mirror may be adapted to spin about the optical axis to effect beam steering.

The steering axes of the steerable camera modules may be angularly distributed approximately 90 degrees apart, with at least one steering axis angled at approximately 45 degrees to the direction of flight.

The steering axes of at least two of the steerable detail camera modules may be substantially parallel.

The wider effective field of view provided by each steerable detail camera module may be asymmetric about a vertical pointing direction.

The wider effective fields of view provided by at least two of the steerable detail camera modules may together form a still wider effective field of view that is symmetric about a vertical pointing direction.

The system may be attachable, above a camera hole, to at least one of a floor of an aircraft and a floor of a pod carried by an aircraft, thereby providing the at least one detail camera with a view of the ground below the aircraft through the camera hole.

The system may comprise at least one overview camera, the focal length of the overview camera shorter than the focal length of the detail camera.

The detail camera may have a lens selected from the group comprising: a dioptric lens, a catoptric lens, and a catadioptric lens.

The first steerable mirror may be stationary during an exposure period of the detail camera.

The first steerable mirror may have a non-zero angular velocity during an exposure period of the detail camera, and the steerable detail camera module may comprise a second steerable mirror in the optical path configured to correct the effect, on the detail camera, of the angular velocity of the first steerable mirror during the exposure period, thereby to ensure the detail camera points in a consistent direction during the exposure period.

The angular velocity of the second steerable mirror may be sinusoidal, and the average angular velocity of the second steerable mirror may be equal to the average angular velocity of the first steerable mirror during the exposure period.

The angular velocity of the second steerable mirror may be constant during the exposure period.

The system may further comprise at least one angular motion compensation (AMC) unit, the at least one AMC unit configured to correct the effect, on the detail camera, of angular motion of the aircraft, thereby to ensure the detail camera points in a consistent direction over time.

AMC may be provided via a steerable mirror in the optical path.

The system may comprise at least one forward motion compensation (FMC) mechanism, the at least one FMC mechanism configured to correct the effect, on the detail camera, of forward motion of the aircraft, thereby to reduce motion blur in photos captured by the detail camera.

FMC may be provided via a steerable mirror in the optical path.

FMC may be provided via time delayed integration of adjacent lines of pixels in an image sensor of the detail camera.

FMC may be provided by moving an image sensor of the detail camera.

DRAWINGS—FIGURES

FIG. 22 shows a tabulation of ground sampling distance (GSD) as a function of altitude and camera focal length between 100 mm and 600 mm.

FIG. 23 shows a tabulation of ground sampling distance (GSD) as a function of altitude and camera focal length between 700 mm and 1200 mm.

FIG. 64 shows a tabulation, for a 36 Mpixel X-configuration steerable camera unit and a 7 cm GSD, of shot rate, frame rate and area capture rate as a function of altitude, aircraft speed and usable field of view angle.

FIG. 65 shows a tabulation, for a 25 Mpixel X-configuration steerable camera unit and a 5 cm GSD, of shot rate, frame rate and area capture rate as a function of altitude, aircraft speed and usable field of view angle.

FIG. 66 shows a tabulation, for a 12 Mpixel X-configuration steerable camera unit and a 5 cm GSD, of shot rate, frame rate and area capture rate as a function of altitude, aircraft speed and usable field of view angle.

DRAWINGS—REFERENCE NUMERALS

Figure 1:
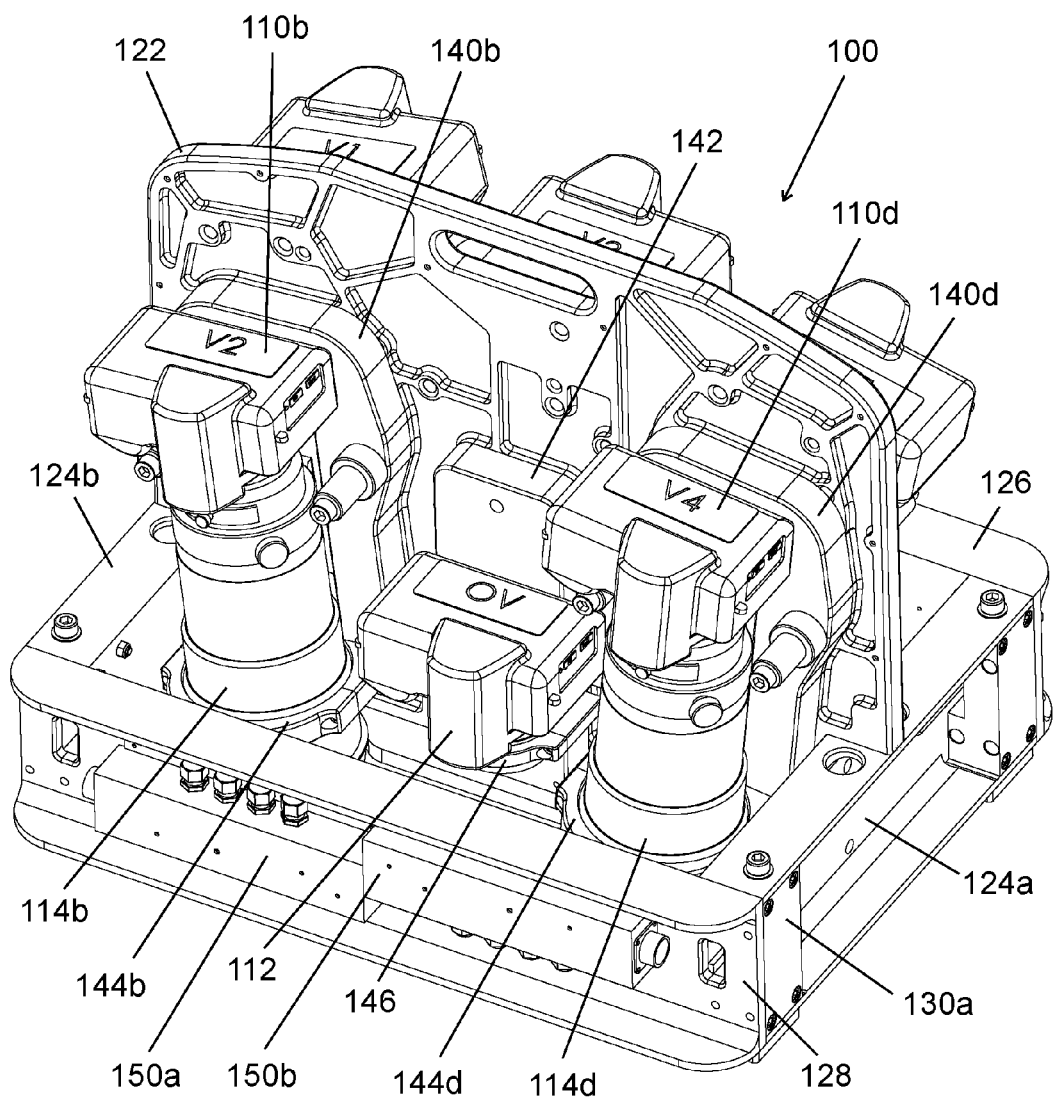
FIG. 1 shows a front view of a V5-300 HyperCamera unit, i.e. facing forwards towards the front of the aircraft.
Figure 2:
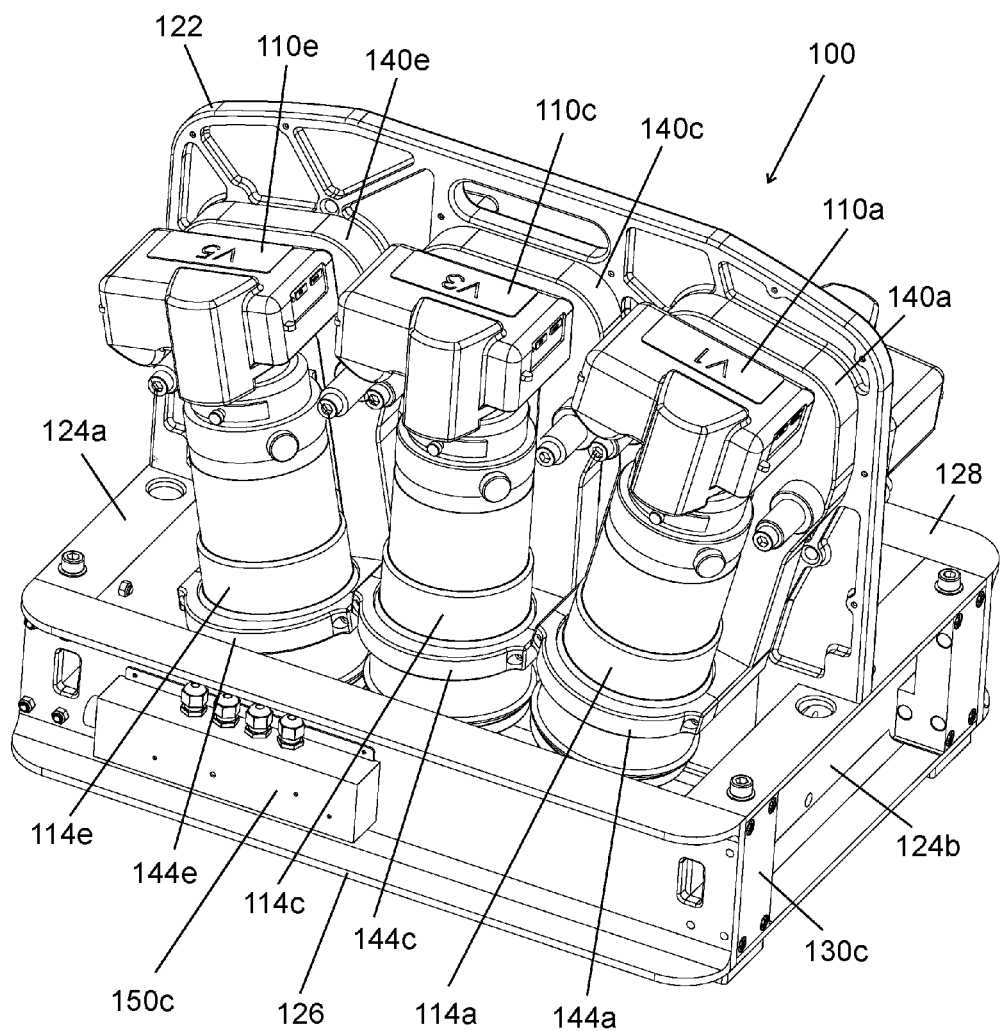
FIG. 2 shows a back view of the camera unit.
Figure 3:
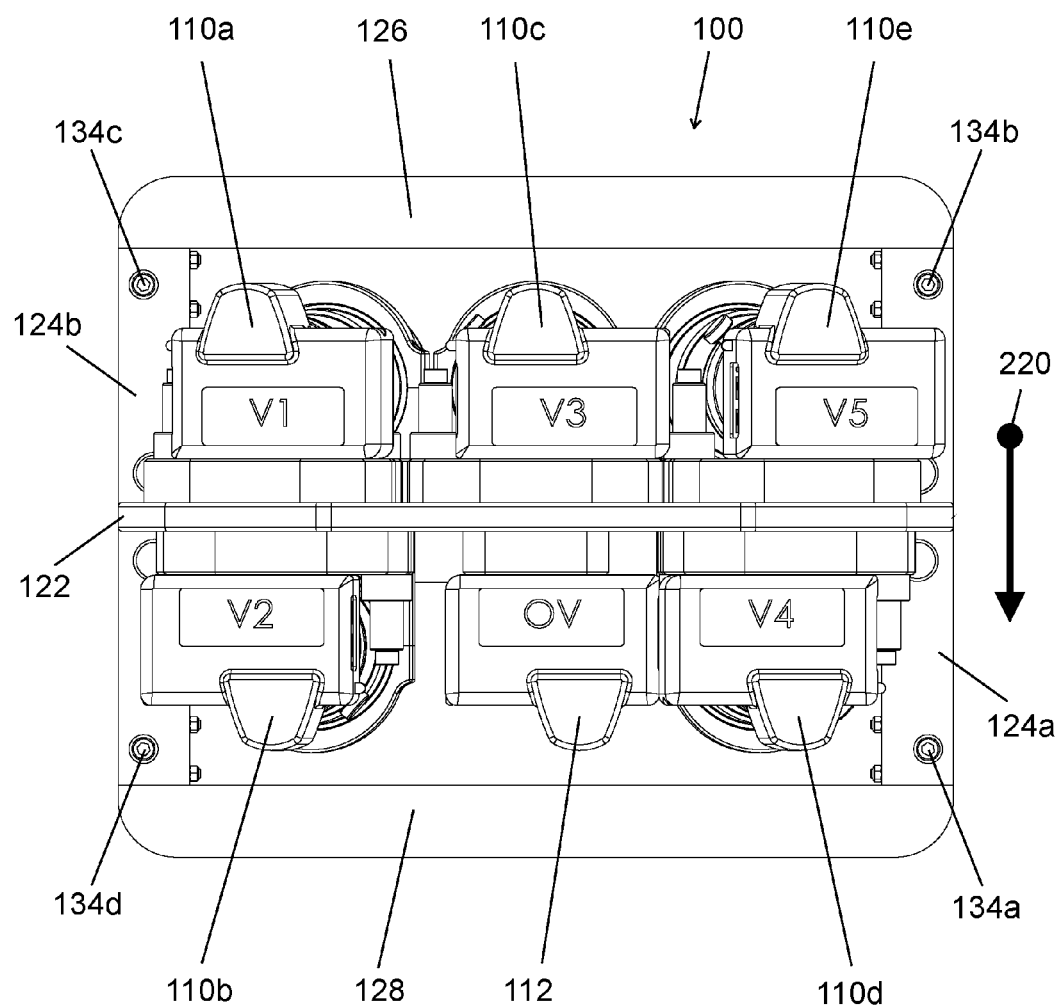
FIG. 3 shows a top view of the camera unit.
Figure 4:
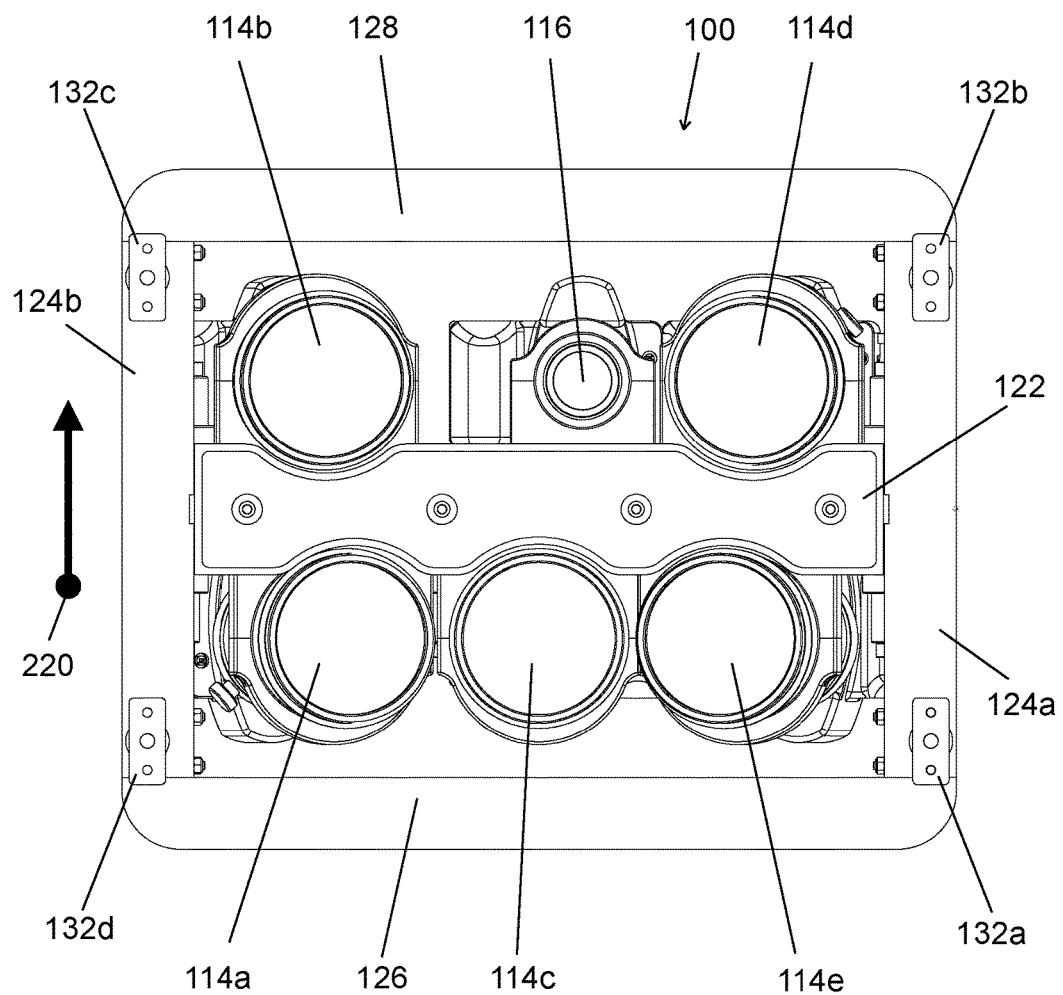
FIG. 4 shows a bottom view of the camera unit.
Figure 5:
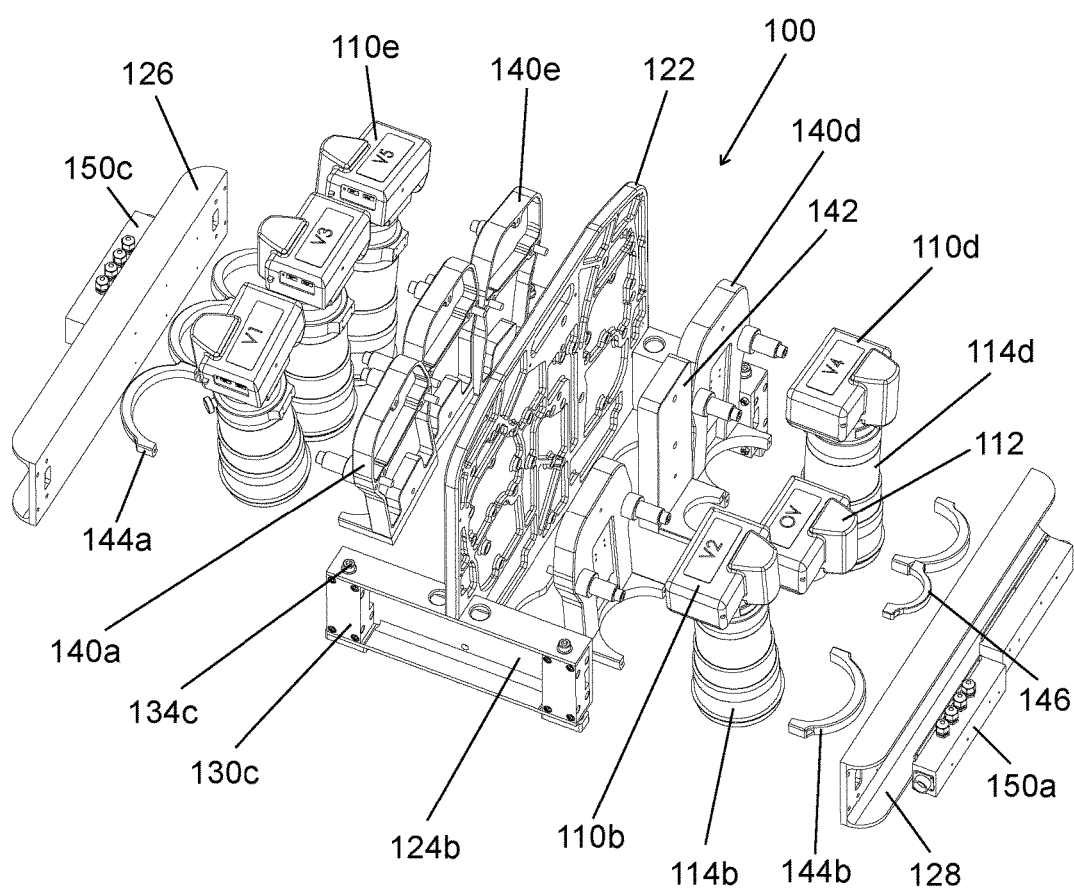
FIG. 5 shows an exploded view of the camera unit.

100 Camera unit.
110 Detail camera body.
112 Overview camera body.
114 Detail camera lens.
116 Overview camera lens.
118 Lens of special-purpose (e.g. NIR) camera.
120 Frame.
122 Frame center support.
124 Frame side support.
126 Frame rear support.
128 Frame front support.
130 Mount point block.
132 Mount point.
134 Mount bolt.
140 Mount for detail camera.
142 Mount for overview camera.
144 Clamp for detail camera lens.
146 Clamp for overview camera lens.
150 Power and control distribution box.
160 Detail field of view.
162 Lateral detail field of view.
164 Longitudinal detail field of view.
170 Overview field of view.
172 Lateral overview field of view.
174 Longitudinal overview field of view.
180 Aggregate detail field of view.
182 Lateral aggregate detail field of view.
190 Aggregate overview field of view.
192 Lateral aggregate overview field of view.
194 Nominal 30-degree field of view.
196 One-km grid.
200 Adapter plate.
202 Seat track fastener.
210 Aircraft floor.
212 Camera hole.
214 Seat track.
216 Adapter plate aperture.
220 Direction of flight.
222 Flight path.
224 Shot position.
226 Flight line.
230 Aerial survey aircraft.
232 Aerial survey aircraft belly-mounted pod.
250 Field of view angle (beta).
252 Focal length (f).
254 Altitude above ground level (a).
256 Image sensor width (s).
258 Swath width (w).
260 Image sensor pixel pitch (p).
262 Ground sampling distance (GSD) (g).
270 Aggregate field of view angle (gamma).
272 Angular camera overlap (omega).
278 Aggregate swath width (w(N)).
280 Camera tilt angle (theta).
282 Tilted camera GSD (g(theta)).
284 Tilted camera field of view.
286 Tilted camera with tilted focal plane GSD (h(theta)).
288 Tilted camera with tilted focal plane field of view.
300 Computer.
302 Pilot display.
304 Inertial Measurement Unit (IMU).
306 Global Navigation Satellite System (GNSS) receiver.
308 Camera interface.
310 Camera control unit (CCU).
320 Battery unit.
322 Aircraft auxiliary power.
324 Ground power unit (GPU).
326 DC-DC converters.
330 Angular motion compensation (AMC) unit(s).
400 Detail photos.
402 Overview photos.
404 Orthomosaic.
410 Match features step.
412 Solve pose and positions step.
414 Orthorectify step.
416 Blend step.
510 Right oblique detail field of view.

512 Lateral right oblique detail field of view.
514 Longitudinal right oblique detail field of view.
520 Right oblique overview field of view.
522 Lateral right oblique overview field of view.
524 Longitudinal right oblique overview field of view.
530 Left oblique detail field of view.
532 Lateral left oblique detail field of view.
534 Longitudinal left oblique detail field of view.
540 Left oblique overview field of view.
542 Lateral left oblique overview field of view.
544 Longitudinal left oblique overview field of view.
550 Front oblique detail field of view.
552 Lateral front oblique detail field of view.
554 Longitudinal front oblique detail field of view.
560 Front oblique overview field of view.
562 Lateral front oblique overview field of view.
564 Longitudinal front oblique overview field of view.
570 Back oblique detail field of view.
572 Lateral back oblique detail field of view.
574 Longitudinal back oblique detail field of view.
580 Back oblique overview field of view.
582 Lateral back oblique overview field of view.
584 Longitudinal back oblique overview field of view.
600 Camera.
602 Camera optical axis.
604 Steerable multiplexing mirror.
606 Fixed mirror.
608 Steerable motion compensation mirror.
610 Steerable camera module.
612 Camera field of view.
614 Half-field steerable detail camera module.
616 Full-field steerable detail camera module.
618 Full-field steerable overview camera module.
620 Detail camera steering axis.
622 Overview camera steering axis.
624 Double-field steerable camera module.
626 Double-field detail steerable camera module.
630 Multiplexing mirror linear motor.
632 Multiplexing mirror actuator rod.
634 Multiplexing mirror mount.
636 Motion compensation mirror stage.
638 Multiplexing mirror stage.
640 Multiplexing mirror controller.
642 Motion compensation mirror controller.
644 Multiplexing mirror sensor.
646 Motion compensation mirror sensor.
648 Multiplexing mirror rotating motor.
650 Wide-angle aggregate detail field of view.
652 Wide-angle aggregate overview field of view.
654 Interstitial field of view.
656 Switching mirror.
658 Switching mirror rotating motor.
660 X-configuration combined detail field of view.
670 Longitudinal field of view angle (delta).
672 Longitudinal footprint (b).
674 Longitudinal overlap (c).
676 Longitudinal shot spacing (d).
678 Aircraft ground velocity (v).
680 Usable vertical field of view angle (phi).
682 Lateral flight-line spacing (e).
684 Lateral field of view axis.
686 Field of view axis rotation angle (lambda).
688 Rotated lateral field of view axis.
690 Longitudinal shot spacing with rotated axis (d(lambda)).
692 Flight-line spacing with rotated axis (e(lambda)).
700 Image input/output module.
702 Image storage device.
704 Pilot input device.
706 Auto-pilot.
710 Camera microcontroller.
712 Camera module control interface.
714 Camera control interface.
716 Image stream interface.
720 Steering motion vector.
722 Forward motion vector.
724 Resultant motion vector.
730 Angular position (y).
732 Time (t).
734 Multiplexing mirror angular position graph.
736 Motion-compensation mirror angular position graph.
738 Exposure interval.

DETAILED DESCRIPTION OF PREFERRED EMBODIMENTS

HyperCamera™ is a range of aerial camera systems suitable for deployment in a wide range of aircraft, large and small. The camera systems are modular, and designed to be installed above one or more standard camera holes where appropriate, as are typically provided through the floor of a survey aircraft or airborne pod.

Each HyperCamera model is defined by its pointing direction (P), the number of cameras (N) in its array, and the focal length (f) of the cameras, and is identified by the designator PN-f. For example, a 300 mm five-camera vertical HyperCamera is referred to as a V5-300 model.

Wide-angle steerable HyperCamera models are identified by the designator WS-f. For example, a 300 mm wide-angle steerable HyperCamera is referred to as a WS-300 model.

The level of detail captured by an aerial camera is typically characterized by the ground sampling distance (GSD), i.e. the distance between adjacent pixel centers when projected onto the ground within the camera's field of view.

Figure 42:
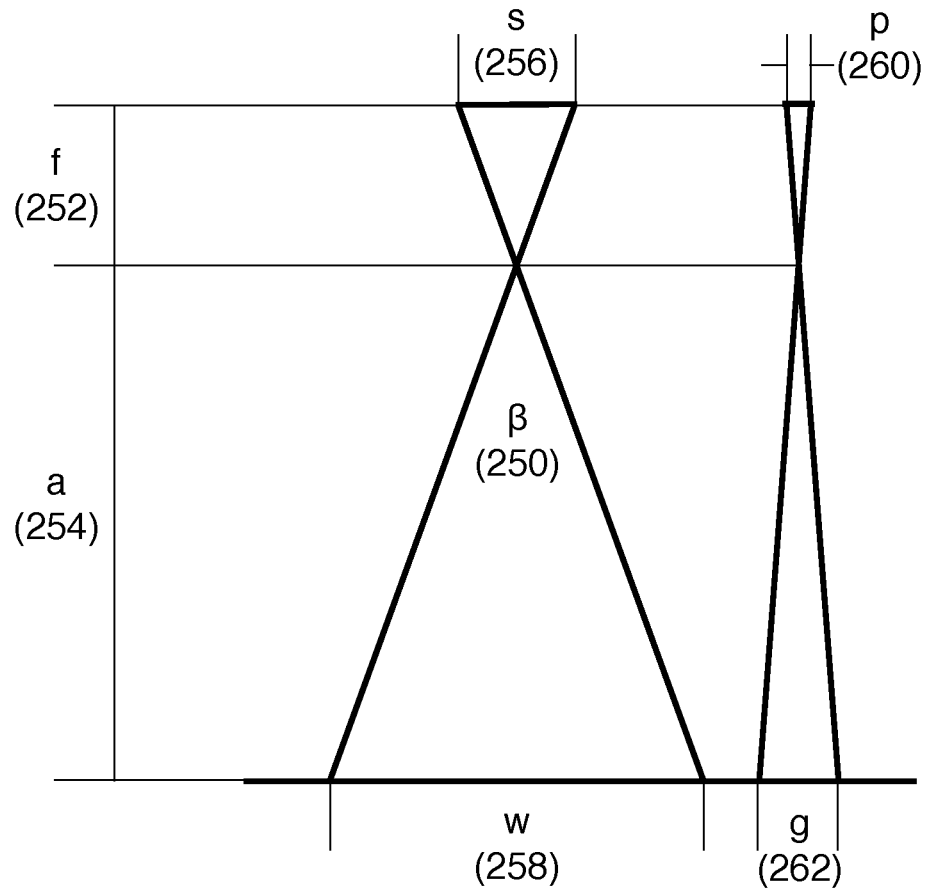
FIG. 42 shows a diagram and equation relating to the calculation of the field of view and resolution of a camera.

The GSD is determined by the focal length (f, 252) of the camera lens, the altitude above ground level (a, 254), and the pixel pitch (p, 260) of the image sensor, per EQ 1 in FIG. 42.

The efficiency of aerial imaging is typically characterized by the area captured per unit time (e.g. square km per hour). This is proportional to the speed of the aircraft and the width of the field of view (FOV) of the aerial camera system, referred to as the swath width.

The swath width (w, 258) of a single camera is determined by the focal length (f, 252) of the camera lens, the altitude above ground level (a, 254), and the lateral size (s, 256) of the image sensor, per EQ 2 in FIG. 42. Doubling the altitude doubles the swath width.

The lateral field of view (beta, 250) of a single camera is determined by the focal length (f, 252) of the camera lens and the lateral size (s, 256) of the image sensor, per EQ 4 in FIG. 42. Doubling the focal length approximately halves the field of view.

Figure 43:
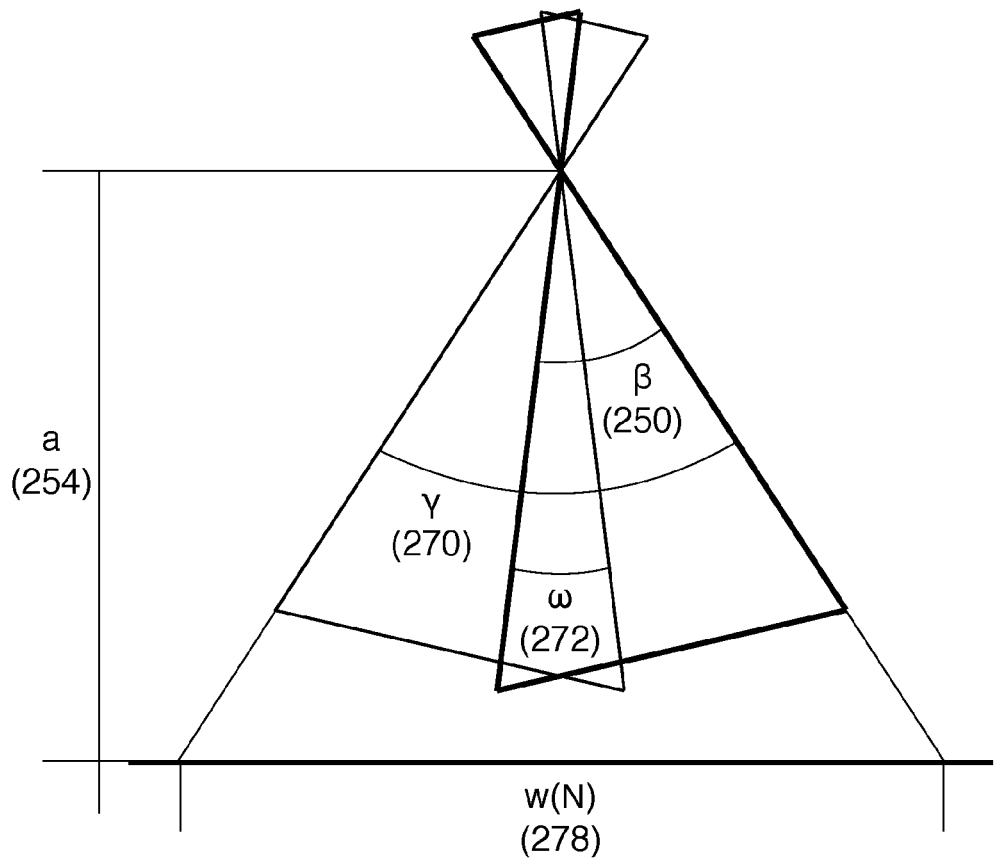
FIG. 43 shows a diagram and equations relating to the calculation of the field of view of an array of cameras.

The lateral field of view (gamma, 270) of an array of cameras is determined by the field of view of each camera (beta, 250), the number of cameras (N), and their angular overlap (omega, 272), per EQ 7 in FIG. 43. Doubling the number of cameras approximately doubles the field of view. The swath width (w(N), 278) of the array of cameras is given by EQ 8 in FIG. 43.

The practical field of view of an aerial camera system is limited by the acceptable level of obliqueness in the aerial imagery—e.g. how much buildings are allowed to lean when captured at the edge of the field of view. The practical field of view is usually limited to 50 degrees or less.

Given a limit on the practical field of view, higher capture efficiency (and therefore lower capture cost) can be achieved by flying at higher speed and/or at a higher altitude. Flying at a higher altitude requires longer focal lengths to maintain the same GSD. Since each camera then has a narrower individual field of view, this in turn requires a larger number of cameras to maintain the overall field of view.

The HyperCamera range includes models suited to a variety of operating altitudes, and supporting a range of GSDs and capture efficiencies. Depending on target speed and altitude, a HyperCamera system may be installed in any aircraft suitable for aerial imaging. By way of example, this includes (but is not limited to) piston aircraft such as a Cessna 210, turboprop aircraft such as a Cessna 208, and turbofan (jet) aircraft such as a Cessna Citation, allowing aerial imaging from low altitudes to altitudes in excess of 40,000 feet, at speeds ranging from less than 100 knots to 400 knots.

The aircraft may be unpressurised or pressurised, and each camera hole may be open or contain an optical glass window as appropriate. Each camera hole may be optionally protected by a door which can be closed when the HyperCamera is not in operation.

In a preferred embodiment, as illustrated in FIGS. 1 through 5, a V5-300 HyperCamera comprises a camera unit 100 incorporating five detail cameras 110 and a relatively wider-angle overview camera 112. Each detail camera 110 has a detail lens 114, and the overview camera 112 has a overview lens 116.

The overview lens 116 is characterised by having a significantly wider angle than the detail lens 114. While it may be a true wide-angle lens, it may also be a normal lens or even a telephoto lens so long as it is significantly wider than the detail lens 114. Likewise, while the detail lens 114 may be a true telephoto lens, it may also be a normal lens or even a wide-angle lens so long as it is significantly narrower than the overview lens 116.

The cameras 110 and 112 are preferably commercial off-the-shelf (COTS) digital SLR (DSLR) cameras. The use of COTS cameras allows the system to be readily adapted to the latest and best available cameras. Alternatively or additionally, to provide imaging features not available in COTS cameras, such as non-mosaiced RGB imaging, multi-spectral imaging, and forward motion compensation, dedicated camera designs may also be utilised.

High-resolution COTS cameras are available with typical pixel counts ranging from 24 Mpixels to 36 Mpixels, from vendors such as Nikon and Canon. The 36 Mpixel Nikon D800 (and D810) DSLR camera is a particularly good choice for the present system.

DSLR cameras offer a wide range of high-quality lenses, allowing the system to be readily configured to operate at different altitudes and resolutions.

The system is readily adapted to a mixture of cameras. For example, a relatively more expensive camera with a higher pixel count may be employed as the overview camera. 70 Mpixel DSLR cameras are expected to be available in the near future, and a 70 Mpixel camera would be a good choice for the overview camera.

In the preferred embodiment the detail lenses 114 of the detail cameras 110 all have the same focal length, and the detail cameras 110 all have the same pixel size. Thus the camera unit 100 embodies two distinct camera resolutions—overview and detail. This is readily extended to multiple resolutions greater than two through the use detail lenses 114 with different focal lengths, and/or the use of detail cameras 110 with different pixel sizes. The camera unit 100 may also incorporate multiple overview cameras with different resolutions.

Each detail lens 114 and overview lens 116 may be a fixed-focus lens focused at infinity or a variable-focus lens. In the latter case the corresponding camera 110 and/or 112 incorporates an auto-focus mechanism.

Each detail camera 110 is bolted to a camera mount 140, which in turn is bolted to a center support 122. Each detail camera lens 114 is further secured by a clamp 144 which is bolted to the detail camera mount 140.

The overview camera is bolted to a camera mount 142, which in turn is bolted to the center support 122. The overview camera lens 116 is further secured by a clamp 146 which is bolted to the overview camera mount 142.

The camera mounts 140 and 142 isolate much of the structure of camera unit 100 from the specifics of individual camera models and lens sizes.

The center support 122 is attached to a pair of side supports 124a and 124b, and each side support 124 is in turn attached to a rear support 126 and a front support 128 to form a rigid frame 120.

Each side support 124 is attached to mount point block 130 via a set of four bolts, and the mount point block 130 is in turn attached to the rear support 126 or front support 128, as appropriate, via a further set of four bolts. The mount point blocks 130 thereby provide the attachment mechanism between the side supports 124 and the rear and front supports 126 and 128.

Each of the side supports 124 and the rear and front supports 126 and 128 has a C-shaped cross-sectional profile to minimise weight while maximising rigidity, while the center support 122 is pocketed to minimise weight while maximising rigidity.

Each mount point block 130 is solid, and serves the additional purpose of providing a point of attachment between the camera unit 100 and a survey aircraft, as described below.

All parts are made from light-weight aluminium, except for fasteners which are made from steel.

The rear support 126 and the front support 128 hold three power and control distribution boxes 150. Each box 150 distributes power and control signals to a pair of cameras. For clarity, the power and control cabling between the boxes 150 and the cameras 110 and 112 is omitted in the figures.

In the preferred embodiment each detail camera 110 has a lens 114 with a focal length of 300 mm suitable for high-resolution imaging at relatively high altitudes. For example, when using a 36 Mpixel Nikon D800 camera (which has a 4.88 micron pixel pitch), a 300 mm lens allows a ground sampling distance (GSD) of 30 cm at 60,000 feet, 20 cm at 40,000 feet, 10 cm at 20,000 feet, 8 cm at 16,000 feet, 6 cm at 12,000 feet, 4 cm at 8,000 feet, 2 cm at 4,000 feet, 1 cm at 2,000 feet, etc.

Assuming the detail cameras 110 and overview camera 112 have similar pixel counts and pixel sizes, the overview camera 112 ideally has a lens 116 with a focal length that is between 4 and 8 times shorter than the focal length of the detail lens 114, as discussed further below. I.e. for a 300 mm detail lens 114, suitable focal lengths for the overview lens 116 range from about 40 mm to 75 mm. For illustrative purposes the present system utilises a 50 mm overview lens 116.

Figure 6:
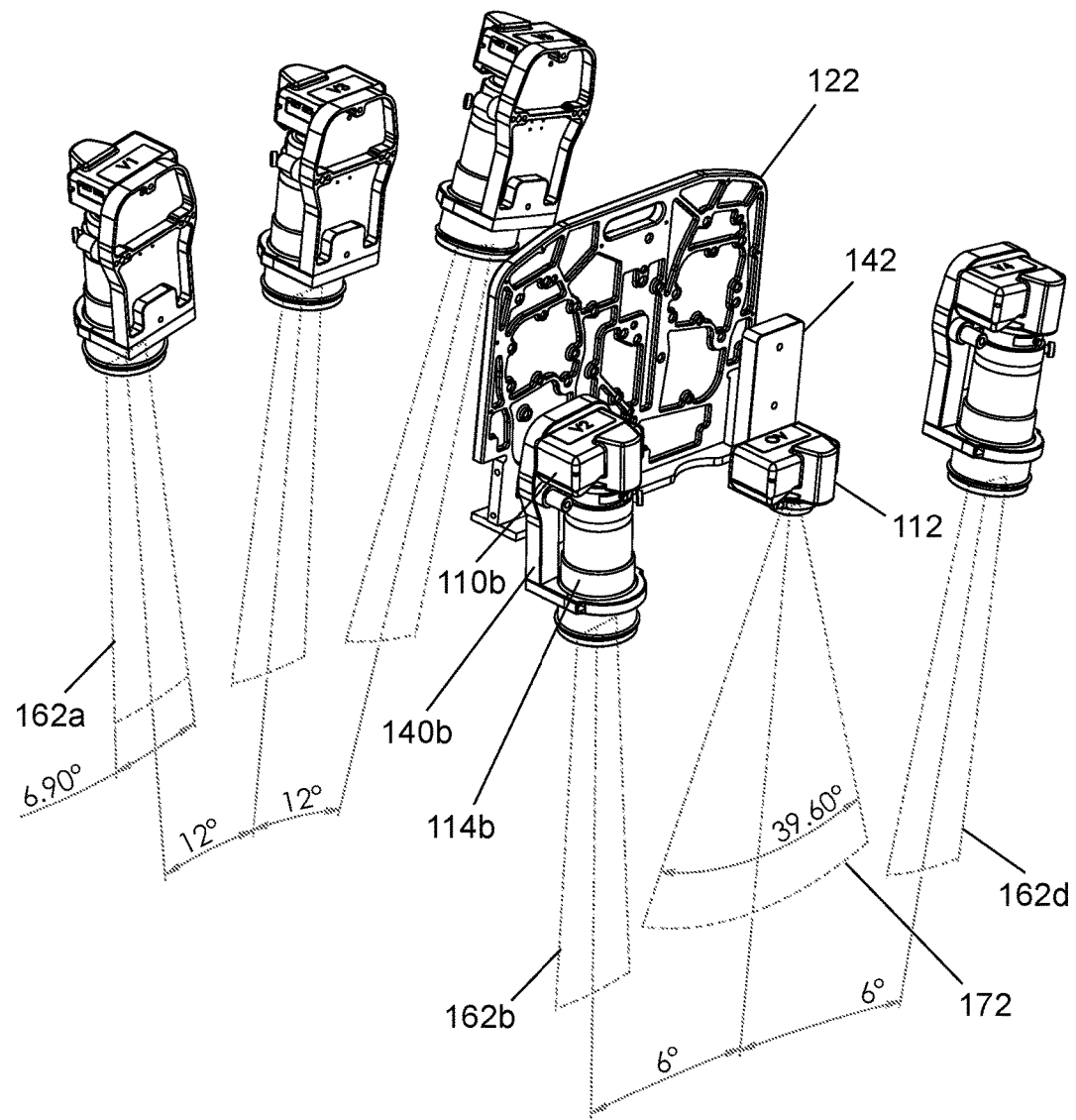
FIG. 6 shows an exploded view of the cameras and the central support of the camera unit, with the field of view of each camera.

FIG. 6 shows the 6.90-degree lateral field of view 162 of each of the five detail cameras 110 with 300 mm lenses 114, and the 39.60-degree lateral field of the overview camera 112 with a 50 mm lens 116.

In this specification, the lateral direction is the direction perpendicular to the direction of flight 220, and the longitudinal direction is the direction parallel to the direction of flight 220.

As shown, the detail cameras are angled 6 degrees apart laterally, i.e. slightly less than their 6.90-degree fields of view 162, so that the fields of view 162 overlap slightly.

Using 36 Mpixel Nikon D800 cameras, the five detail cameras 110 have an aggregate field of view with a pixel count of approximately 160 Mpixels, i.e. excluding overlap.

Stock telephoto lenses suitable for use as detail lenses 114 are available in a variety of focal lengths, typically including 85 mm, 105 mm, 135 mm, 180 mm, 200 mm, 300 mm, 400 mm, 500 mm, 600 mm, 700 mm, and 800 mm.

At 20,000 feet a 400 mm lens on a Nikon D800 camera allows a GSD of 7.4 cm, a 600 mm lens a GSD of 5.0 cm, and an 800 mm lens a GSD of 3.7 cm.

Stock normal and wide-angle lenses suitable for use as an overview lens 116 are available in a variety of focal lengths, typically including 10.5 mm, 14 mm, 16 mm, 18 mm, 20 mm, 21 mm, 24 mm, 28 mm, 35 mm, 40 mm, 45 mm, 50 mm, 55 mm, 60 mm and 70 mm.

The camera unit 100 is readily adapted for different models and sizes of cameras 110 (and 112) and lenses 114 (and 116) via different camera mounts 140 (and 142) and clamps 144 (and 146). For extremely long lenses a taller center support 122 can be used.

Figure 7:
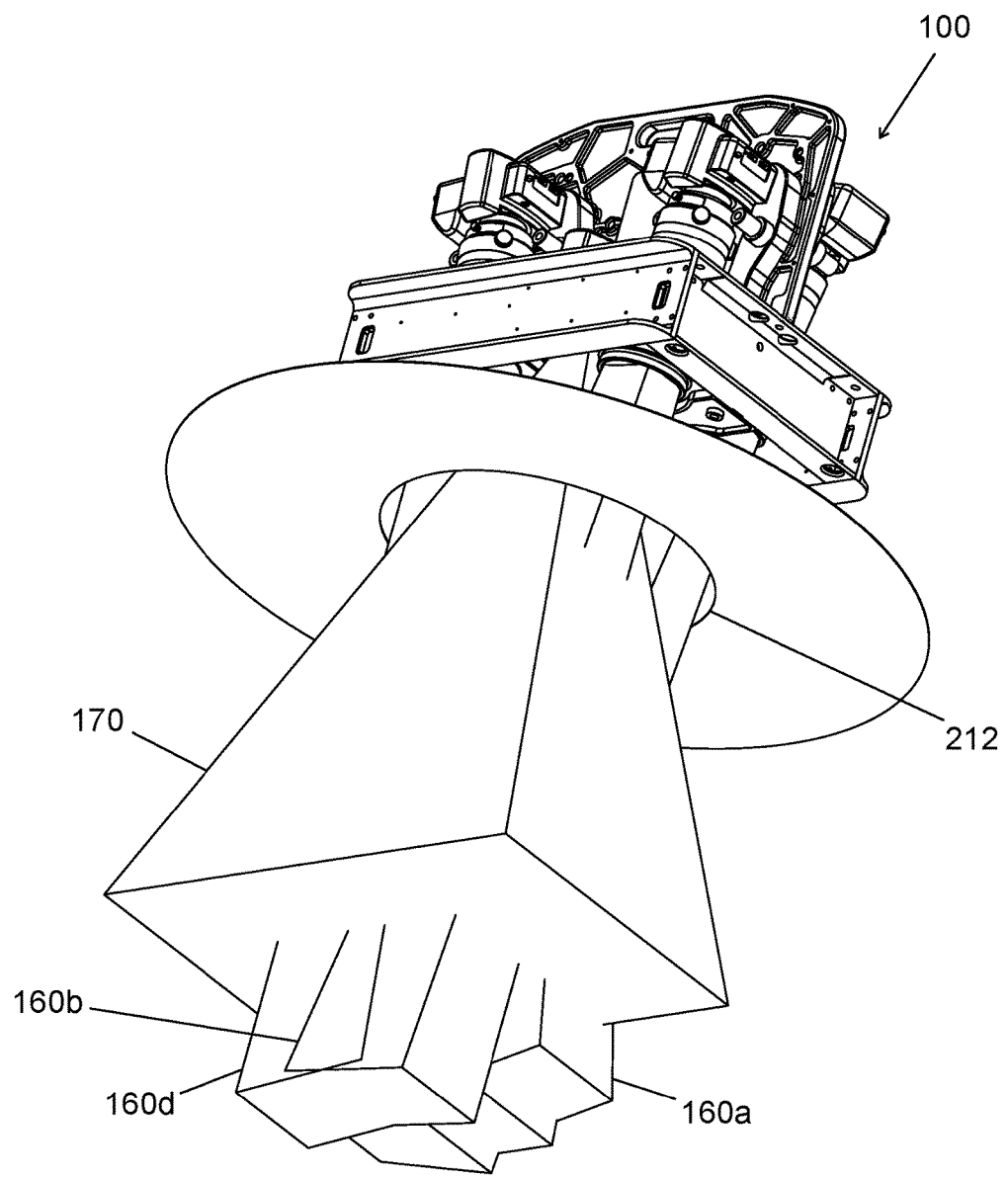
FIG. 7 shows the camera unit from below, with its combined fields of view passing through the aperture of an aircraft camera hole.

As shown in FIG. 6 and FIG. 7, the detail cameras are angled inwards so that their fields of view 162 cross over directly below the camera unit 100, creating a waist of minimum diameter where the fields of view pass through the camera hole 212. This makes the camera unit 100 compatible with standard 20-inch camera holes, as well as camera holes as small as about 17 inches.

Figure 8:
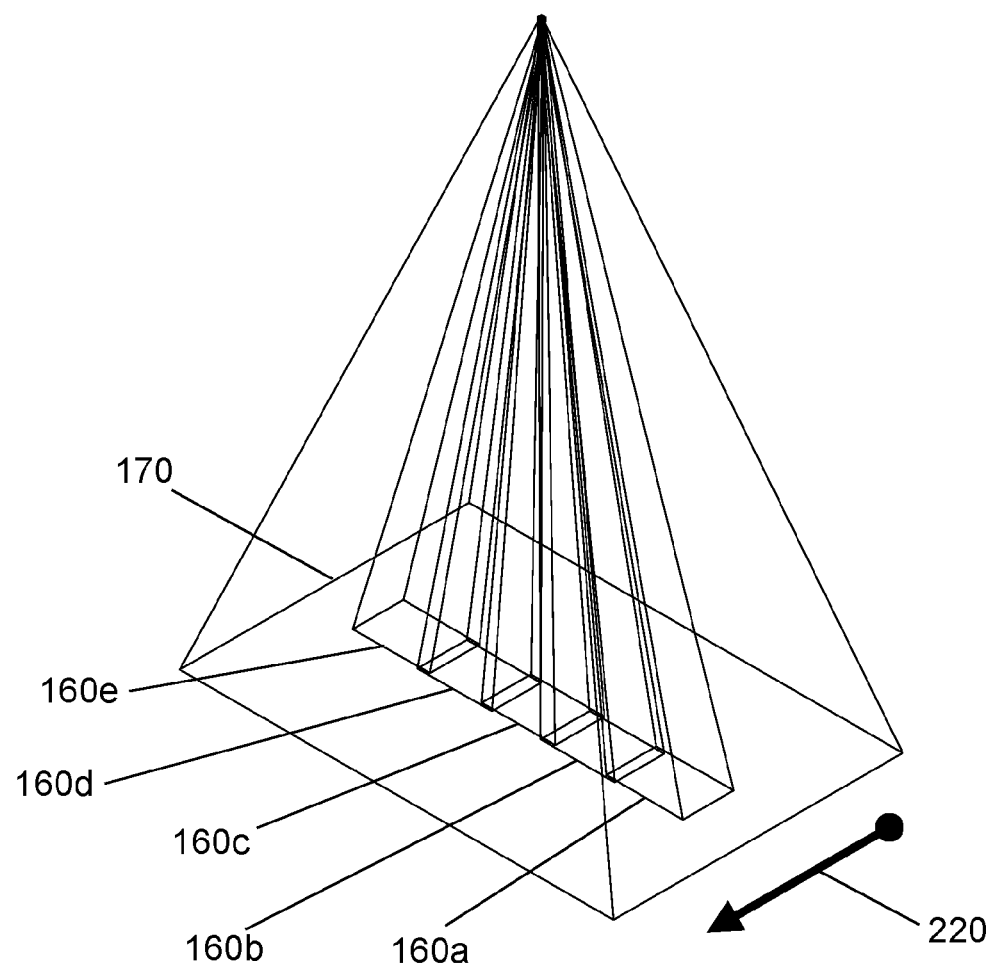
FIG. 8 shows the overview field of view and the five overlapping detail fields of view of the camera unit.

FIG. 8 shows the projection of the three-dimensional fields of view 160 and 170 of the detail cameras 110 and overview camera 112 onto a ground plane. It shows how the detail field of views 160 overlap in a direction perpendicular to the direction of flight 220.

Figure 9:
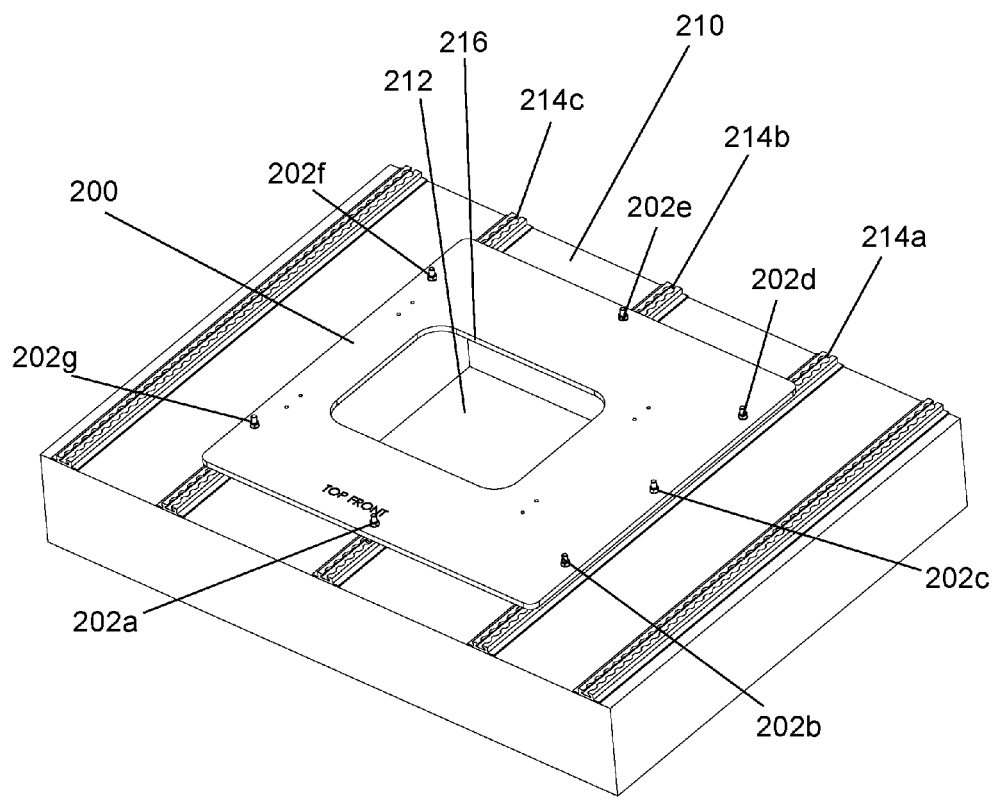
FIG. 9 shows the adapter plate of the HyperCamera mounted on seat tracks on the floor of an aircraft.

FIG. 9 shows an adapter plate 200 that attaches to the seat tracks 214 of an aircraft, a Cessna 208 in this case, via standard seat track fasteners 202. The adapter plate has an aperture 216 which exposes a camera hole 212 through the floor 210 of the aircraft.

Figure 10:
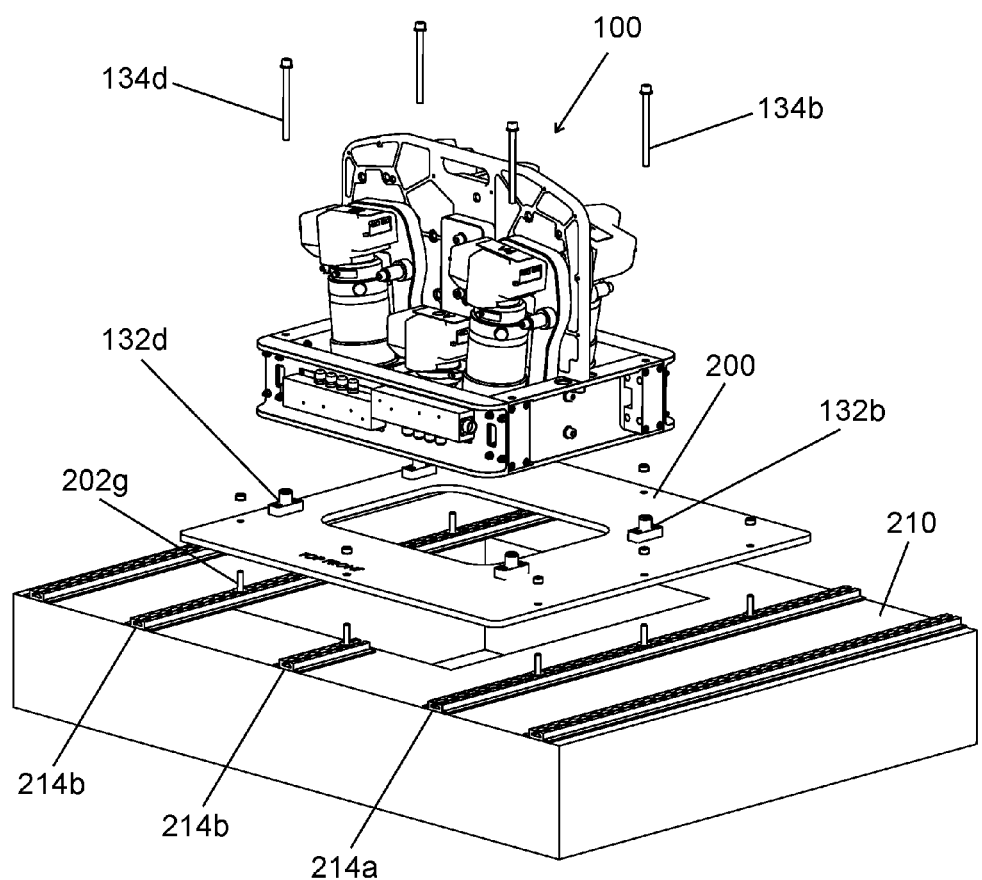
FIG. 10 shows an exploded view of the camera unit, the adapter plate, and seat tracks on the floor of an aircraft.

FIG. 10 shows an exploded view of the camera unit 100, adapter plate 200, and the aircraft floor 210. The adapter plate 200 is designed to attach the camera unit 100 to a particular aircraft, and isolates the design of the camera unit 100 from aircraft specifics. A different adapter plate is designed for each aircraft attachment variation, e.g. due to different seat track spacings, or because the aircraft's camera hole installation includes its own mounting points.

Four mount points 132 are bolted to the adapter plate, with each mount point 132 mating with a recess in the base of its corresponding mount point block 134. A mount bolt 143 securely attaches each mount point block 134 to its corresponding mount point 132, thus attaching the camera unit 100 to the adapter plate 200.

The adapter plate 200 allows the camera unit 100 to be easily installed in and subsequently removed from an aircraft via installation and removal of the four mount bolts 143. The adapter plate 200 is itself generally easily installed in and removed from an aircraft, requiring no modification to the aircraft (assuming a suitable camera hole is already installed). The installation of external camera pod is generally a much more complicated operation.

Figure 11:
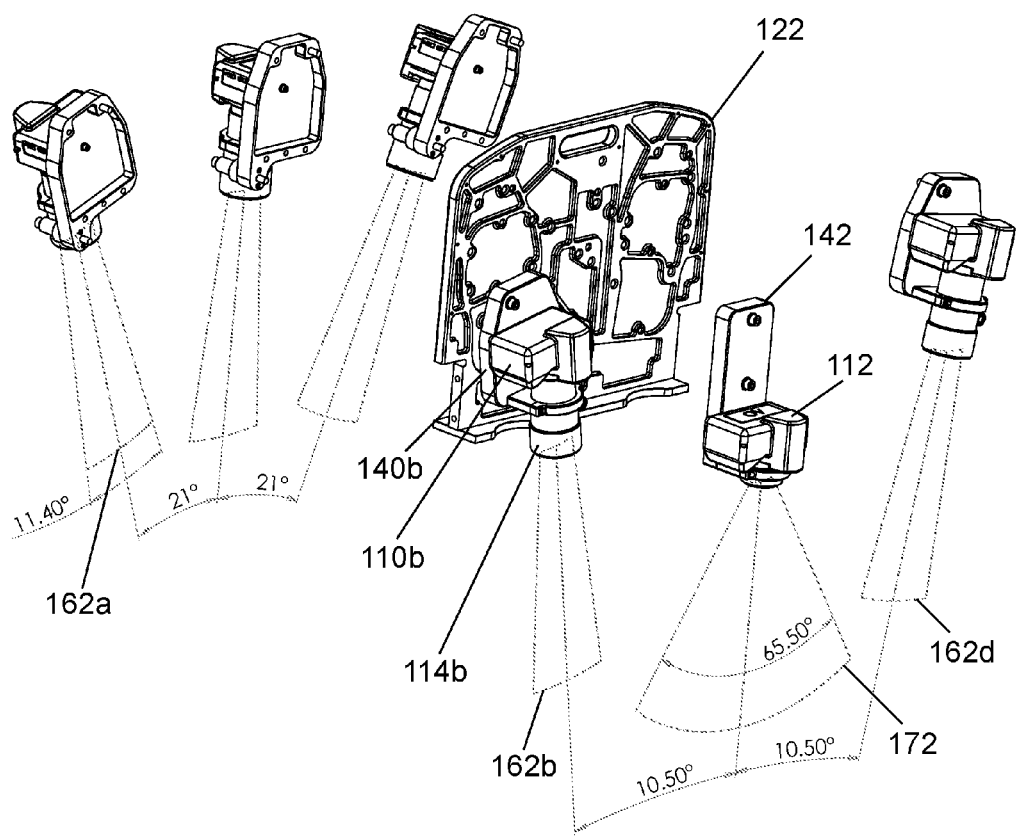
FIG. 11 shows an exploded view of the cameras and the central support of a wider-angle version of the camera unit.

FIG. 11 shows a V5-180 HyperCamera unit 100 that utilises shorter 180 mm lenses 114 for the detail cameras 110, and a matching 28 mm lens 116 for the overview camera 112.

When using a 36 Mpixel Nikon D800 camera (which has a 4.88 micron pixel pitch), a 180 mm lens allows a ground sampling distance (GSD) of 9.9 cm at 12,000 feet, 8.3 cm at 10,000 feet, 6.6 cm at 8,000 feet, 5 cm at 6,000 feet, 3.3 cm at 4,000 feet, and so on.

FIG. 11 shows the 11.40-degree lateral field of view 162 of each of the five detail cameras 110 with 180 mm lenses 114, and the 65.50-degree lateral field of the overview camera 112 with a 28 mm lens 116.

As shown, the detail cameras are angled 10.50 degrees apart laterally, i.e. slightly less than their 11.40-degree fields of view 162, so that the fields of view 162 overlap slightly.

Figure 12:
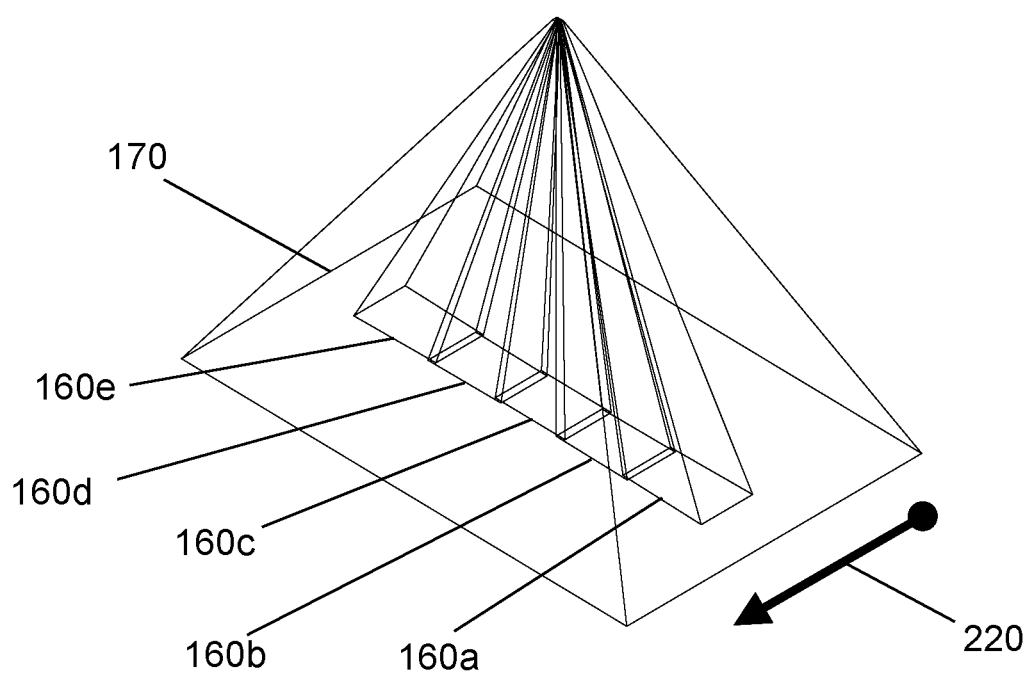
FIG. 12 shows the overview field of view and the five overlapping detail fields of view of the V5-180 HyperCamera unit.

FIG. 12 shows the projection of the three-dimensional fields of view 160 and 170 of the detail cameras 110 and overview camera 112 of FIG. 10 onto a ground plane. It shows how the detail field of views 160 overlap in a direction perpendicular to the direction of flight 220, and how the wider fields of view associated with the shorter lenses leads to a lower flying altitude for the same footprint on the ground, i.e. in comparison to FIG. 8.

Figure 13:
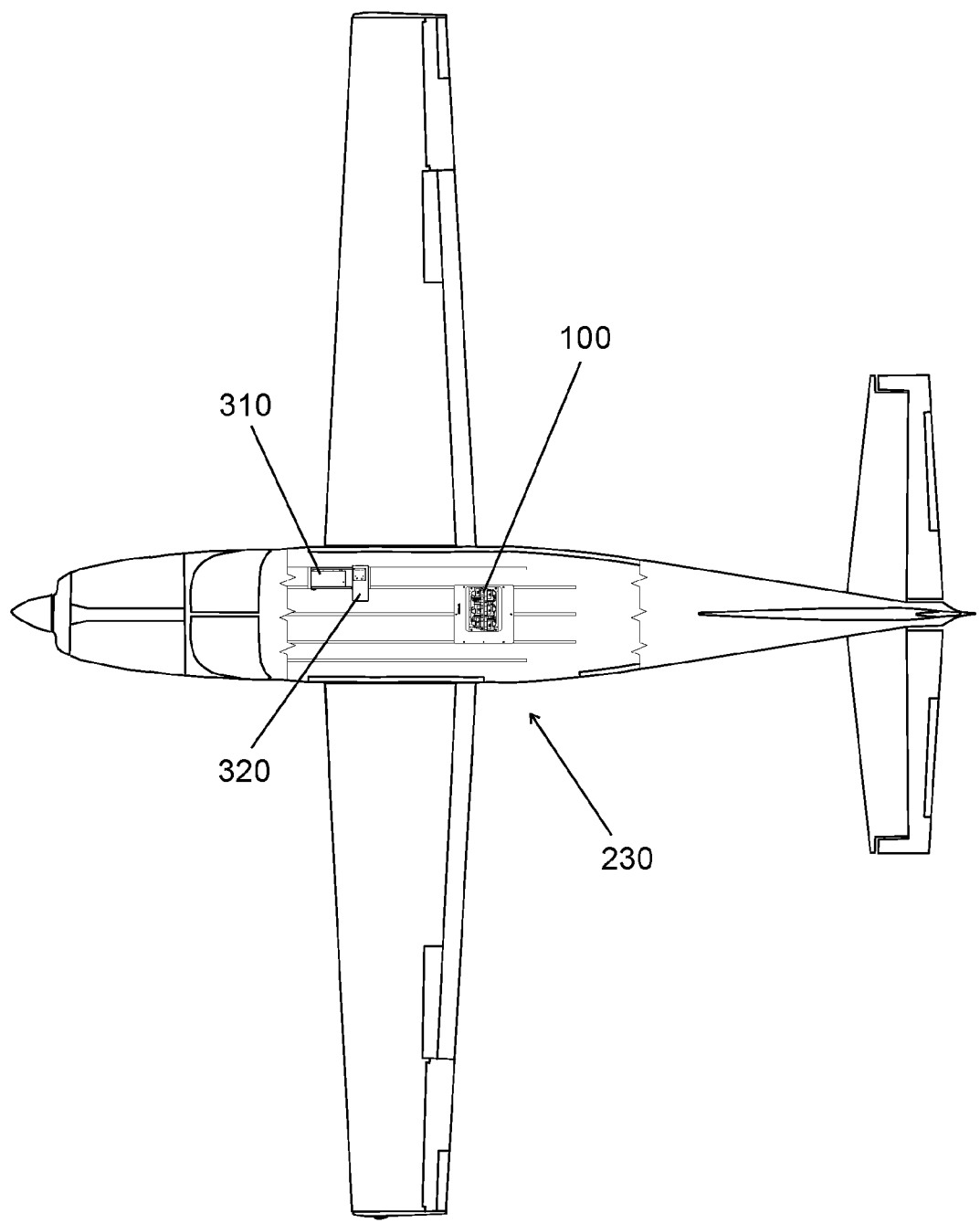
FIG. 13 shows a plan view of the HyperCamera installed in a Cessna 208 aircraft.
Figure 14:
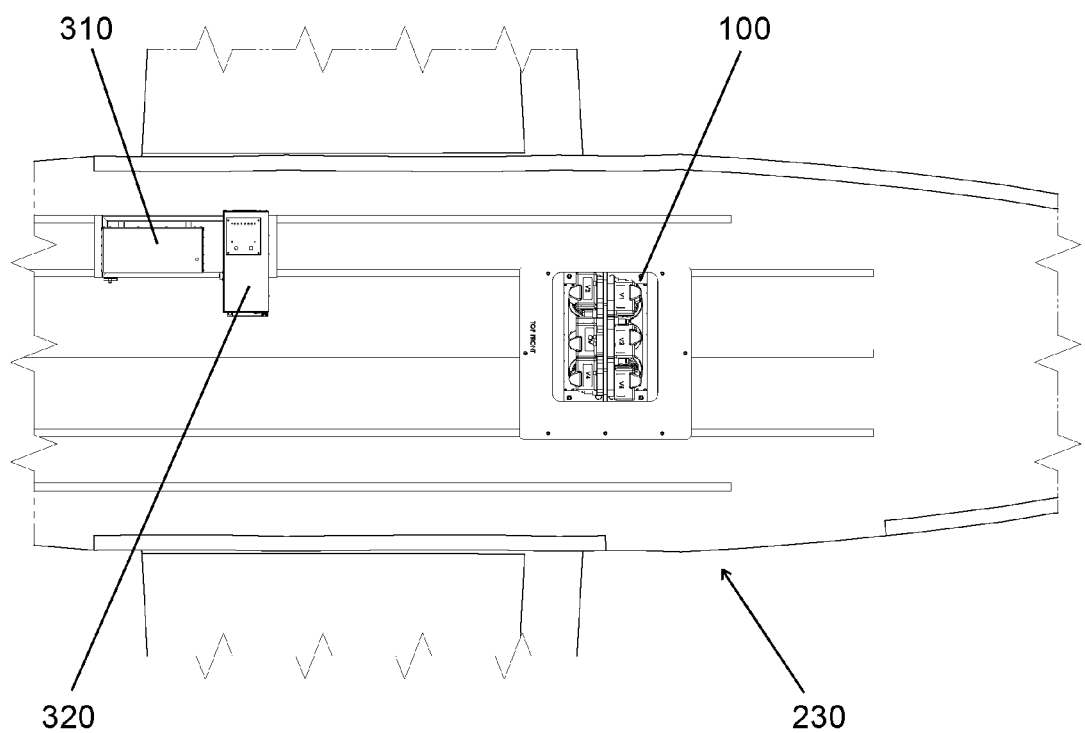
FIG. 14 shows a detailed plan view of the V5-300 HyperCamera installed in a Cessna 208 aircraft.

FIG. 13 and FIG. 14 show plan views of a Cessna 208 survey aircraft 230 carrying a camera unit 100 installed centrally over a camera hole. The figures also show a camera control unit 310 (CCU) and battery unit 320 used to control and power the camera unit 100. These are described in more detail below. For clarity, the cabling connecting the CCU 310, battery unit 320 and camera unit 100 is omitted.

Figure 15:
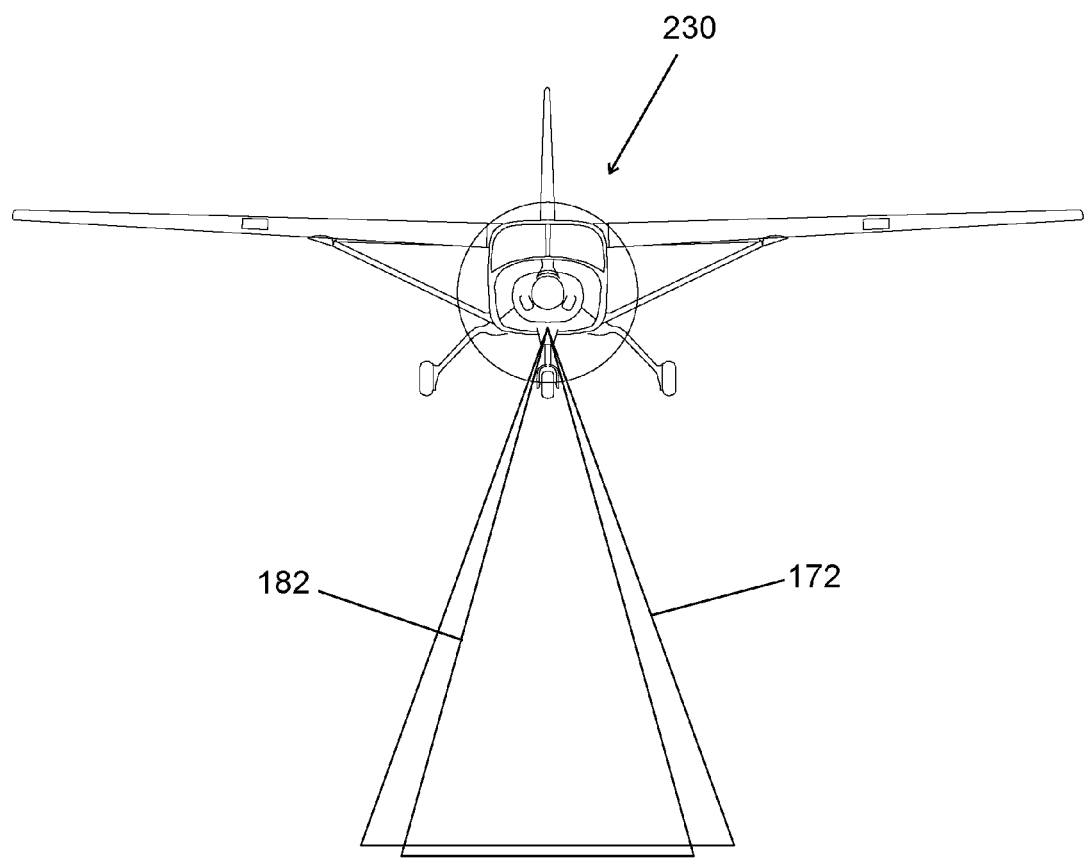
FIG. 15 shows a front elevation of a Cessna 208 aircraft carrying a V5-300 HyperCamera, and the resultant overview and aggregate detail fields of view.

FIG. 15 shows a front elevation of the Cessna 208 survey aircraft 230 carrying a HyperCamera, and shows the lateral overview field of view 172 of the camera unit 100, and the aggregate lateral detail field of view 182 of the camera unit 100. The aggregate lateral detail field of view 182 is the aggregate of the five individual overlapping lateral detail fields of view 162.

Figure 16:
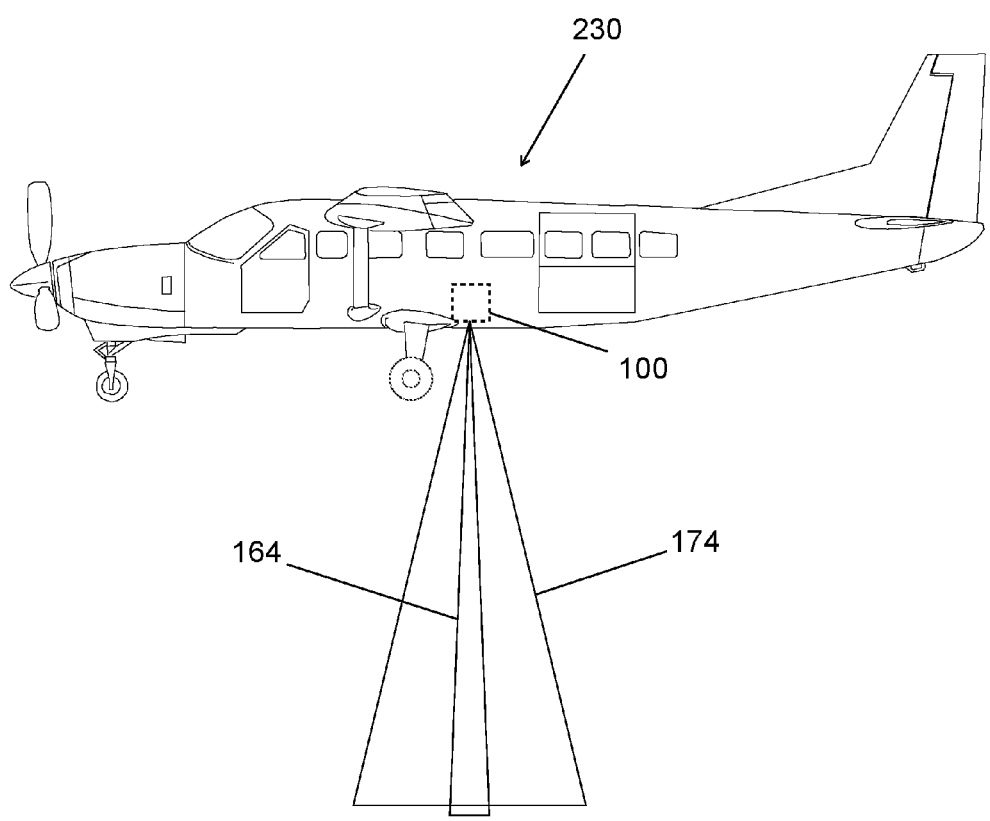
FIG. 16 shows a side elevation of a Cessna 208 aircraft carrying a V5-300 HyperCamera, and the resultant overview and aggregate detail fields of view.

FIG. 16 shows a side elevation of the Cessna 208 survey aircraft 230 carrying a HyperCamera, and shows the longitudinal overview field of view 174 of the camera unit 100, and the longitudinal detail field of view 164 of the camera unit 100.

Figure 17:
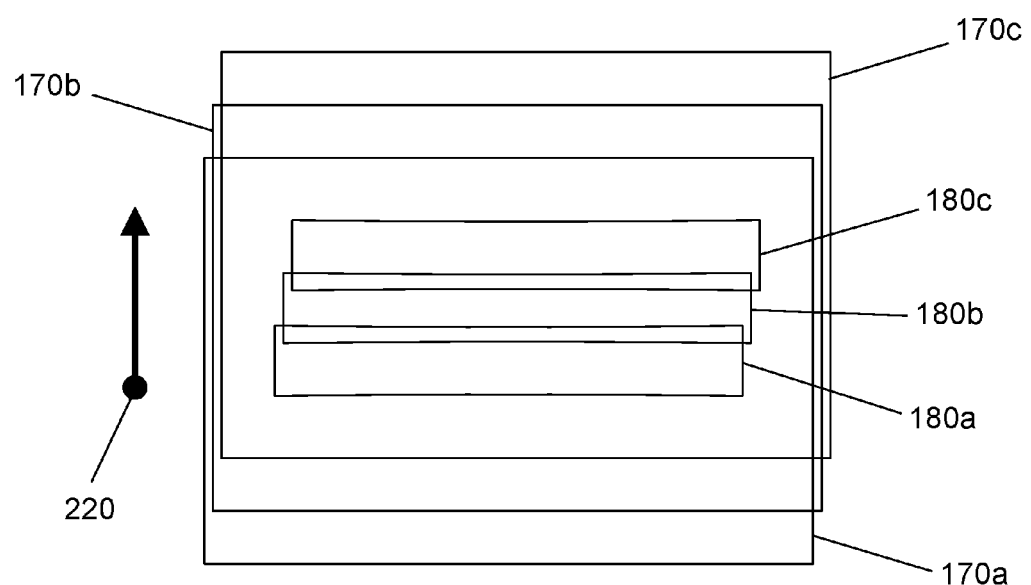
FIG. 17 shows the overlapping fields of view of three successive shots.

FIG. 17 shows the overlapping overview fields of view 170 and aggregate detail fields of view 180 of three successive shots in the direction of flight 220. The aggregate detail field of view 180 is the aggregate of the five individual overlapping detail fields of view 160. At the camera firing rate illustrated in the figure (i.e. as implied by the longitudinal overlap), the aggregate detail fields of view 180 overlap by about 20% longitudinally, while the overview fields of view 170 overlap by about 85% longitudinally.

Figure 18:
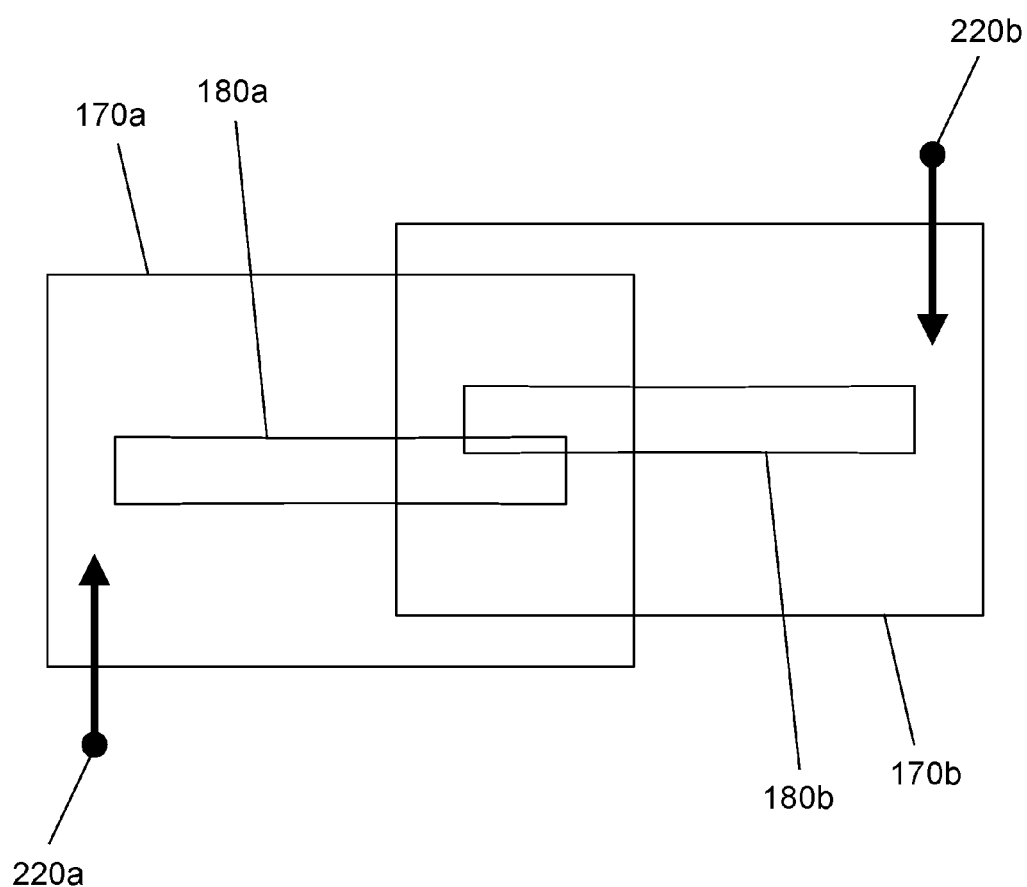
FIG. 18 shows the overlapping fields of view of shots in adjacent flight lines.

FIG. 18 shows the overlapping overview fields of view 170 and aggregate detail fields of view 180 of two shots from adjacent flight lines, i.e. flown in opposite directions 220. At the flight-line spacing illustrated in the figure, the aggregate detail fields of view 180 overlap by between 20% and 25% laterally, while the overview fields of view 170 overlap by about 40% laterally.

Assuming the detail cameras 110 and the overview camera 112 have similar pixel counts and pixel sizes, the size of the lateral overview field of view 172 and the size of the lateral aggregate detail field of view 182 are similar when the ratio of the focal length of the detail camera lens 114 to the focal length of the overview camera lens 116 is about 6, and useful lens combinations can be chosen with focal length ratios between about 4 and 8.

Figure 19:
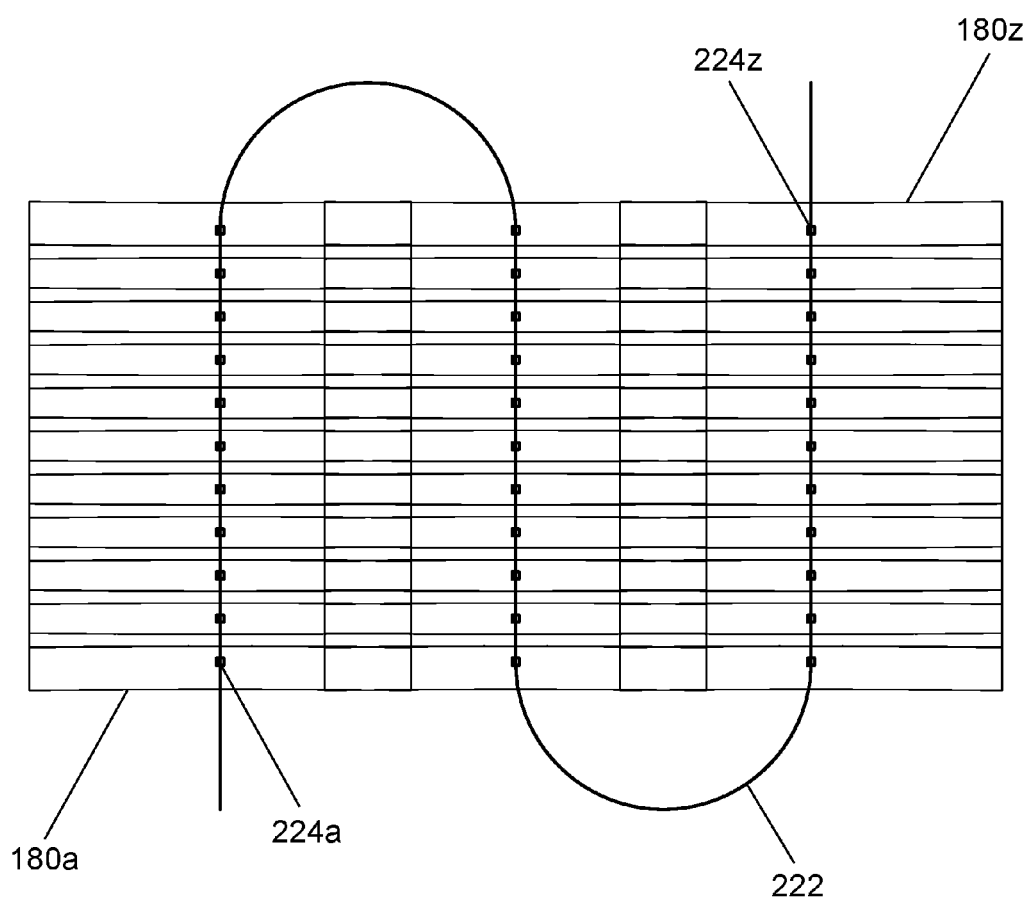
FIG. 19 shows the overlapping aggregate detail fields of view of a succession of shots along three adjacent flight lines.

FIG. 19 shows the overlapping aggregate detail fields of view 180 of a succession of shots along three adjacent flight lines that are part of a typical serpentine flight path 222, i.e. a subset of the flight lines that would make up a typical large-area survey. For clarity the corresponding overview fields of view 170 are omitted. The figure also shows the shot position 224 corresponding to each aggregate detail field of view 180, i.e. the position of the survey aircraft 230.

As already noted, traditional single-resolution aerial surveys are typically operated with 60/40 overlap, i.e. 60% forward (or longitudinal) overlap, and 40% side (or lateral) overlap. With the multi-resolution HyperCamera operated as shown in FIGS. 17 through 19, overview photos are captured with better than 85/40 overlap, and detail photos are captured with only 20/20 overlap at best.

Compared with a traditional single-resolution aerial camera system and a comparable aggregate detail pixel count (e.g. 160 Mpixel), the HyperCamera is between 2 and 3 times more efficient, as detailed below, with respect to both reduced survey flying time and fewer photos to process. The HyperCamera also has a higher efficiency than many aerial camera systems due to its high (detail) pixel count alone.

As an alternative to capturing both overview and detail photos, the HyperCamera can be used to capture detail photos only, with higher overlap (e.g. 60/40 rather than 20/20), to allow the creation of an orthomosaic with higher spatial accuracy, but at greater capture and processing cost. In this case the overview camera 112 can be omitted or used for another purpose.

To analyse the relative efficiency of a multi-resolution HyperCamera, assume a multi-resolution HyperCamera configuration with a lateral overlap of X %, a longitudinal overlap of Y %, N detail cameras 110, and M overview cameras 112, and for comparison, a single-resolution HyperCamera configuration with lateral overlap of A %, longitudinal overlap of B %, N detail cameras, and no overview camera. Assuming X is smaller than A, the improvement in lateral efficiency, as reflected in a greater flight-line spacing and shorter flying time and fewer detail photos captured, is given by $(1-X)/(1-A)$. Likewise, assuming Y is smaller than B, the improvement in longitudinal efficiency, as reflected in a greater shot spacing and shorter flying time and fewer detail photos captured, is given by $(1-Y)/(1-B)$. The overall improvement in efficiency is given by $(1-X)(1-Y)/(1-A)(1-B)$. This needs to be discounted by the overhead of capturing overview photos, i.e. multiplied by a factor of $(N/(N+M))$. For X/Y=20/20, A/B=60/40, N=5, and M=1, the net efficiency improvement is 2.2.

The greater efficiency comes at the cost of performing some photogrammetric calculations at the lower resolution of the overview camera 112 rather than at the higher resolution of the detail cameras 110. However, this is at least partially compensated for by the greater overlap between overview photos than in traditional practice.

Figure 20:
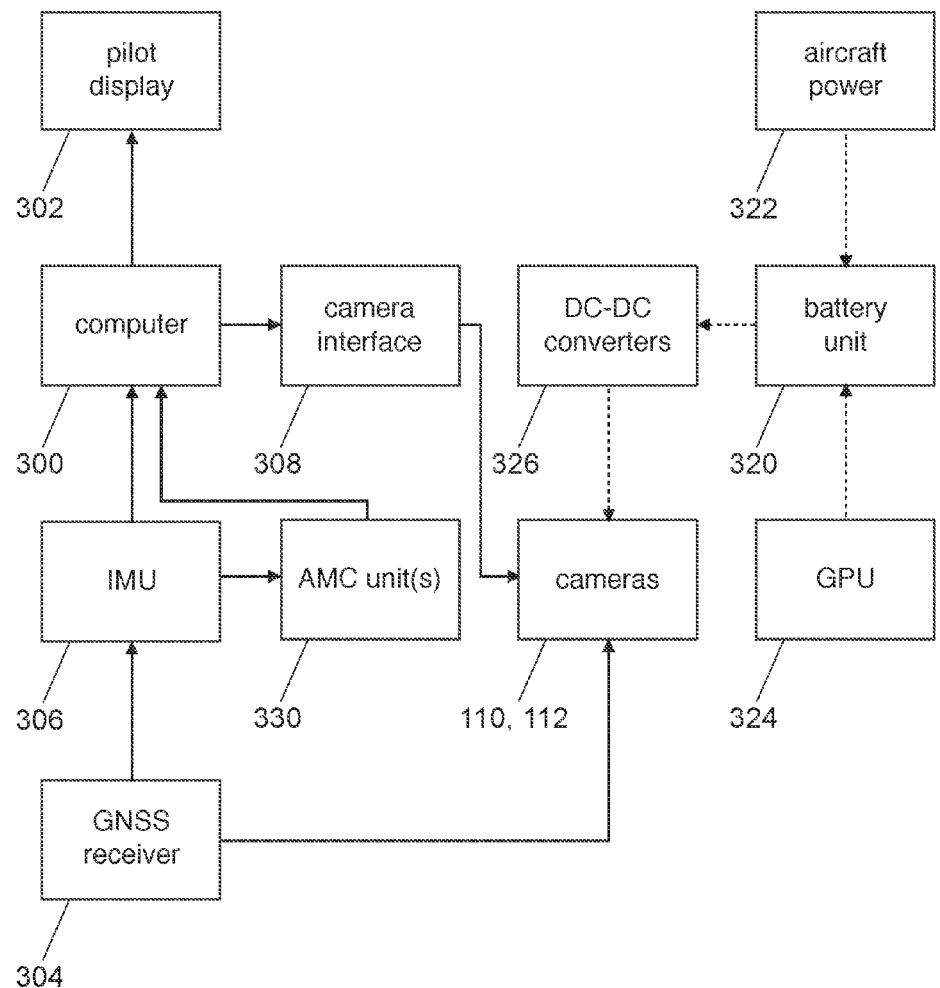
FIG. 20 shows a block diagram of a power and control system for the HyperCamera.

FIG. 20 shows a block diagram of a power and control system for the camera unit 100. The detail cameras 110 and overview camera 112 are controlled by a computer 300 via a camera interface 308, which may consist of a set of digital switches that trigger the remote control interfaces of the cameras.

The computer 300 uses one or more Global Navigation Satellite System (GNSS) receiver 304 to monitor the position and speed of the survey aircraft 230 in real time. The GNSS receiver(s) may be compatible with a variety of space-based satellite navigation systems, including the Global Positioning System (GPS), GLONASS, Galileo and BeiDou.

The computer 300 provides precisely-timed firing signals to the cameras 110 and 112 via the camera interface 308, to trigger camera exposure, according to a stored flight plan and the real-time position and speed of the aircraft. If a camera 110 and/or 112 incorporates an auto-focus mechanism then the computer 300 also provides a focus signal to each such camera to trigger auto-focus prior to exposure.

The computer 300 fires the overview camera 112 and the detail cameras 110 at the same rate. Alternatively, the computer 300 may fire the overview camera 112 at a different rate to the detail cameras 110, i.e. either a higher rate or lower rate, to achieve a different overlap between successive overview photos, i.e. either a higher overlap or a lower overlap, independent of the overlap between successive detail photos. The computer 300 may fire the cameras simultaneously, or it may stagger the timing of the firing, e.g. to achieve a different alignment of photos longitudinally, or to reduce peak power consumption.

The flight plan describes each flight line making up the survey, and the nominal camera firing rate along each flight line required to ensure that the necessary overlap is maintained between successive shots. The firing rate is sensitive to the elevation of the terrain below the aircraft, i.e. the higher the terrain the higher the firing rate needs to be. It is adjusted by the computer 300 according to the actual ground speed of the aircraft, which may vary from its nominal speed due to wind and the pilot's operation of the aircraft.

The computer 300 also uses the flight plan and real-time GNSS position to guide the pilot along each flight line via a pilot display 302.

As shown in FIG. 20, the position data from the GNSS receiver is optionally augmented with orientation information (roll, pitch and yaw) from an inertial measurement unit 306 (IMU). It allows the computer 300 to provide enhanced feedback to the pilot on how closely the pilot is following the flight plan, and allows more accurate processing of the photos. In the absence of the IMU 306 the GNSS receiver connects directly to the computer 300.

Each camera 110 and 112 stores its shots locally, e.g. in removable flash memory. This eliminates the need for centralised storage in the HyperCamera system, and the need for a high-bandwidth data communication channel between the cameras and the centralised storage.

The GNSS position of each shot may be delivered to each camera 110 and 112, to allow the camera to tag each photo with its GNSS position.

One or more optional angular motion compensation (AMC) units 330, responsive to the orientation reported by the IMU 306, correct the orientation of the cameras so that they maintain a consistent pointing direction over time, despite the aircraft rolling, pitching or yawing during flight. This ensures that the captured photos can be used to create an orthomosaic without gaps, while allowing the overlap between successive shots and between adjacent flight lines to be minimised.

The AMC unit 330 may consist of a platform with two or three axes of rotation (i.e. roll and pitch, or roll, pitch and yaw) upon which the HyperCamera unit 100 is mounted. Commercially-available AMC or stabilisation platforms 330 include the PAV series from Leica Geosystems, including the PAV100, and the PV-15G from PV Labs, e.g. as described in U.S. Pat. No. 6,263,160 (Lewis), the contents of which are herein incorporated by reference.

Alternatively or additionally, the AMC units 330 may comprise one or more beam-steering mechanisms in the optical path of each camera (or group of cameras), whereby the pointing direction of the cameras is corrected by beam-steering. For example, pitch and roll compensation may be provided by beam-steering mechanism(s), while yaw compensation is provided by a separate AMC platform 330.

Angular motion compensation becomes increasingly important as the flying altitude is increased and/or the GSD is decreased.

Motion blur due to the forward motion of the aircraft is equal to the speed of the aircraft multiplied by the exposure time of the camera. Once motion blur becomes a significant fraction of (or exceeds) the GSD it becomes useful to provide a forward motion compensation (FMC) mechanism to reduce or eliminate motion blur. FMC can be provided in a number of ways, including translating or rotating the optical axis of the camera (by moving the image sensor, or an intermediate mirror, or the camera itself), or by time delayed integration (TDI) of adjacent lines of pixels in the image sensor.

The computer 300 stores the GNSS position of each shot. This is used during subsequent processing of the photos to produce an accurate orthomosaic. The computer 300 also stores the orientation of each shot if the IMU 306 is present, and stores the corrected orientation of each shot if an AMC unit 330 is present, based on correction information from the AMC.

The cameras 110 and 112 are powered by a battery unit 320. The battery unit 320 provides a voltage higher than the voltage required by all connected components, e.g. between 24V and 28V, and the voltage requirement of each connected component is provided via a DC-DC converter 326. For example, a Nikon D800 camera requires less than 10V. Additional DC-DC converters 326 also provide appropriate voltages to power the computer 300, the pilot display 302, the GNSS receiver 304, and the IMU 306. For clarity these power connections are omitted in FIG. 20.

The battery unit 320 contains two 12V (nominal) batteries or a single 24V (nominal) battery. It contains a charging circuit that allows it to be trickle-charged from an aircraft with a suitable auxiliary power source 322, allowing it to remain charged at all times. It may also be charged on the ground from a ground power unit 324 (GPU).

The camera interface 308 and DC-DC converters 326 may be housed in a camera control unit 310 (CCU). This may additionally include a USB interface to allow the computer 300 to control the camera interface.

The DC-DC converters 326 that provide power to the cameras 110 and 112 may be located in the CCU 310 or closer to the cameras in the distribution boxes 150.

Figure 21:
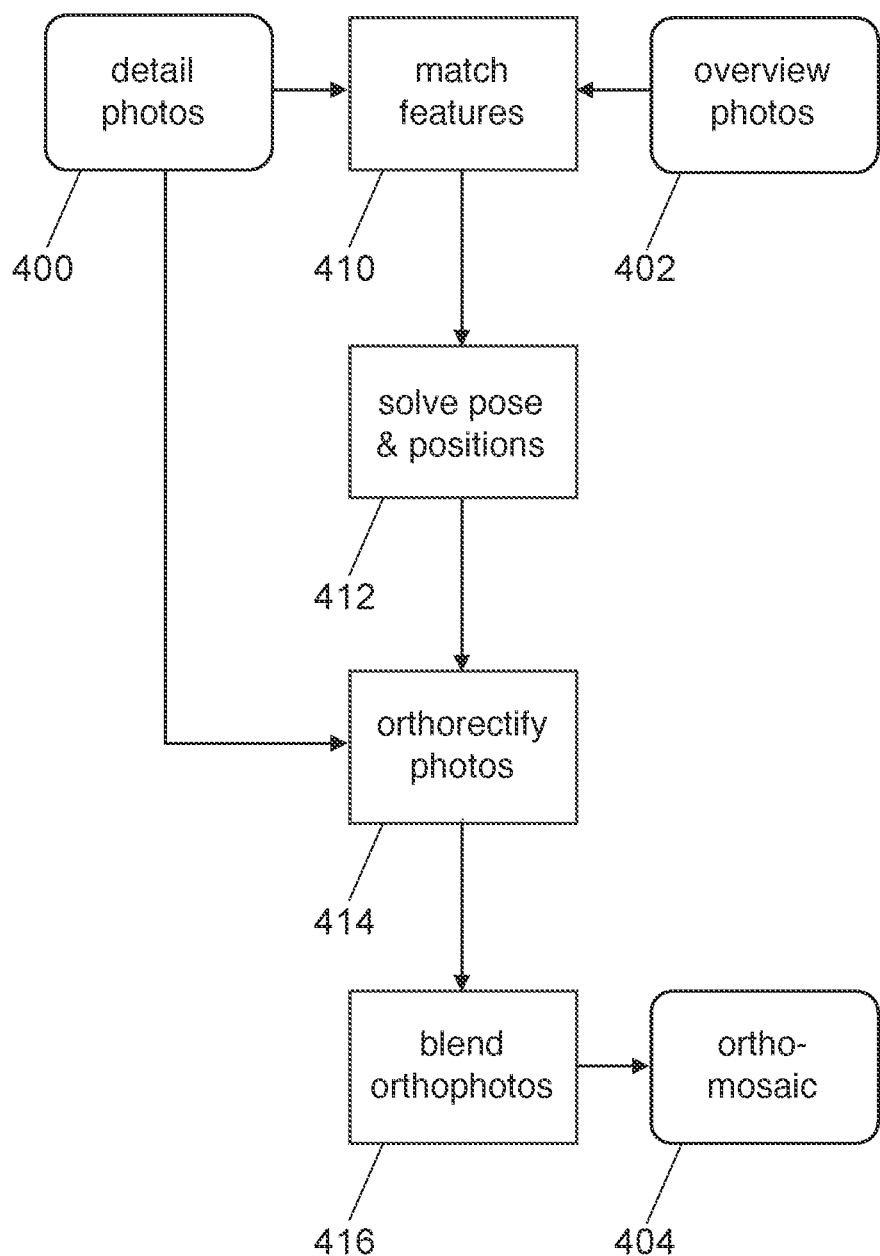
FIG. 21 shows a photogram metric process flow for efficiently creating an orthomosaic from multi-resolution HyperCamera photos.

Photos captured by the HyperCamera are intended to be seamlessly stitched into an orthomosaic, and FIG. 21 shows a photogrammetric process flow for efficiently creating an orthomosaic from multi-resolution HyperCamera photos. The process operates on detail photos 400 captured by the detail cameras 110, and overview photos 402 captured by the overview cameras 112.

The process consists of four main steps: (1) features are automatically detected in each of the photos 400 and 402 and matched between photos (step 410); bundle adjustment is used to iteratively refine initial estimates of the real-world three-dimensional position of each feature, as well as the camera pose (three-dimensional position and orientation) and camera calibration (focal length, radial and tangential distortion) associated with each photo (at step 412); each detail photo 400 is orthorectified according to its camera pose and terrain elevation data (at step 414); and the orthorectified photos (orthophotos) are blended to form the final orthomosaic 404 (at step 416).

The elevation data (used at step 414) may be derived from the three-dimensional feature positions (refined during step 412); and/or may be derived from dense multi-view stereo matching between photos (see, for example, U.S. Pat. No. 8,331,615 (Furukawa), and U.S. Pat. No. 8,634,637 (Hirschmueller et al), the contents of both of which are herein incorporated by reference); and/or may be obtained from another source such as a LIDAR survey of the area of interest. The elevation data may be in the form of a raster or vector digital elevation model (DEM), or in the form a three-dimensional point cloud, or in the form of a three-dimensional geometric model. It may include surface features such as vegetation and buildings, or may describe the bare earth.

The accuracy of the orthomosaic 404 derives from the high overlap between lower-resolution overview photos 402, while detail in the orthomosaic 404 derives from the higher-resolution detail photos 400.

As an alternative, as noted above, a survey may be flown with higher overlap between the detail photos 400, and the orthomosaic may be created from the detail photos 400 only.

The orthomosaic is typically stored as an image pyramid, i.e. within which different (binary) zoom levels are pre-computed for fast access at any zoom level. Lower zoom levels in the pyramid are generated from higher zoom levels by low-pass filtering and subsampling, thus the entire pyramid may be generated from the detail-resolution orthomosaic. As an alternative, lower zoom levels may be generated from an orthomosaic created from the overview photos 402, in which case the overview photos 402 are also orthorectified and blended as described above for the detail photos 400.

An initial estimate of the camera pose of each photo, subsequently refined by the bundle adjustment process (at step 412), is derived from the GNSS position of each photo, as well as its IMU-derived orientation, if available.

Automatically detected ground features may be augmented with manually-identified ground points, each of which may have an accurate surveyed real-world position (and is then referred to as a ground control point).

The V5-300 and V5-180 HyperCameras are two models from the HyperCamera range. Even greater efficiency is achieved by operating a higher altitudes with longer focal lengths, and additional HyperCamera configurations are described below.

FIG. 22 tabulates the GSD as a function of the flying altitude above ground (in feet) and the lens focal length from 100 mm to 600 mm (in 100 mm increments). It also tabulates the swath width (in km) of 30-degree and 45-degree fields of view as a function of altitude. In addition, it tabulates the number of detail cameras required to cover these fields of view as a function of focal length.

FIG. 23 further tabulates the GSD as a function of focal length from 700 mm to 1200 mm.

From the tables in FIGS. 22 and 23, it is instructive to compare the characteristics of the V5-300, V10-600 and V15-900 HyperCamera configurations. Each configuration has approximately the same 30-degree lateral field of view, but assuming a 5 cm GSD the corresponding swath widths are 1.6 km, 3.3 km and 4.9 km respectively (corresponding to flying altitudes of 10,000, 20,000 and 30,000 feet respectively). Crucially, the relative capture efficiency is then 1×, 2× and 3× respectively (assuming the same aircraft speed).

A 30-degree V10-600 HyperCamera can be realised using two 15-degree V5-600 HyperCamera units in tandem, each unit mounted on a wedge-shaped adapter plate 200 that induces the required 7.5-degree lateral tilt.

A 45-degree V15-600 HyperCamera can be realised using three 15-degree V5-600 HyperCamera units in tandem, the central unit mounted flat, and each of the two outside units mounted on a wedge-shaped adapter plate 200 that induces the required 15-degree lateral tilt.

A 30-degree V15-900 HyperCamera can be realised using three 10-degree V5-900 HyperCamera units in tandem, the central unit mounted flat, and each of the two outside units mounted on a wedge-shaped adapter plate 200 that induces the required 10-degree lateral tilt.

Alternatively or additionally to utilising a wedge shape to induce the required lateral tilt, the adapter plate 200 can comprise one or more gross and/or fine tilt adjustment mechanisms to allow the tilt of the camera unit 100 to be adjusted both nominally as well as to compensate for variations in the tilt of the aircraft floor. The tilt mechanisms may comprise one or more shims, one or more biasing screws, or similar.

Tilt adjustment can also be provided via the roll compensation mechanism of the angular motion compensation (AMC) unit 330, if present, by adjusting the pre-set nominal roll of the camera unit 100.

Figure 24A:
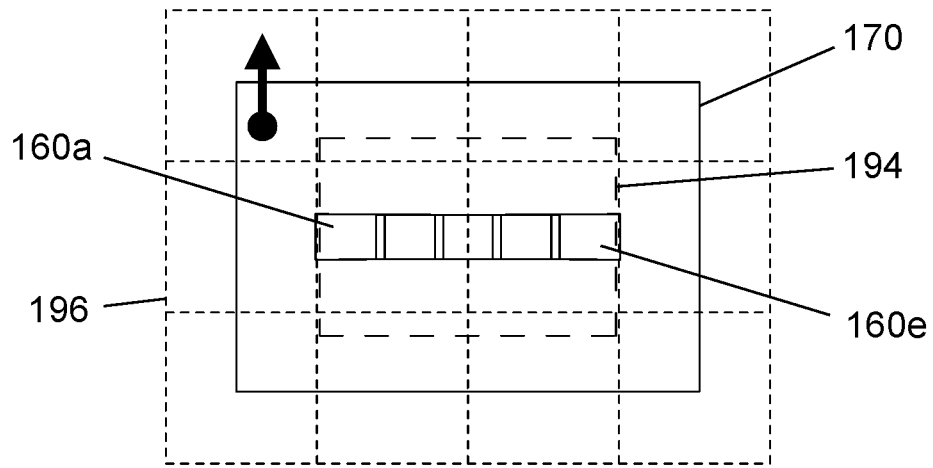
FIGS. 24A, 24B and 24C show the overview field of view and the overlapping detail fields of view of the V5-300, V10-600 and V15-900 HyperCameras respectively, at an altitude of 12,000 feet.
Figure 24B:
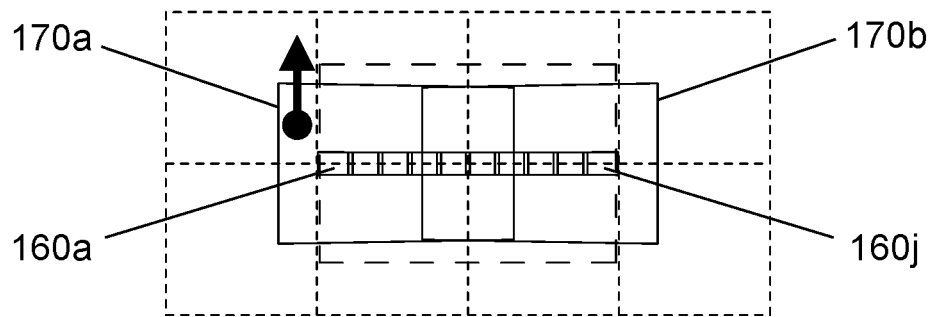
Figure 24C:
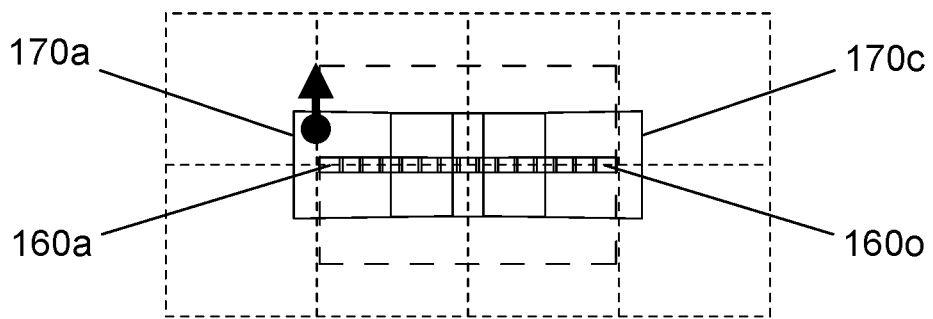

FIGS. 24A, 24B and 24C show the footprints of the V5-300, V10-600 and V15-900 HyperCameras respectively, at a constant flying altitude of 12,000 feet. The dashed grid in the figures has a 1 km spacing. The figures show the same swath width but with increasing GSD.

Figure 25A:
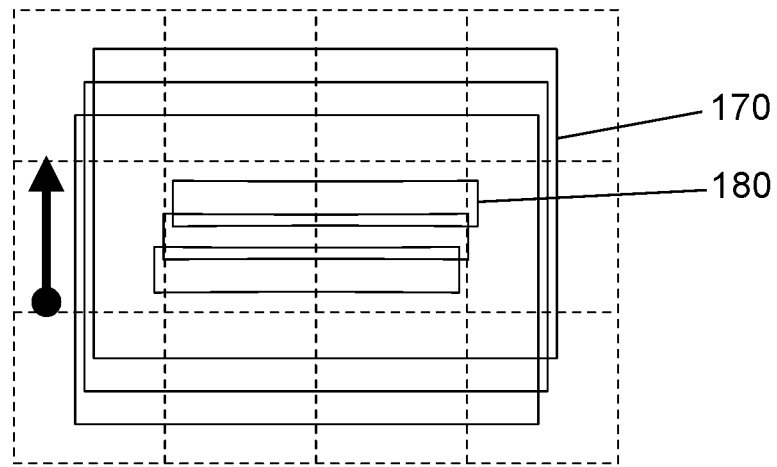
FIGS. 25A, 25B and 25C show the overlapping fields of view of three successive shots of the V5-300, V10-600 and V15-900 HyperCameras respectively, at an altitude of 12,000 feet.
Figure 25B:
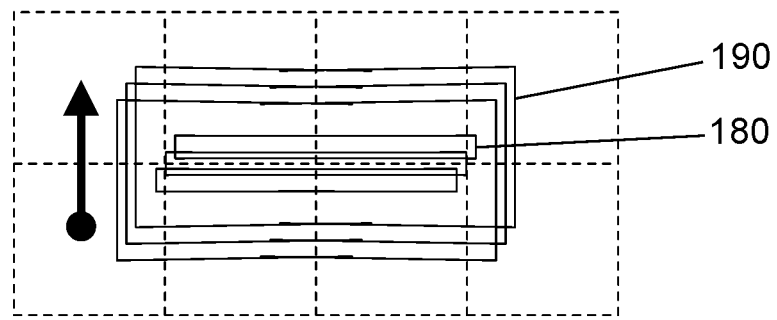
Figure 25C:
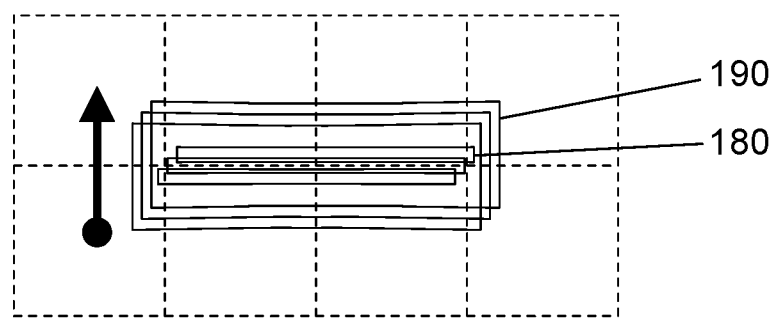

FIGS. 25A, 25B and 25C show three successive overlapping footprints of the V5-300, V10-600 and V15-900 HyperCameras respectively, at a constant flying altitude of 12,000 feet. In order to ensure adequate longitudinal overlap, the shot rate increases with increasing resolution.

Figure 26A:
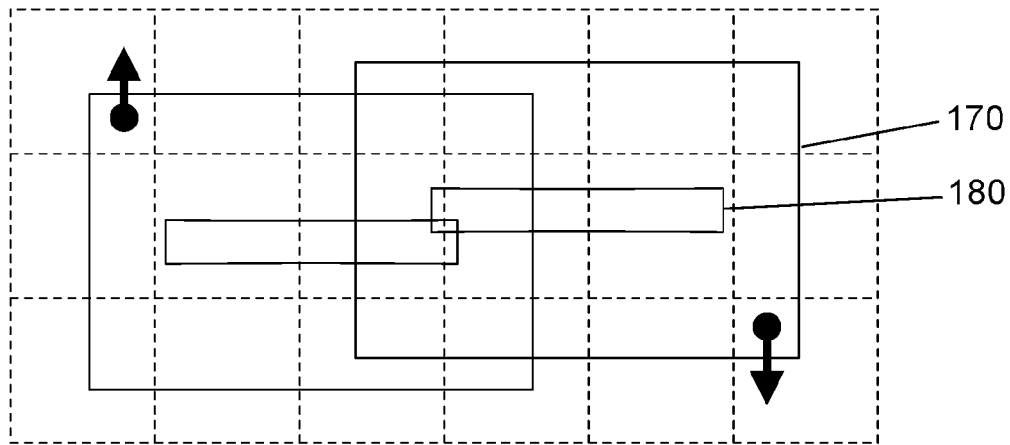
FIGS. 26A, 26B and 26C show the overlapping fields of view of shots in adjacent flight lines of the V5-300, V10-600 and V15-900 HyperCameras respectively, at an altitude of 12,000 feet.
Figure 26B:
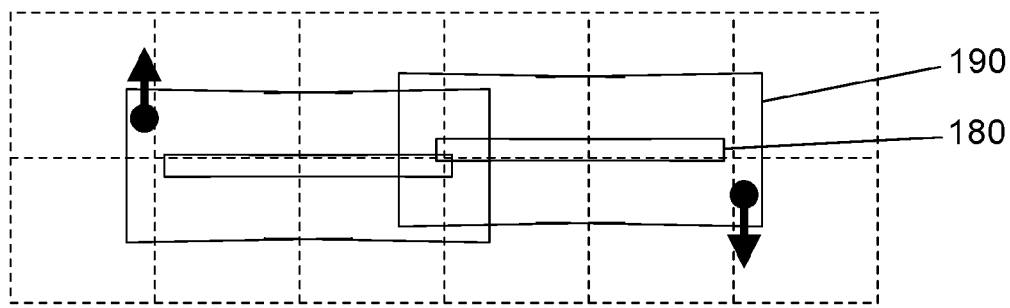
Figure 26C:
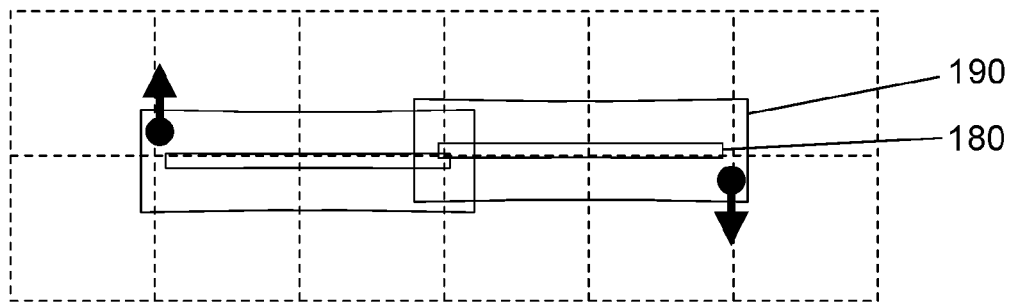

FIGS. 26A, 26B and 26C show two overlapping footprints from two adjacent flight lines of the V5-300, V10-600 and V15-900 HyperCameras respectively, at a constant flying altitude of 12,000 feet.

Figure 27:
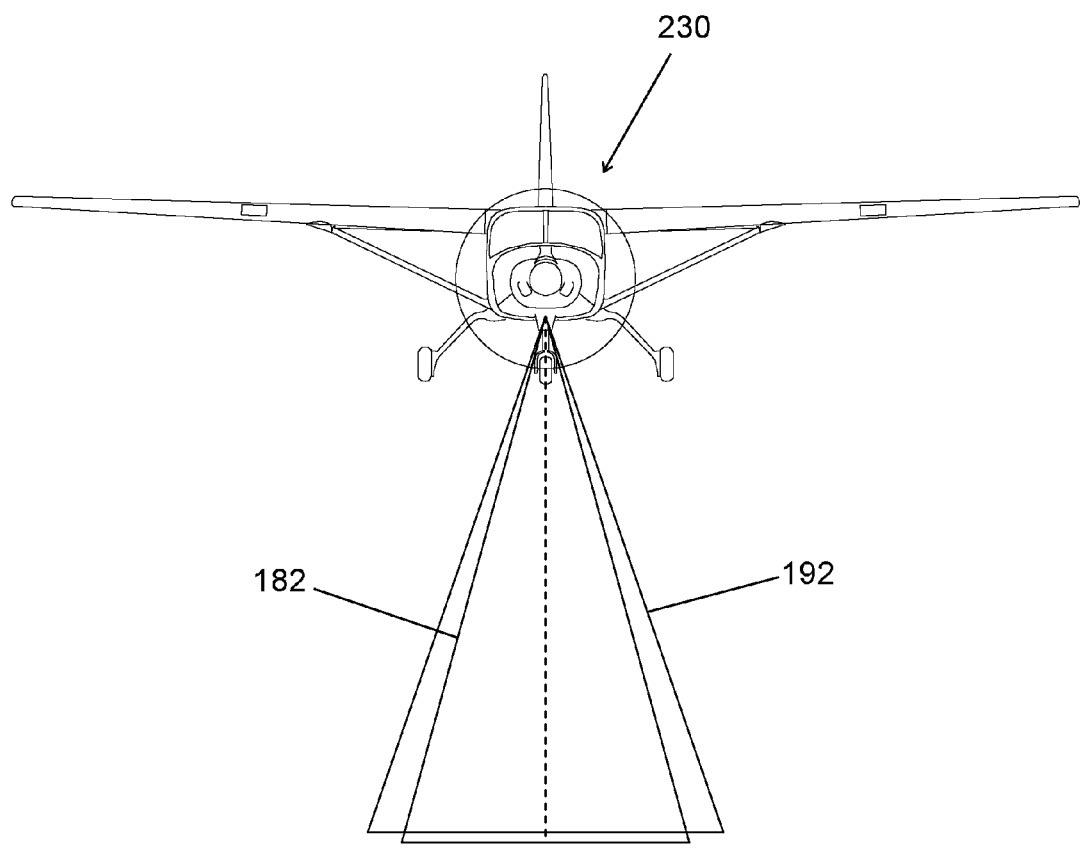
FIG. 27 shows a front elevation of a Cessna 208 aircraft carrying a V10-600 HyperCamera, consisting of two V5-600 HyperCamera units, and the resultant overview and aggregate detail fields of view.

FIG. 27 shows a front elevation of a Cessna 208 aircraft carrying a V10-600 HyperCamera comprising two V5-600 camera units, and the resultant overview and aggregate detail fields of view. The dashed line shows the division between the fields of view of the camera units.

Figure 28:
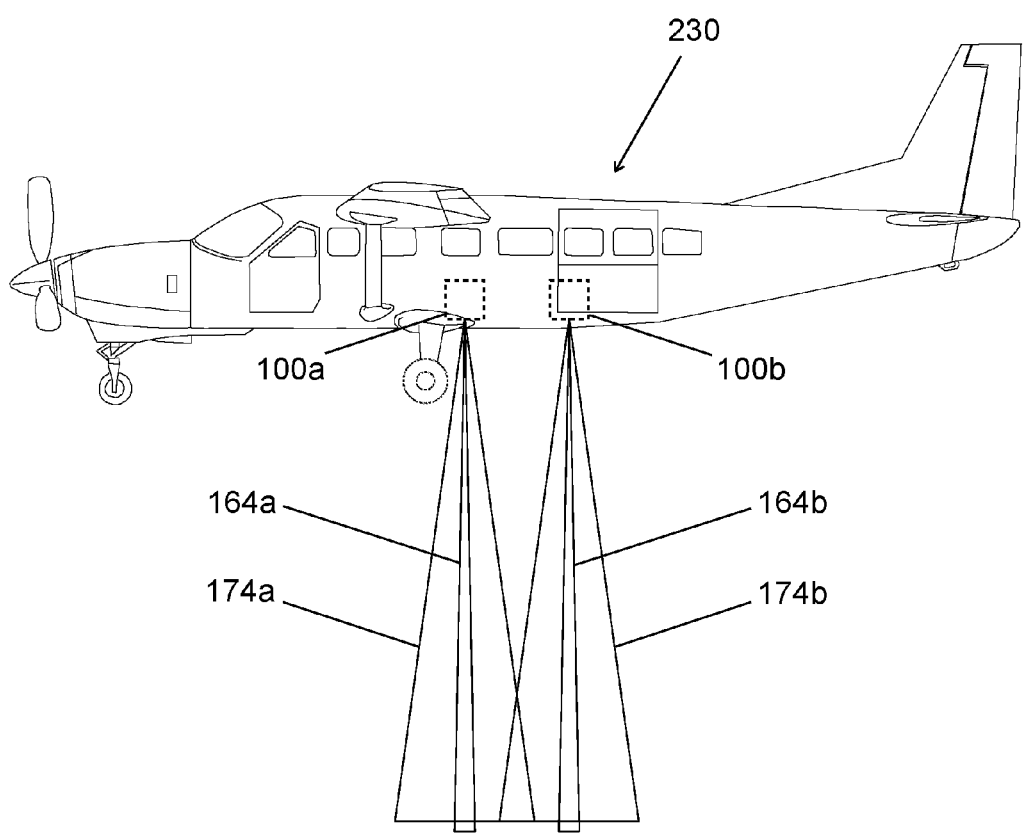
FIG. 28 shows a side elevation of a Cessna 208 aircraft carrying a V10-600 HyperCamera comprising two V5-600 camera units installed in the aircraft cabin, and the resultant overview and aggregate detail fields of view of each camera unit.

FIG. 28 shows a side elevation of a Cessna 208 aircraft carrying a V10-600 HyperCamera comprising two V5-600 camera units installed in the aircraft cabin, and the resultant overview and aggregate detail fields of view of each camera unit.

Figure 29:
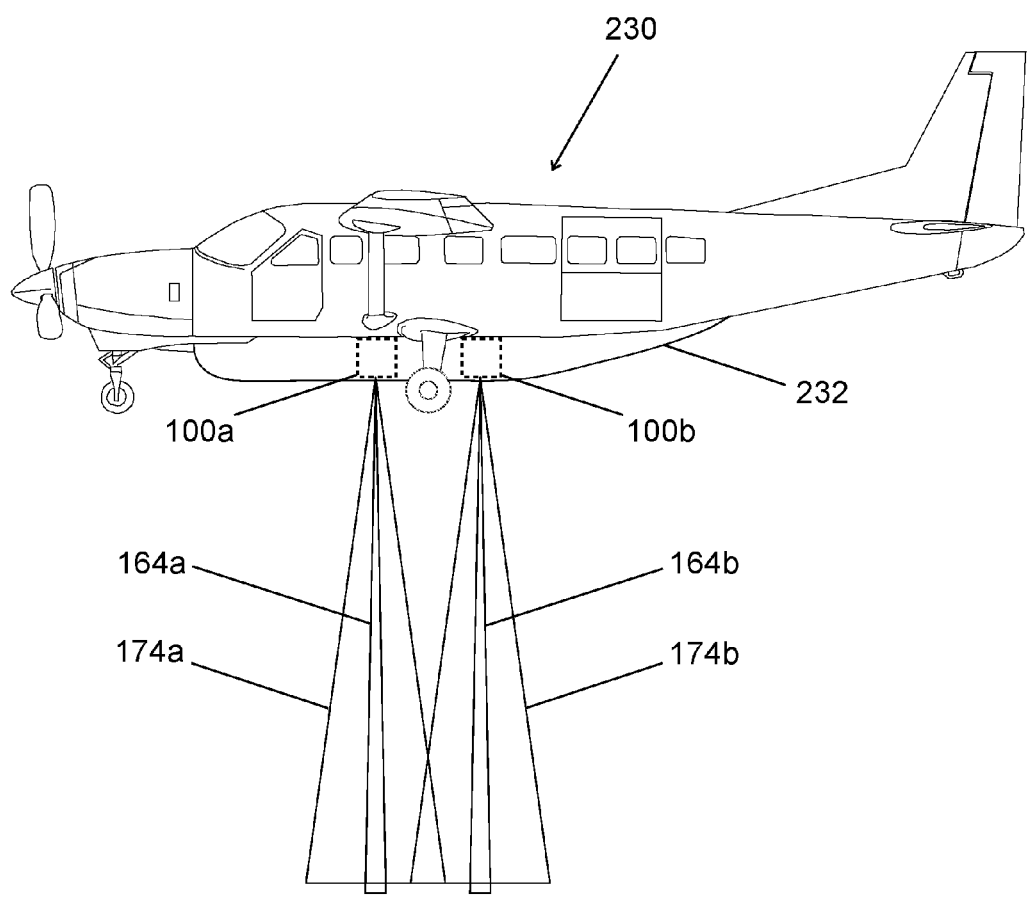
FIG. 29 shows a side elevation of a Cessna 208 aircraft carrying a V10-600 HyperCamera comprising two V5-600 camera units installed in a standard Cessna 208 belly-mounted cargo pod, and the resultant overview and aggregate detail fields of view of each camera unit.

FIG. 29 shows a side elevation of a Cessna 208 aircraft carrying a V10-600 HyperCamera comprising two V5-600 camera units installed in a standard Cessna 208 belly-mounted cargo pod, and the resultant overview and aggregate detail fields of view of each camera unit.

Figure 30:
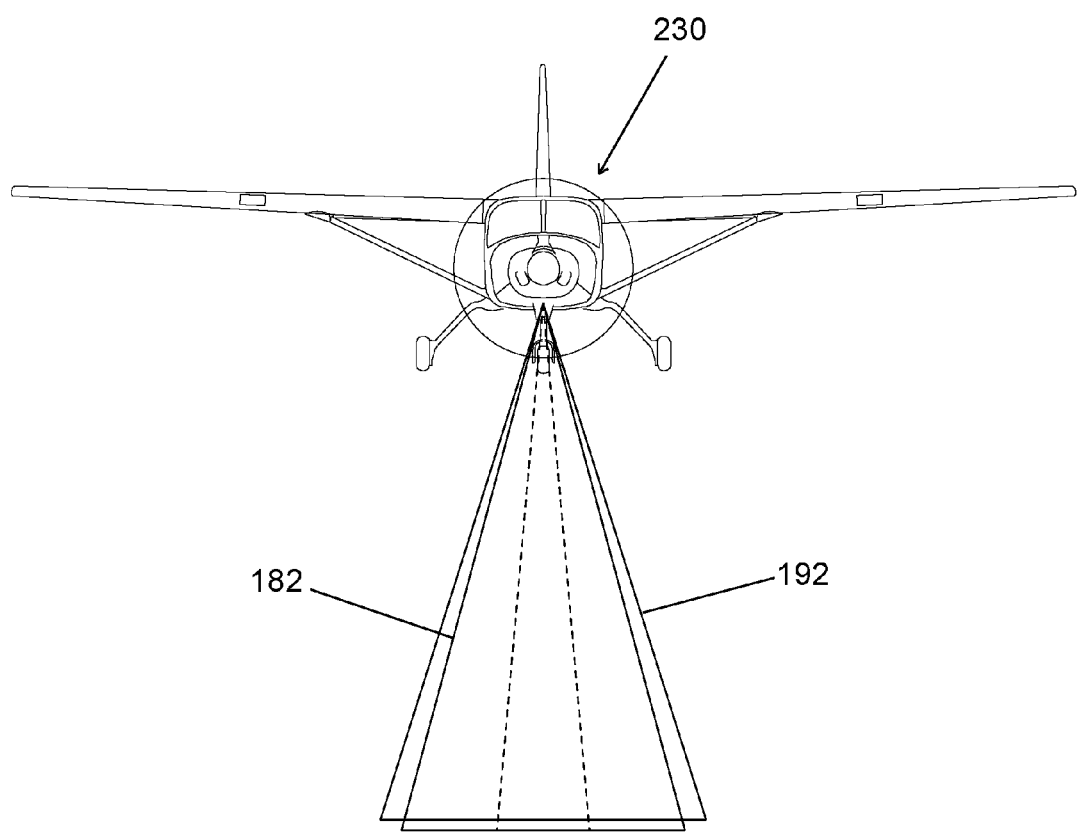
FIG. 30 shows a front elevation of a Cessna 208 aircraft carrying a V15-900 HyperCamera comprising three V5-900 camera units, and the resultant overview and aggregate detail fields of view. The dashed line shows the division between the fields of view of the camera units.

FIG. 30 shows a front elevation of a Cessna 208 aircraft carrying a V15-900 HyperCamera comprising three V5-900 camera units, and the resultant overview and aggregate detail fields of view. The dashed line shows the division between the fields of view of the camera units.

Figure 31:
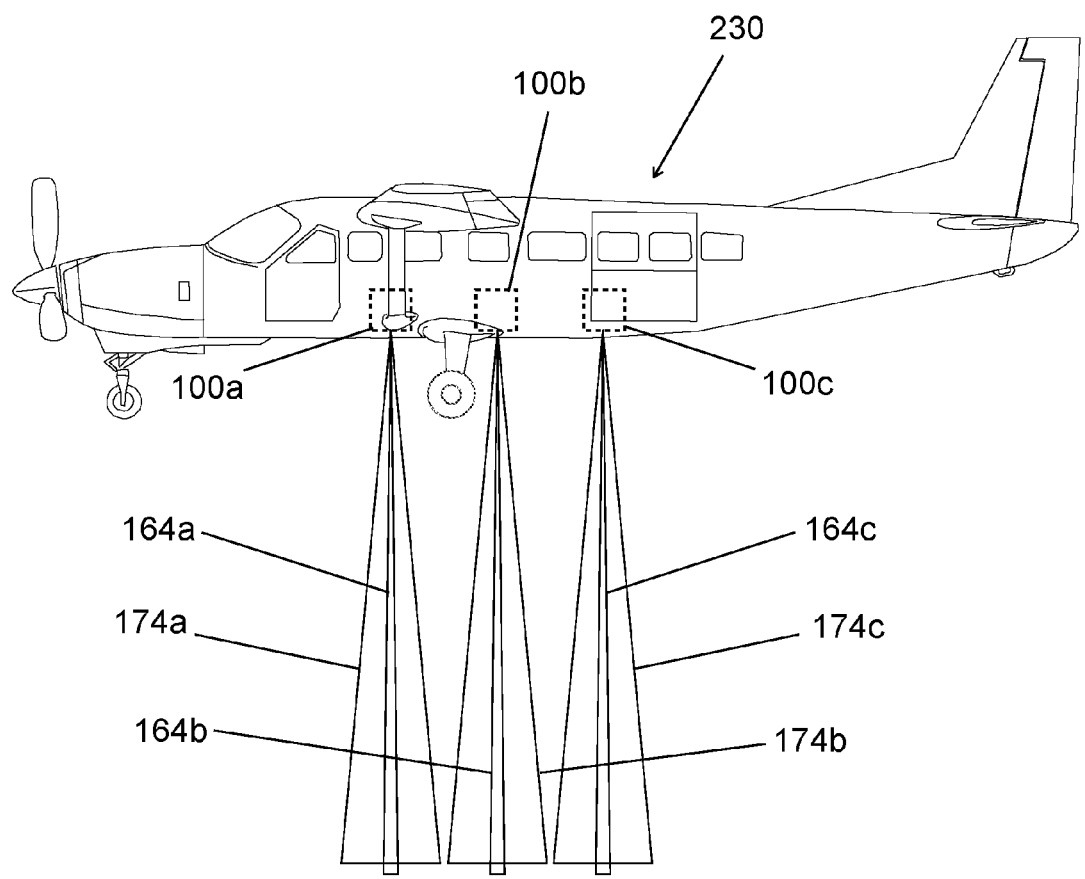
FIG. 31 shows a side elevation of a Cessna 208 aircraft carrying a V15-900 HyperCamera comprising three V5-900 camera units installed in the aircraft cabin, and the resultant overview and aggregate detail fields of view of each camera unit.

FIG. 31 shows a side elevation of a Cessna 208 aircraft carrying a V15-900 HyperCamera comprising three V5-900 camera units installed in the aircraft cabin, and the resultant overview and aggregate detail fields of view of each camera unit.

Figure 32:
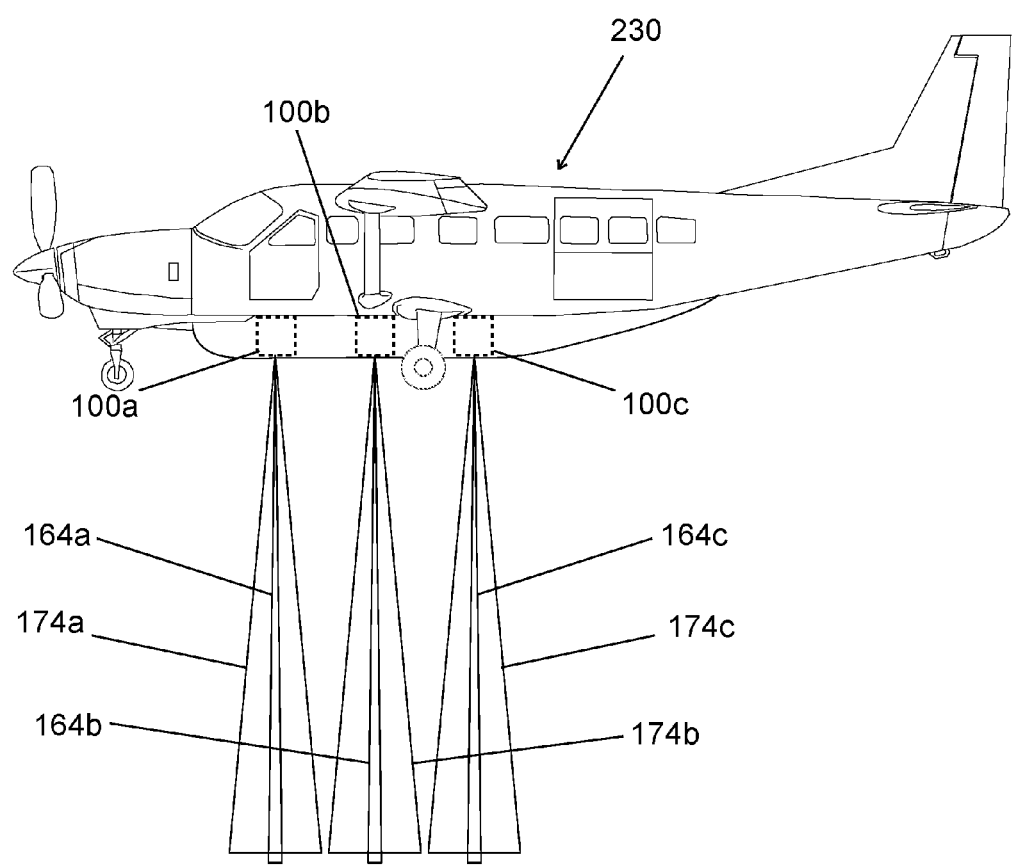
FIG. 32 shows a side elevation of a Cessna 208 aircraft carrying a V15-900 HyperCamera, comprising three V5-900 camera units installed in a standard Cessna 208 belly-mounted cargo pod, and the resultant overview and aggregate detail fields of view of each camera unit.

FIG. 32 shows a side elevation of a Cessna 208 aircraft carrying a V15-900 HyperCamera, comprising three V5-900 camera units installed in a standard Cessna 208 belly-mounted cargo pod, and the resultant overview and aggregate detail fields of view of each camera unit.

Figure 33A:
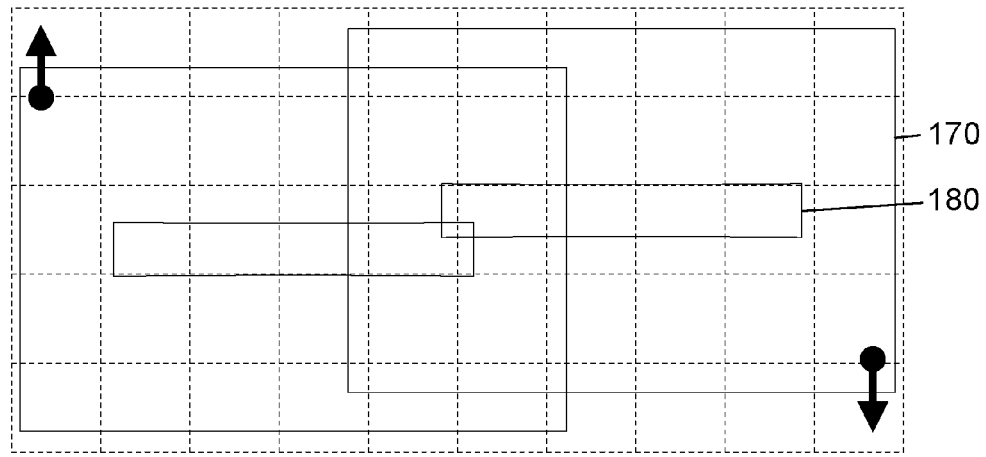
FIGS. 33A, 33B and 33C show two overlapping footprints from two adjacent flight lines of the V5-300, V10-600 and V15-900 HyperCameras respectively, at a constant flying altitude of 24,000 feet. The dashed grid in the figures has a 1 km spacing.
Figure 33B:
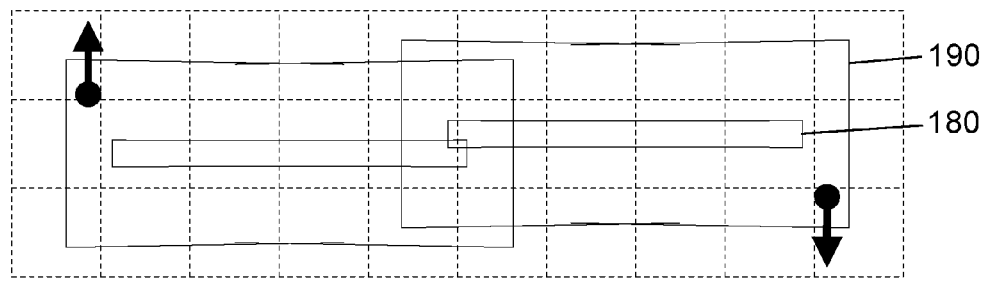
Figure 33C:
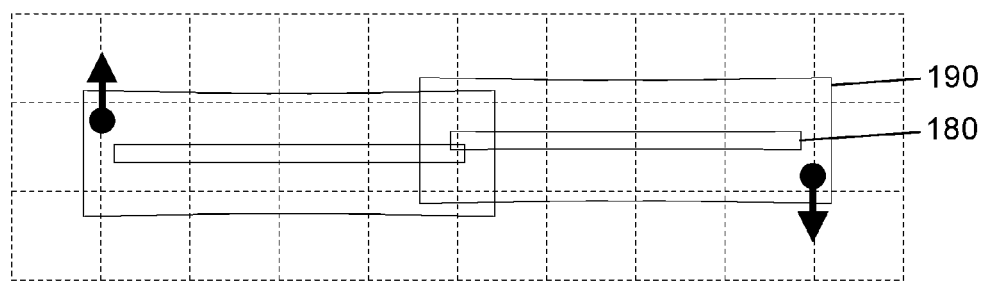

FIGS. 33A, 33B and 33C show two overlapping footprints from two adjacent flight lines of the V5-300, V10-600 and V15-900 HyperCameras respectively, at a constant flying altitude of 24,000 feet. The dashed grid in the figures has a 1 km spacing.

Figure 34A:
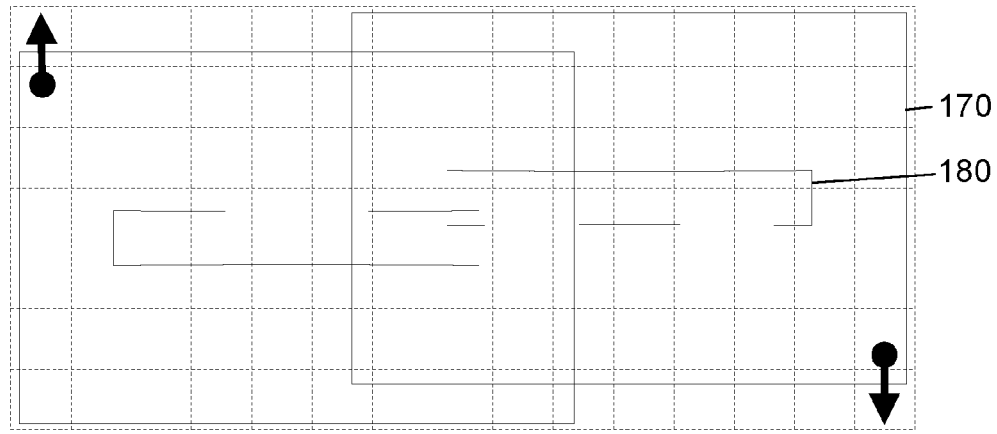
FIGS. 34A, 34B and 34C show two overlapping footprints from two adjacent flight lines of the V5-300, V10-600 and V15-900 HyperCameras respectively, at a constant flying altitude of 36,000 feet. The dashed grid in the figures has a 1 km spacing.
Figure 34B:
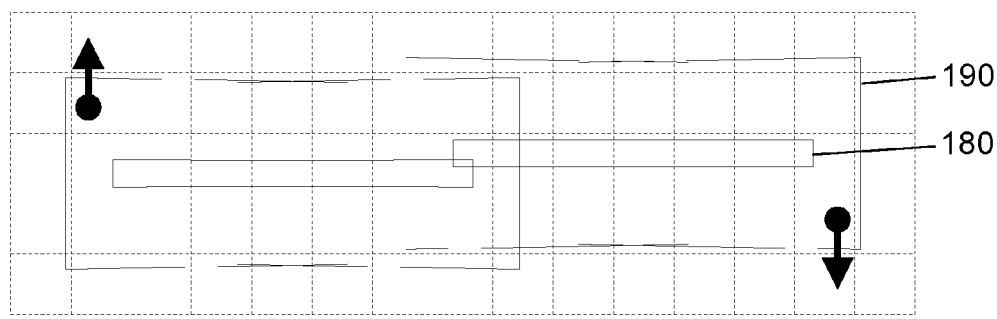
Figure 34C:
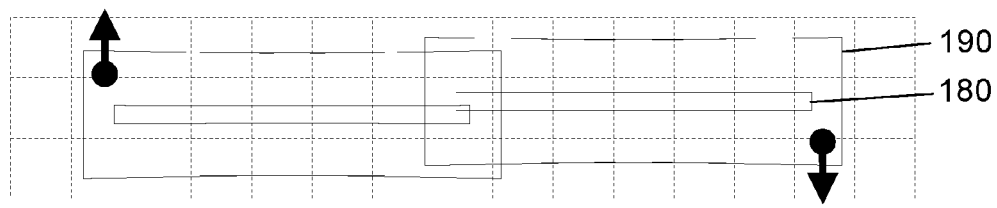

FIGS. 34A, 34B and 34C show two overlapping footprints from two adjacent flight lines of the V5-300, V10-600 and V15-900 HyperCameras respectively, at a constant flying altitude of 36,000 feet. The dashed grid in the figures has a 1 km spacing.

In general, a particular HyperCamera model can be realised using a number of identical smaller camera units 100, each mounted at the required lateral angle. As shown in the FIGS. 27 to 32, the individual camera units 100 can be mounted along the longitudinal axis of the aircraft. The firing of each camera unit 100 can be staggered to account for its longitudinal position and the aircraft speed, or the longitudinal offsets between photos from different camera units can be accounted for during downstream processing.

The HyperCamera design is thus modular, and suited to deployment in conjunction with one or more standard camera holes.

An oblique HyperCamera, i.e. with a pointing direction other than vertical (and typically with pointing direction of 45 degrees), can be realised using one or more vertical camera units 100 mounted at the required oblique angle, e.g. via a tilted adapter plate 200, or using one or more oblique camera units 100, each comprising an array of cameras mounted at the required oblique angle within an otherwise vertically-oriented frame.

Oblique aerial photos have several uses. They can be used to produce an oblique georeferenced orthomosaic to provide a useful complement to a vertical orthomosaic. They can be used along with vertical photos during photogrammetric bundle adjustment (as described above in relation to FIG. 21) to achieve higher accuracy, including higher elevation data accuracy. And they can be used to texture an elevation model or a full three-dimensional model of the area of interest, to support three-dimensional visualisation and interaction.

Figure 35A:
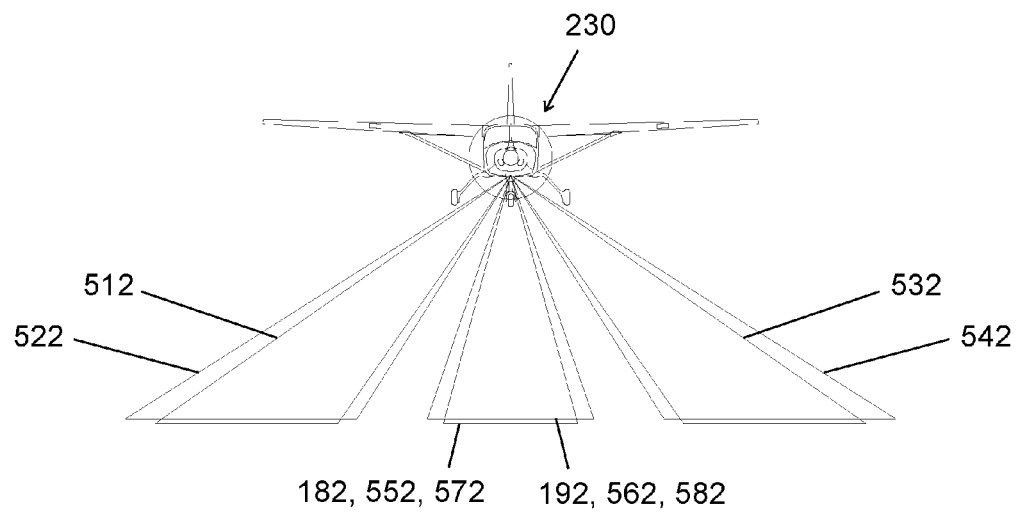
FIG. 35A and FIG. 35B show front and side elevations respectively of a Cessna 208 aircraft carrying five HyperCameras installed in the aircraft cabin: a vertical V10-600, a right oblique R10-600, a left oblique L10-600, a front oblique F10-600, and a back oblique B10-600, and the resultant overview and aggregate detail fields of view of each.
Figure 35B:
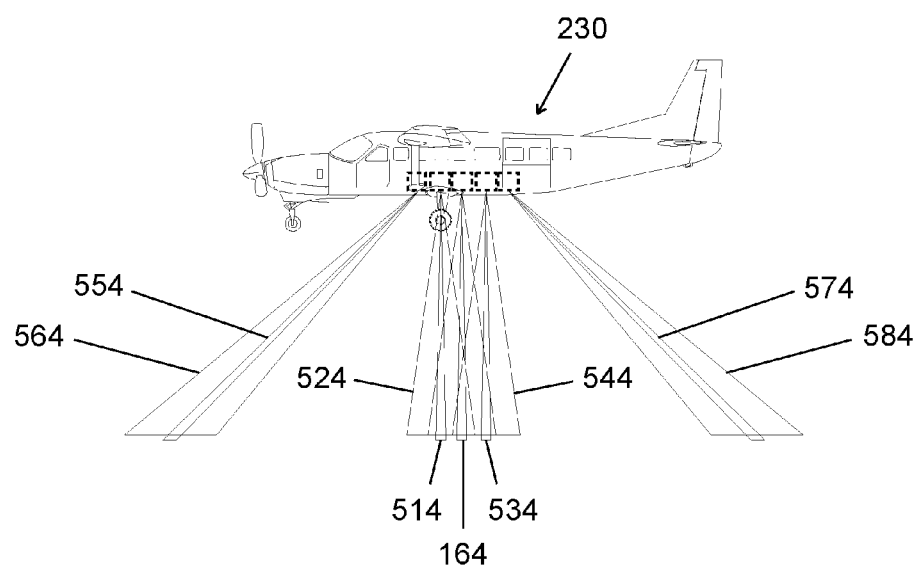
Figure 36:
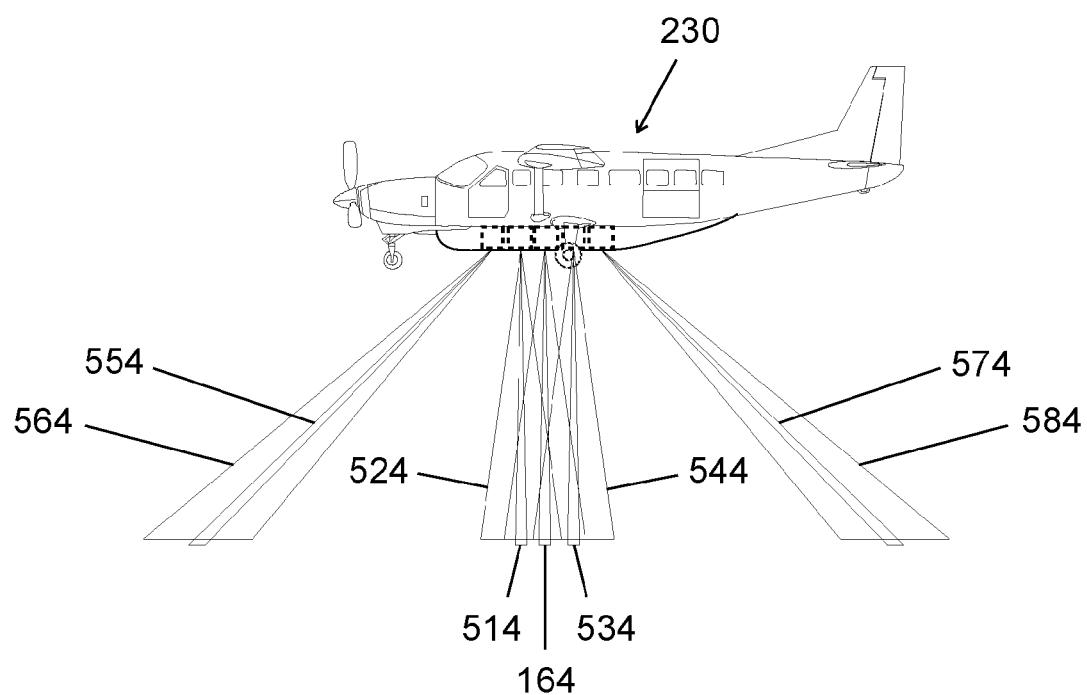
FIG. 36 shows a side elevations of a Cessna 208 aircraft carrying five HyperCameras installed in a standard Cessna 208 belly-mounted cargo pod: a vertical V10-600, a right oblique R10-600, a left oblique L10-600, a front oblique F10-600, and a back oblique B10-600, and the resultant overview and aggregate detail fields of view of each.

FIGS. 35A and 35B show front and side elevations respectively of a Cessna 208 aircraft carrying five HyperCameras installed in the aircraft cabin: a vertical V10-600, a right oblique R10-600, a left oblique L10-600, a front oblique F10-600, and a back oblique B10-600, and the resultant overview and aggregate detail fields of view of each.

Figure 44:
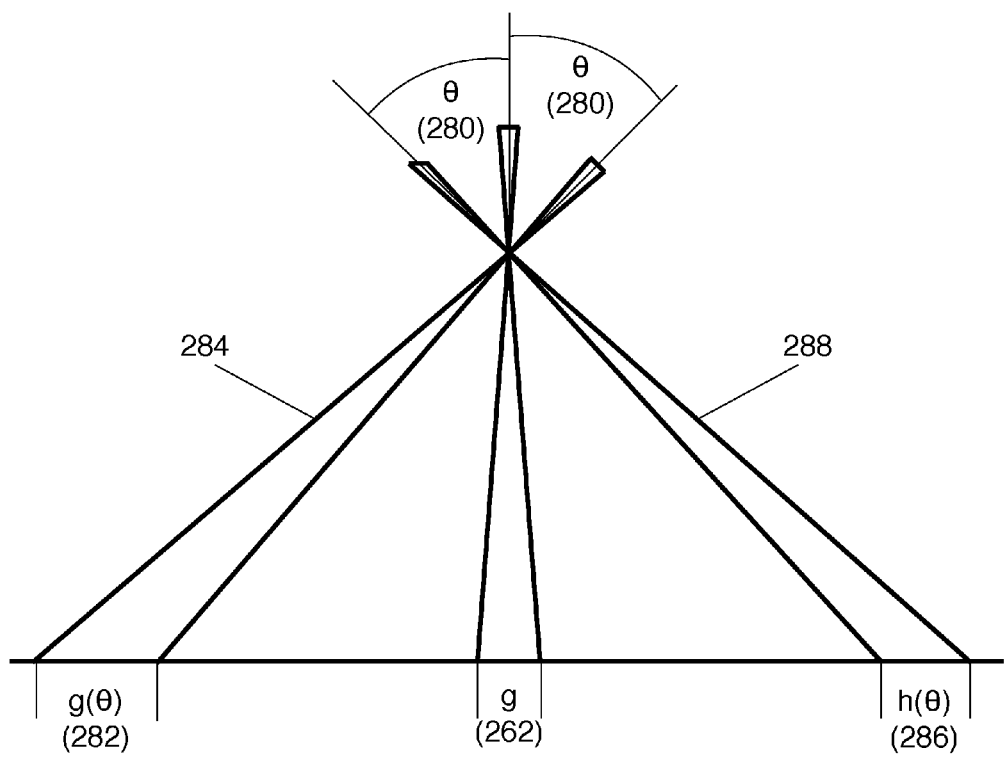
FIG. 44 shows a diagram and equations relating to the calculation of the resolution of tilted cameras.

The oblique GSD (282) of a camera tilted at an angle (280) away from the vertical is given by the EQ 9 in FIG. 44. The vertical GSD (262) is increased by a factor of the square of the secant of the tilt angle. The first secant term is due to the greater tilt-induced viewing distance, while the second secant term is due to the tilt-induced foreshortening of the ground. A tilted camera therefore needs to have a correspondingly longer focal length to match the GSD of a vertical camera.

For a tilt of 45 degrees the vertical GSD is increased by a factor of two, implying that a 45-degree oblique camera needs to have twice the focal length of a vertical camera to match the GSD of the vertical camera. In practice, however, there is no strict requirement to match the GSDs of vertical and oblique cameras, and any suitable focal length can be used for the oblique cameras.

If the image sensor of the camera is tilted to be parallel to the ground then the second secant term disappears. The oblique GSD (286) is then given by EQ 10 in FIG. 44. For a tilt of 45 degrees the vertical GSD (262) is then increased only by a factor of the square root of two, implying that a 45-degree tilted-sensor oblique camera needs to have 1.4 times the focal length of a vertical camera to match the GSD of the vertical camera.

However, the smaller GSD on horizontal surfaces is accompanied by a larger GSD on vertical surfaces such as the sides of buildings. This in turn may motivate a strategy of capturing oblique photos in multiple passes, with each pass optimised for a particular surface orientation via image sensor tilt.

More generally, tilting the image sensor of any non-nadir camera to be (more) parallel to the ground can be used to reduce perspective foreshortening in photos captured by the camera and thus improve the GSD.

Each 900 mm oblique HyperCamera has a 33% larger GSD than the 600 mm vertical HyperCamera. A 1200 mm oblique HyperCamera would have the same GSD as the 600 mm vertical HyperCamera. An 850 mm tilted-sensor oblique HyperCamera would also have the same GSD as the 600 mm vertical HyperCamera.

Figure 37:
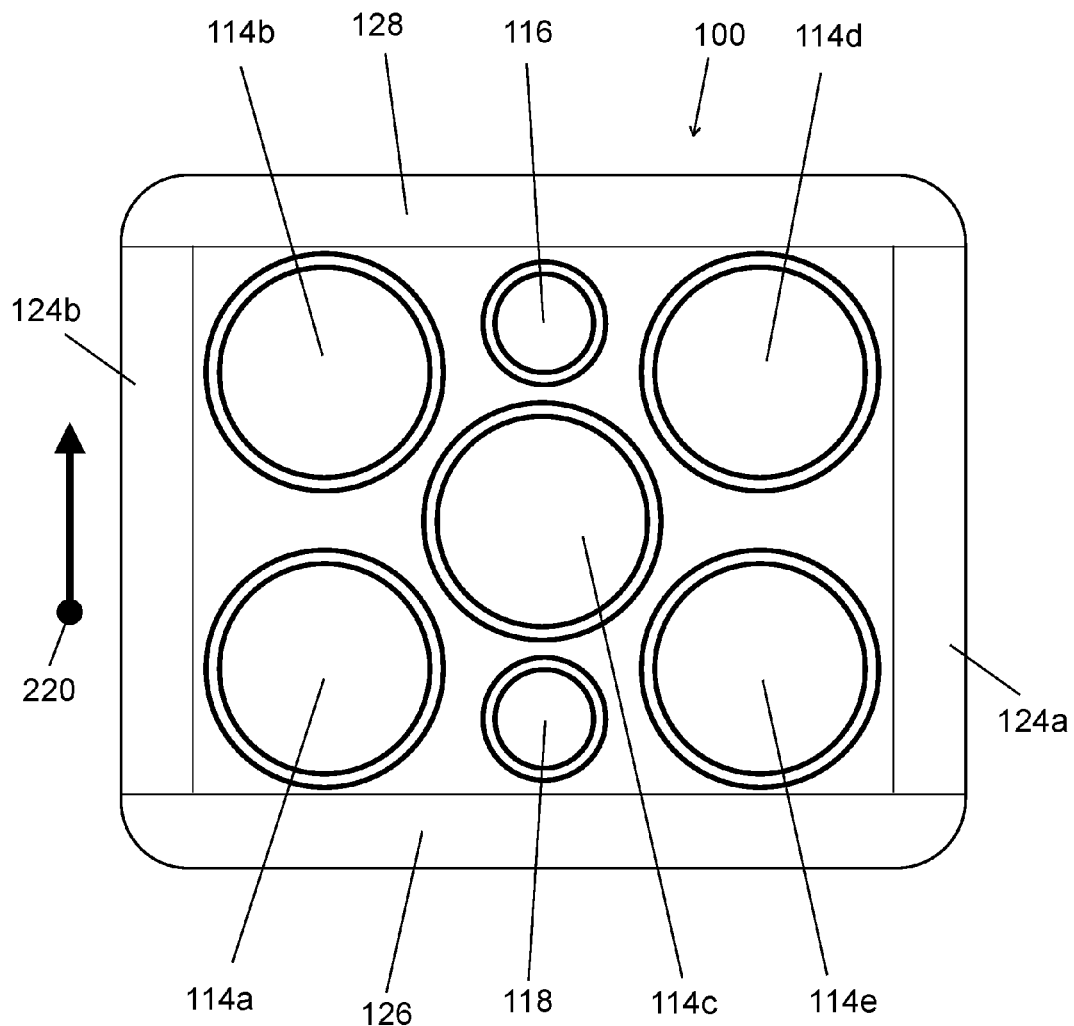
FIG. 37 shows a bottom view of the camera unit with an alternative arrangement of the cameras.

FIG. 37 shows a bottom view of the camera unit 100 where the detail cameras are arranged in an alternative "X" pattern to provide more room for longer detail lenses 114, i.e. to accommodate the larger diameters of longer lenses. This arrangement also provides room for a second lower-resolution camera (i.e. with a shorter lens) which can be utilised either for a second overview camera or for a dedicated spectral camera, such as a near-infrared (NIR) camera. Including a second overview camera allows both cameras to have a longer focal length and therefore provide greater resolution and hence photogrammetric accuracy. Including a near-infrared camera allows a near-infrared band to be included in the orthomosaic, in turn supporting applications such as identifying vegetation.

As the focal length of the detail lenses 114 is increased, the size and weight of a purely refractive (dioptric) lens design becomes significant. A lighter and physically shorter lens with the same long focal length may be realised using a reflecting design, i.e. using curved mirrors for focusing, either using mirrors alone (catoptric) or in conjunction with corrective refractive elements (catadioptric). Astronomical telescopes, which are characterised by long focal lengths and large apertures, typically utilise reflecting designs. Classic modern designs include the Schmidt-Cassegrain, which combines spherical primary and secondary mirrors with a Schmidt correction plate, and the Ritchey-Chretien, which utilises hyperbolic primary and secondary mirrors.

Reflecting detail lenses 114 can thus be used to significantly reduce the size and weight of the camera unit 100, and this is particularly beneficial for longer focal lengths such as 900 mm and longer.

Figure 38:
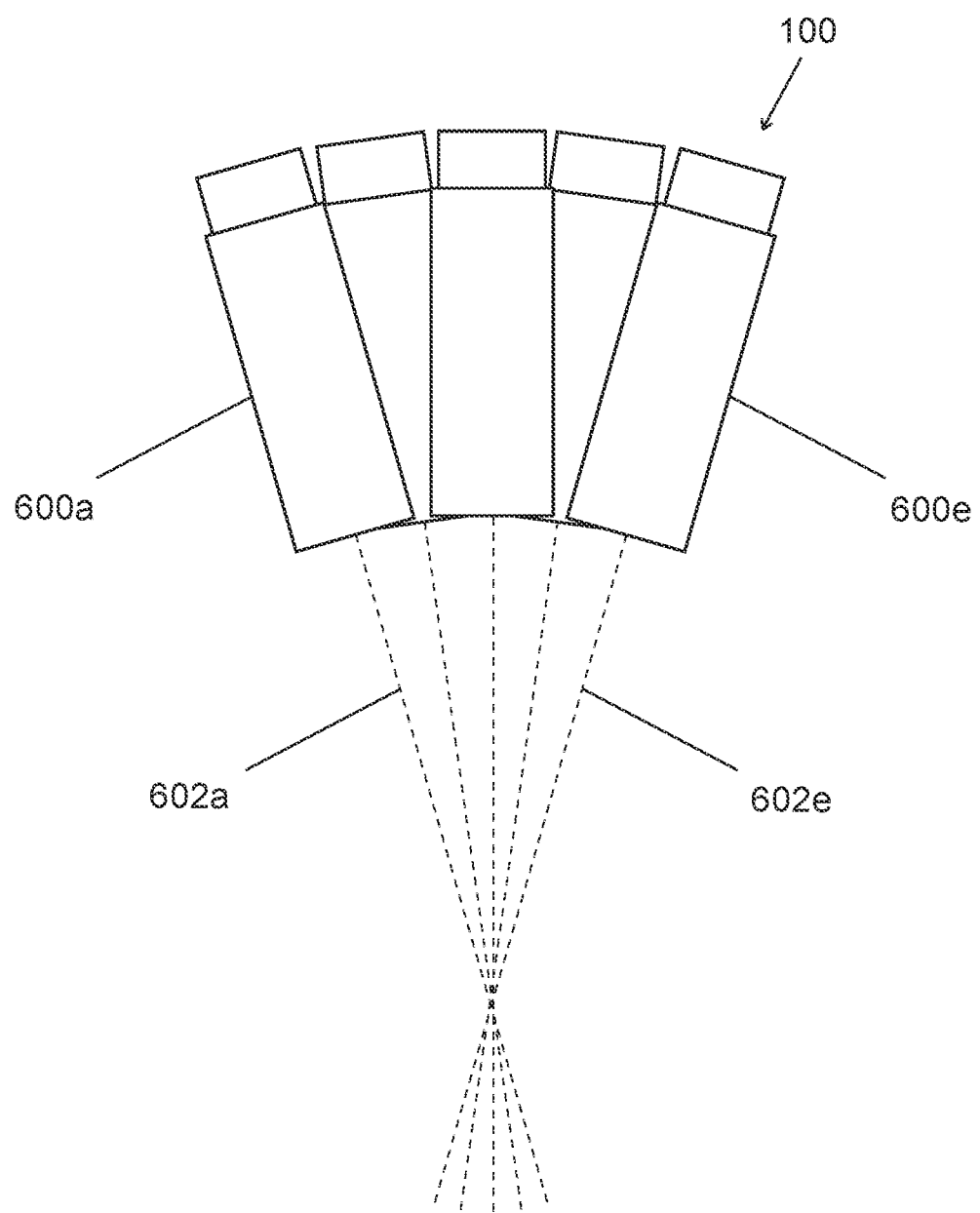
FIG. 38 shows a camera unit implemented as an array of cameras and their respective optical axes.

FIG. 38 shows a camera unit 100 implemented as an array of cameras 600, arranged in a fan, and the optical axis 602 of each camera. This figuratively represents any of the arrays of cameras in the foregoing description, detail or overview, and provides context for the following description. Each camera 600 consists of a camera body (e.g. 110 or 112) and a camera lens (e.g. 114 or 116).

Figure 39:
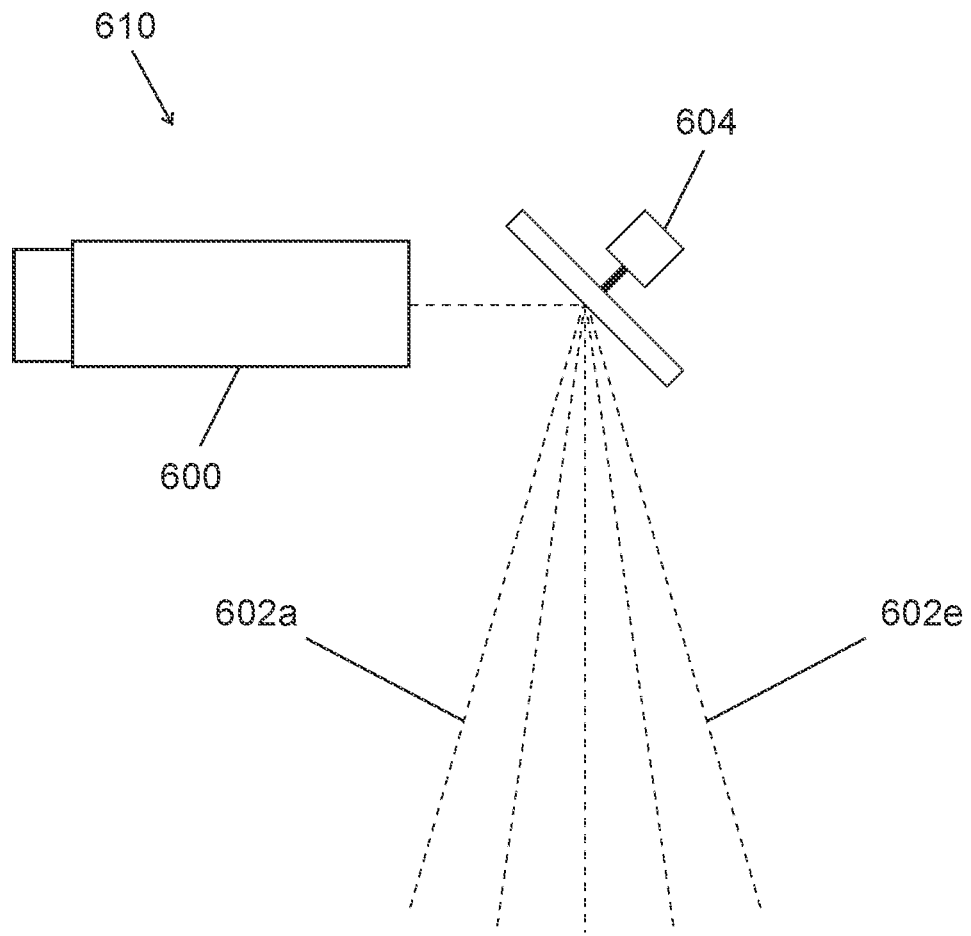
FIG. 39 shows a camera unit implemented as a single camera time-multiplexed via a steerable mirror to produce multiple optical paths.

FIG. 39 shows a camera unit 100 implemented using a steerable camera module 610 comprising a single camera 600 time-multiplexed via a steerable mirror 604 to produce multiple optical paths that sweep out the required angular field. This allows a single camera to be used to implement an array of cameras using time-multiplexing, and thus reduces the number of physical cameras required to implement a HyperCamera, in turn reducing the size, weight and cost of each camera unit 100. As an alternative to a steerable mirror 604, any suitable beam-steering mechanism may be used.

Figure 40:
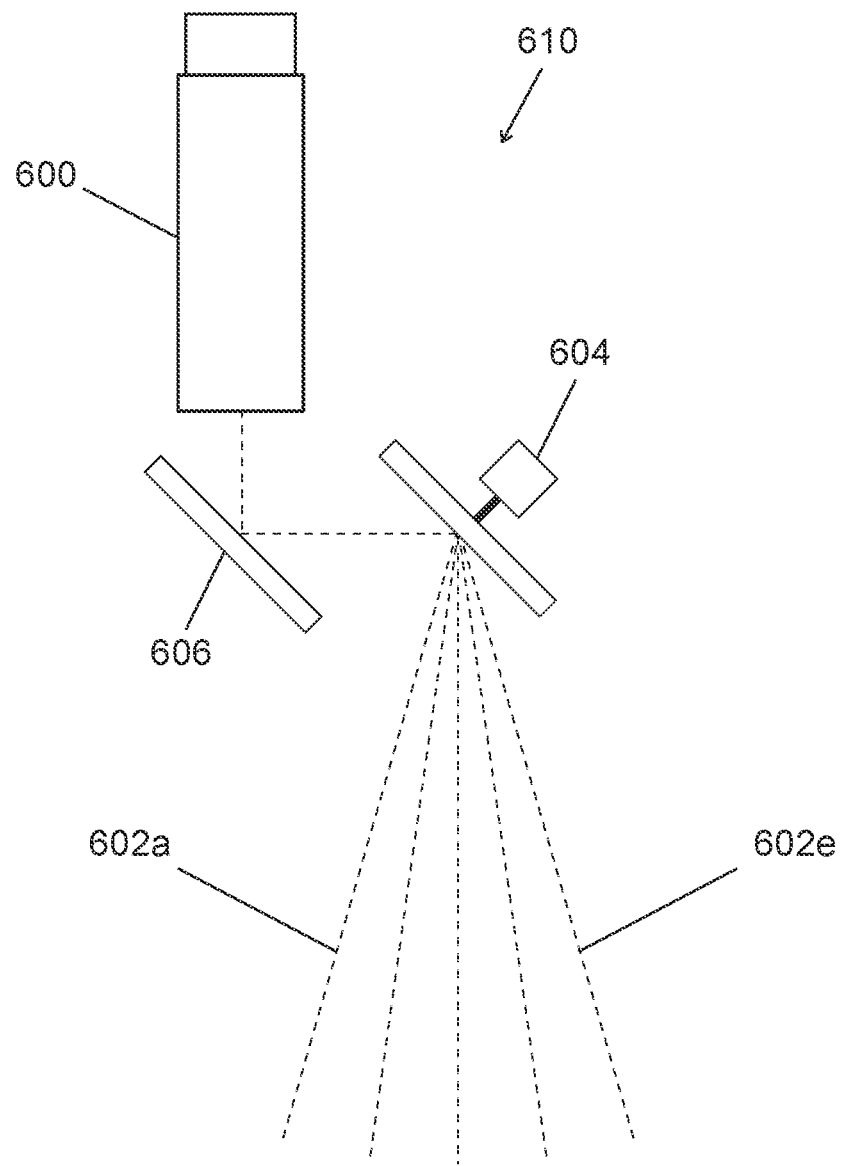
FIG. 40 shows an alternative configuration of a camera unit implemented as a single camera time-multiplexed via a steerable mirror to produce multiple optical paths.

FIG. 40 shows an alternative configuration of a camera unit 100 implemented using a steerable camera module 610 comprising a single camera 600 time-multiplexed via a steerable mirror 604 to produce multiple optical paths. The addition of a fixed mirror 606 allows the camera 600 to be mounted vertically, allowing the camera unit 100 to have a smaller footprint.

Figure 41:
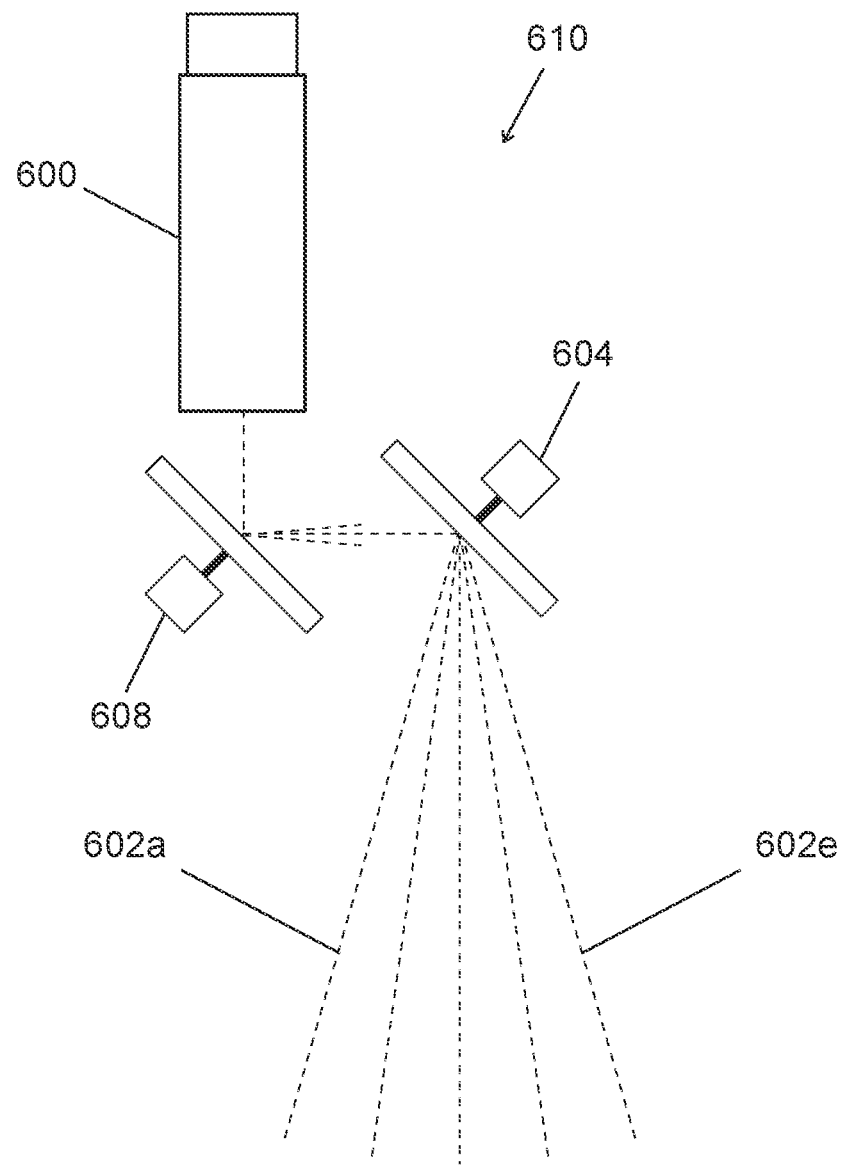
FIG. 41 shows a camera unit implemented as a single camera time-multiplexed via a steerable mirror to produce multiple optical paths, with a steerable mirror for angular motion compensation (AMC).

FIG. 41 shows a camera unit 100 implemented using a steerable camera module 610 comprising a single camera 600 time-multiplexed via a steerable mirror 604 to produce multiple optical paths, with an additional steerable mirror 608 providing angular motion compensation (AMC). This implements the IMU-driven AMC unit 330. As an alternative to a steerable mirror 608, any suitable beam-steering mechanism may be used.

The steerable mirror 608 may additionally or alternatively be used to implement a forward motion compensation (FMC) mechanism. In FMC mode the mirror is smoothly pitched backwards during exposure to match the forward motion of the aircraft, and is pitched forwards again between exposures. The pitch of the mirror 608 can be driven directly, or can be oscillated at an appropriate rate to provide FMC, with camera exposure synchronised with the backwards phase of the oscillation. AMC and FMC may also be provided by separate cascaded mirrors.

The multiplexing steerable mirror 604 may be stopped at each of a set of discrete positions within the required angular field, or may be rotated continuously to sweep out the required angular field. In the latter case the motion of the mirror provides an additional source of systematic motion during camera exposure, like the forward motion of the aircraft, and this may be corrected using any of the FMC mechanisms described above, including via the steerable motion-compensation mirror 608, or via a separate stabilisation platform 330.

Vibration of the aircraft may also be detected via the IMU, or via an additional vibration-sensing device, and vibration compensation (VC) may be provided using any of the AMC or FMC mechanisms described above, including via the steerable motion-compensation mirror 608, or via a separate stabilisation platform 330.

AMC, FMC and VC may also be provided via the multiplexing mirror 604.

Figure 45:
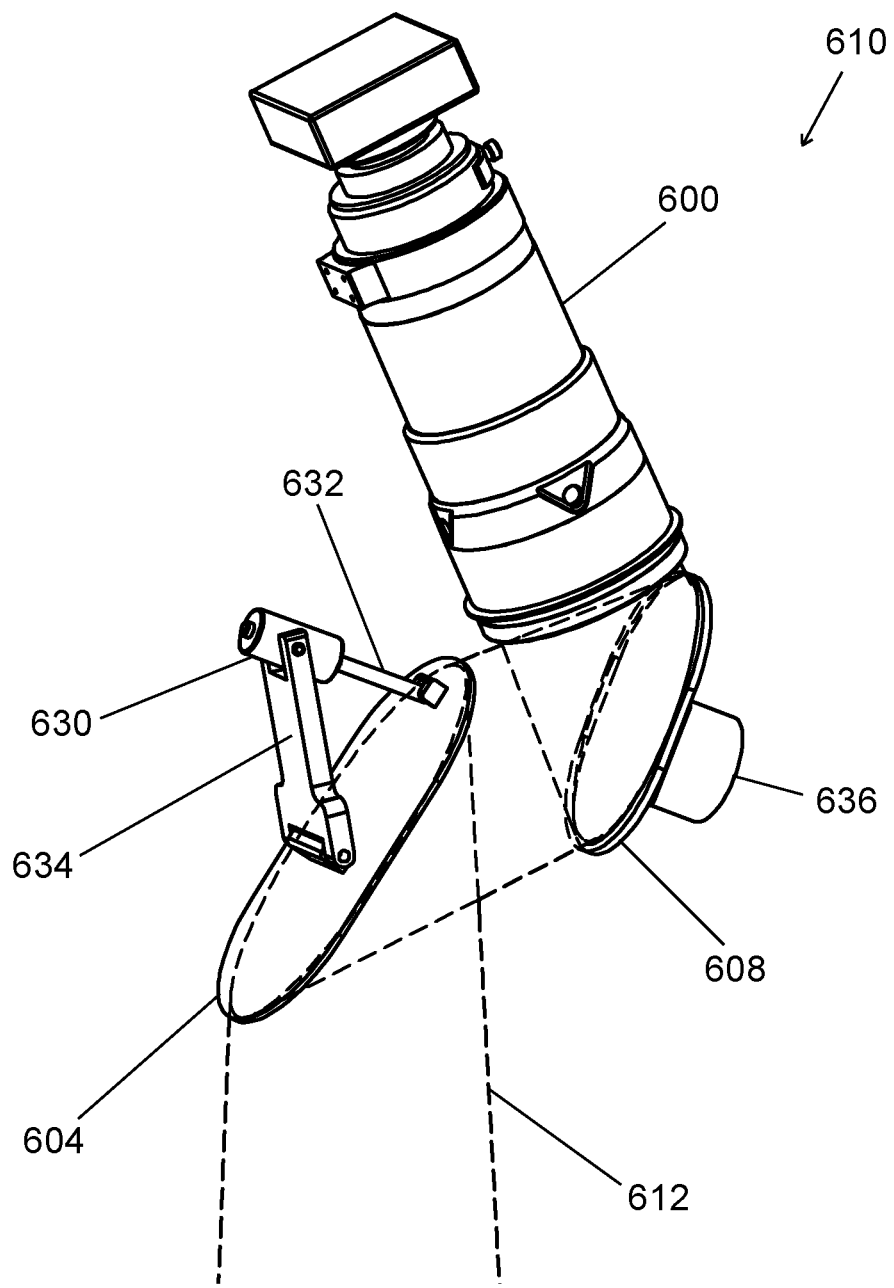
FIG. 45 shows a steerable camera module.

FIG. 45 shows one realisation of the steerable camera module 610 of FIG. 41. The steerable multiplexing mirror 604 is attached via a hinge to a rod 632 of a linear motor 630, and the linear motor 630 is attached via a hinge to a fixed mount 634. The mirror 604 is also attached via a hinge to the mount 634, about which it rotates in response to linear motion of the rod 632. The linear motor 630 may utilise any suitable drive mechanism, including a piezoelectric drive mechanism, e.g. as described in U.S. Pat. No. 6,800,984 (Marth), the contents of which are incorporated herein by reference, or as embodied in the Physik Instrumente (PI) M-272 linear piezomotor, which also incorporates a linear encoder for precise positioning.

The steerable motion-compensation mirror 608 is attached to a tip-tilt stage 636 which provides rotation in two dimensions. Alternatively the stage 636 can be limited to rotation in one dimension, e.g. to only provide correction for motion of the multiplexing mirror 604. The tip-tilt stage 636 may utilise any suitable motors or actuators, including piezoelectric actuators, e.g. as embodied in the PI S-340, which may also incorporate a strain-gauge sensor for precise closed-loop control.

The steerable camera module 610 in FIG. 45 allows the field of view 612 of the camera 600 to be steered across an angular range of approximately 50 degrees, depending on camera aperture and hence beam diameter. Suitably oriented, the steerable camera module 610 may be used to provide steering across a symmetric range or an asymmetric range. An asymmetric range may form part of a larger symmetric range.

Figures 46A, 46B:
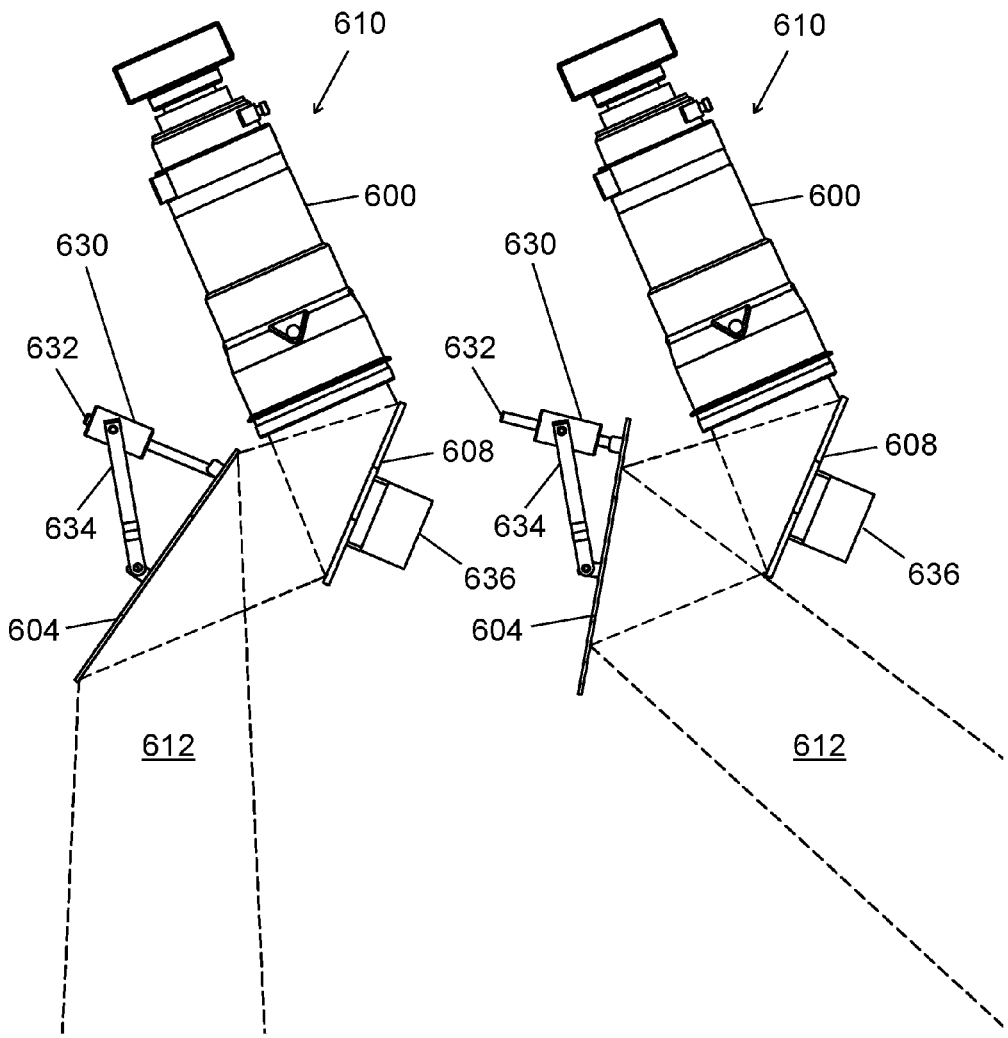
FIG. 46A shows the steerable camera module with its mirror positioned for imaging at a vertical viewing angle.
FIG. 46B shows the steerable camera module with its mirror positioned for imaging at an oblique viewing angle.

FIG. 46A and FIG. 46B show the steerable camera module 610 oriented to cover an asymmetric range from vertical to oblique, i.e. half of an equivalent symmetric range. In FIG. 46A the multiplexing mirror 604 is rotated to an extreme position clockwise, and the camera field of view 612 points vertically. In FIG. 46B the multiplexing mirror 604 is rotated to an extreme position anti-clockwise, and the camera field of view 612 points obliquely to the right.

Figure 47:
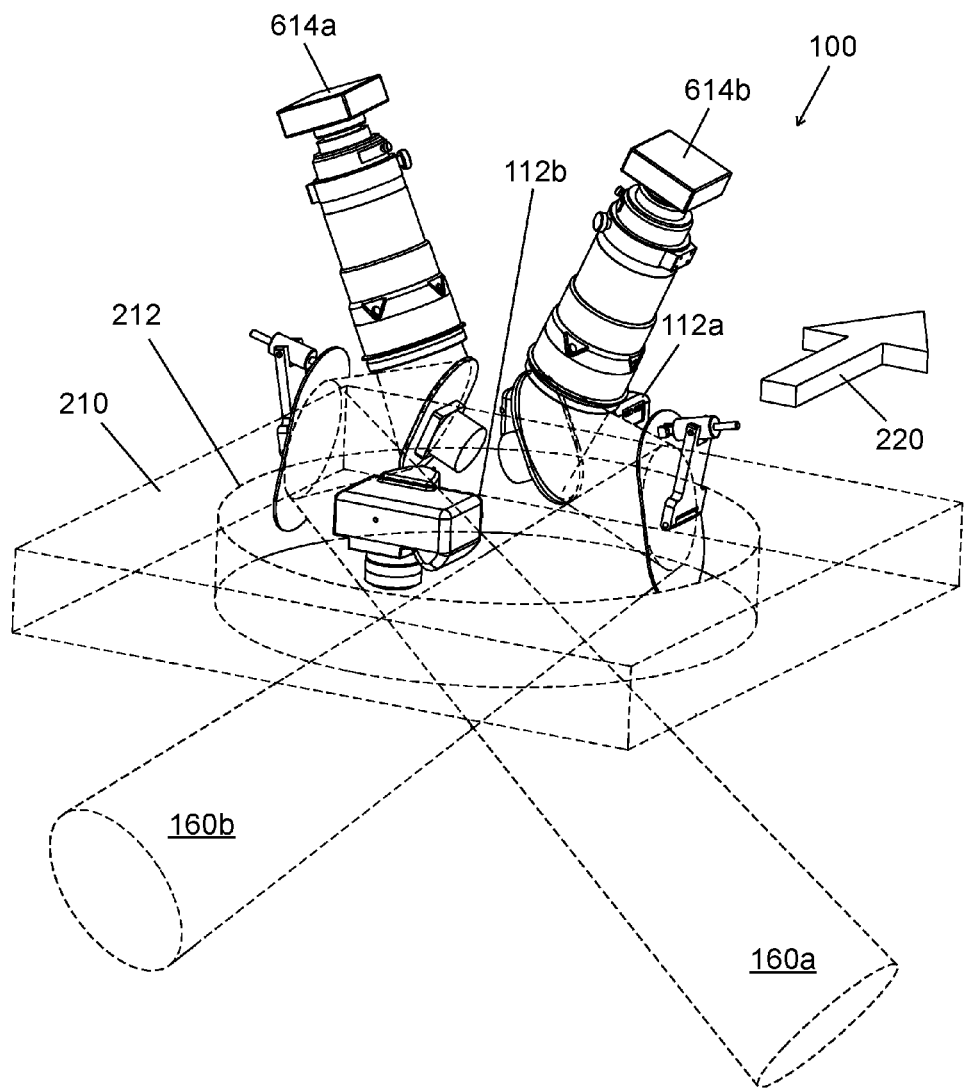
FIG. 47 shows a WS-300 HyperCamera unit comprising two half-field steerable detail camera modules and two fixed overview cameras.

FIG. 47 shows a camera unit 100 implemented using a pair of steerable detail camera modules 614 and a pair of fixed overview cameras 112. Each steerable detail camera module 614 consists of a steerable camera module 610 comprising a detail camera body 110 and detail camera lens 114. Together the two steerable detail camera modules 614 cover a continuous lateral angular field of view of approximately 100 degrees.

Figure 48A:
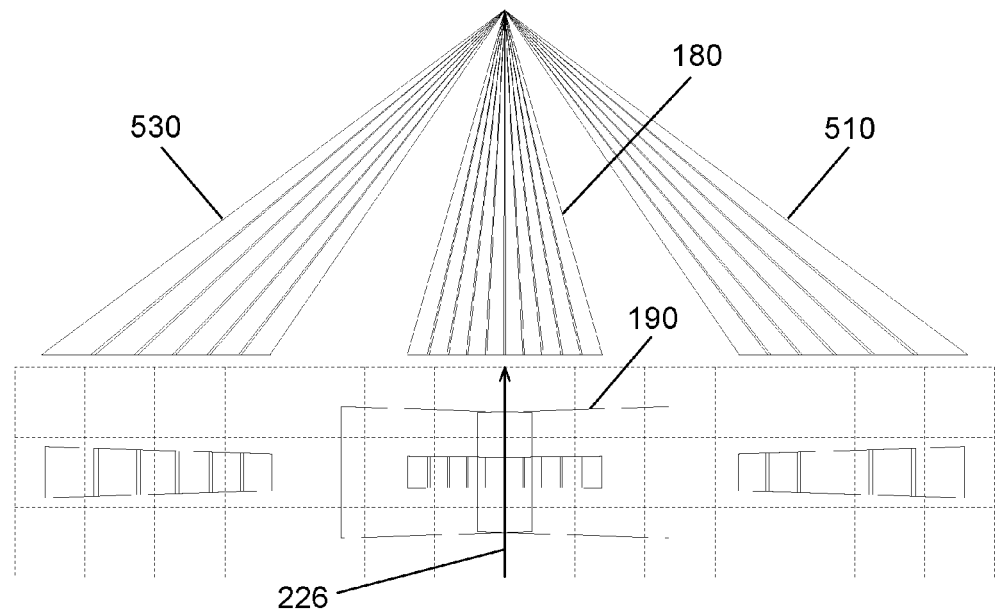
FIG. 48A shows the elevation and plan of the wide-angle field of view of a WS-300 camera unit operating at 16,000 feet.
Figure 48B:
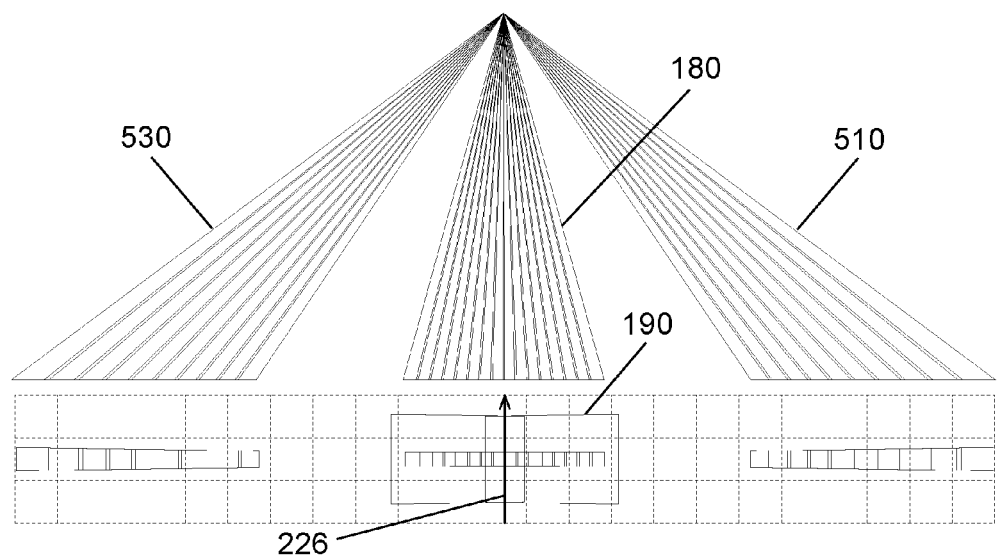
FIG. 48B shows the elevation and plan of the wide-angle field of view of a WS-600 camera unit operating at 28,000 feet.

FIG. 48A shows the elevation and plan of the wide-angle field of view of a 300 mm wide-angle steerable WS-300 camera unit 100, with a pair of fixed overview cameras 122 (e.g. per FIG. 47), operating at 16,000 feet. The field of view comprises the vertical field of view 180 and the two oblique fields of view 510 and 530, arranged symmetrically relative to the flight line 226. FIG. 48B shows the corresponding field of view of a 600 mm WS-600 camera unit operating at 28,000 feet.

FIG. 48A is based on using a WS-300 camera unit comprising Nikon D800 cameras (or similar), while FIG. 48B is based on using a WS-600 camera unit 100 comprising detail cameras utilising the ON Semiconductor VITA 25K 25 Mpixel CMOS image sensor (or similar), as described further below. For illustrative purposes the following figures are all based on using VITA 25K-based cameras (or similar).

Figure 49A:
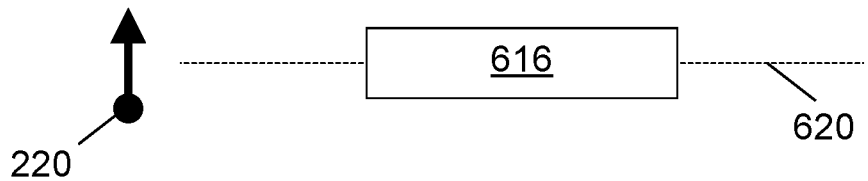
FIG. 49A shows a schematic plan view of a full-field steerable detail camera module.

FIG. 49A shows a schematic plan view of a steerable detail camera module 616. The detail camera steering axis 620 corresponds to the lateral axis of the aggregate detail field of view 180. Wherever a steerable detail camera module 616 is referred to below, a fixed array of cameras could also be used.

Figure 49B:
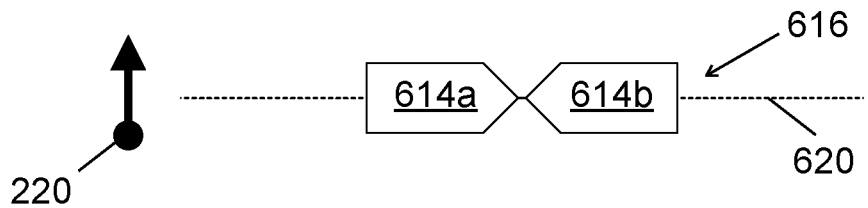
FIG. 49B shows a schematic plan view of a full-field steerable detail camera module comprising a pair of half-field steerable detail camera modules.

The steerable detail camera module 616 may be implemented using one or more steerable camera modules 610, each covering part of the required field of view. For example, FIG. 49B shows the camera module 616 implemented using a pair of half-field steerable detail camera modules 614.

The steerable detail camera module 616 may also be implemented using one or more swinging camera modules, as described in U.S. patent application Ser. No. 10/313,727 (Partynski et al), and U.S. patent application Ser. No. 11/607,511 (Pechatnikov et al), the contents of both of which are herein incorporated by reference.

Figure 49C:
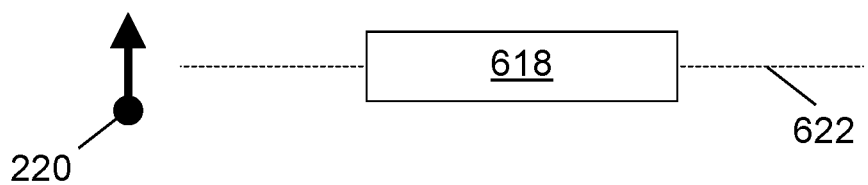
FIG. 49C shows a schematic plan view of a full-field steerable overview camera module.

FIG. 49C shows a schematic plan view of a steerable overview camera module 618. The overview camera steering axis 622 corresponds to the lateral axis of the aggregate overview field of view 190. The steerable overview camera module 618 may be implemented in the same variety of ways as the steerable detail camera module 616.

Figure 49D:
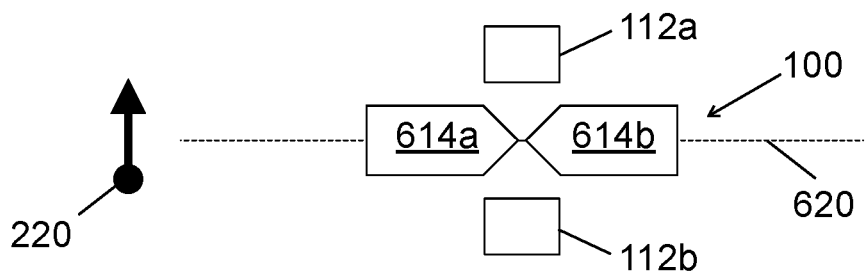
FIG. 49D shows a schematic plan view of a camera unit comprising a pair of half-field steerable detail camera modules and two overview cameras.

FIG. 49D shows a schematic plan view of a camera unit 100 comprising a pair of half-field steerable detail camera modules 614 and two overview cameras 112, i.e. corresponding to the camera unit 100 of FIG. 47.

Figure 49E:
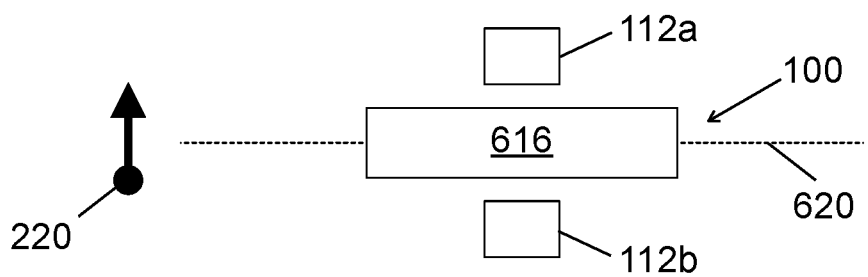
FIG. 49E shows a schematic plan view of a camera unit comprising a full-field steerable detail camera module and two overview cameras.

FIG. 49E shows a schematic plan view of a camera unit 100 comprising a full-field steerable detail camera module 616 and two overview cameras 112, i.e. providing equivalent functionality to the camera unit 100 of FIG. 47 and FIG. 49D.

Figure 50A:
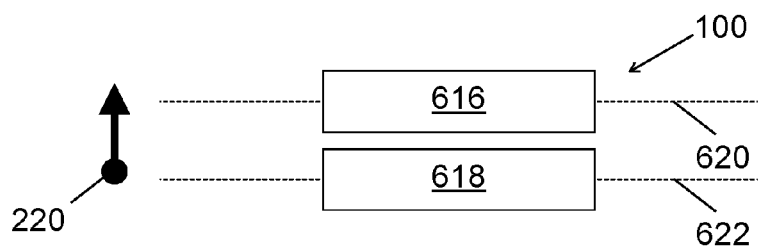
FIG. 50A shows a schematic plan view of a camera unit comprising a full-field steerable detail camera module and a full-field steerable overview camera module.

FIG. 50A shows a schematic plan view of a camera unit 100 comprising a full-field steerable detail camera module 616 and a full-field steerable overview camera module 618.

Figure 50B:
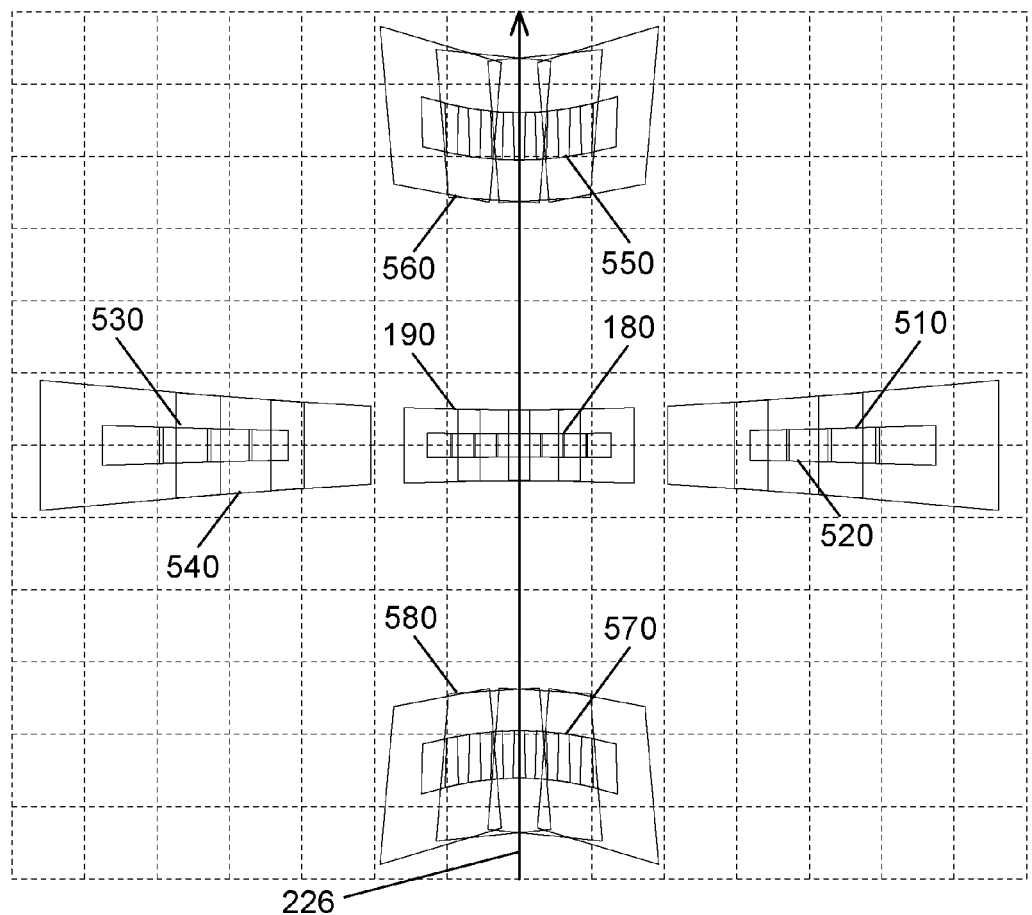
FIG. 50B shows a plan view of a set of vertical and four-way oblique overview and detail fields of view.

FIG. 50B shows a plan view of a set of vertical and four-way oblique overview and detail fields of view, corresponding to the fields of view illustrated in FIG. 35A and FIG. 35B. The five views can be captured using five fixed-array camera units 100 as described in relation to FIG. 35A and FIG. 35B, or using three of the steerable camera units 100 shown in FIG. 50A.

Figure 51A:
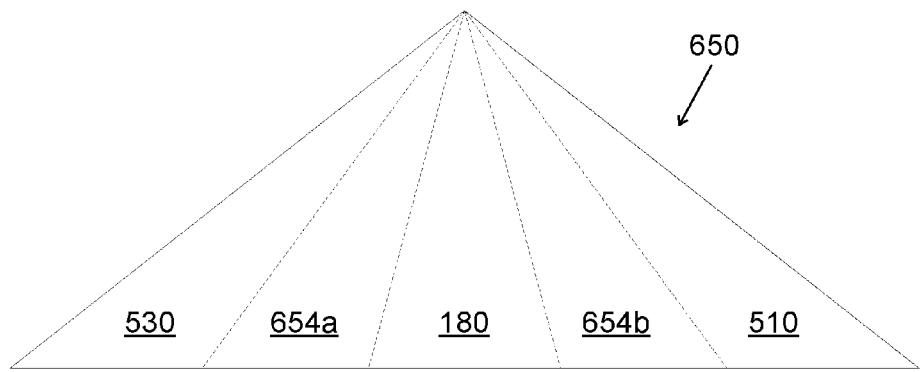
FIG. 51A shows an elevation of the field of view of a wide-angle camera unit, comprising vertical, oblique and interstitial fields of view.

FIG. 51A shows an elevation of the field of view of a wide-angle camera unit 100, comprising the vertical field of view 180, oblique fields of view 510 and 530, and interstitial fields of view 654a and 654b. Capturing the full wide field, i.e. including the interstitial fields of view 654, increases the overlap between adjacent flight lines and the observability of points within both the vertical and oblique fields of view.

Figure 51B:
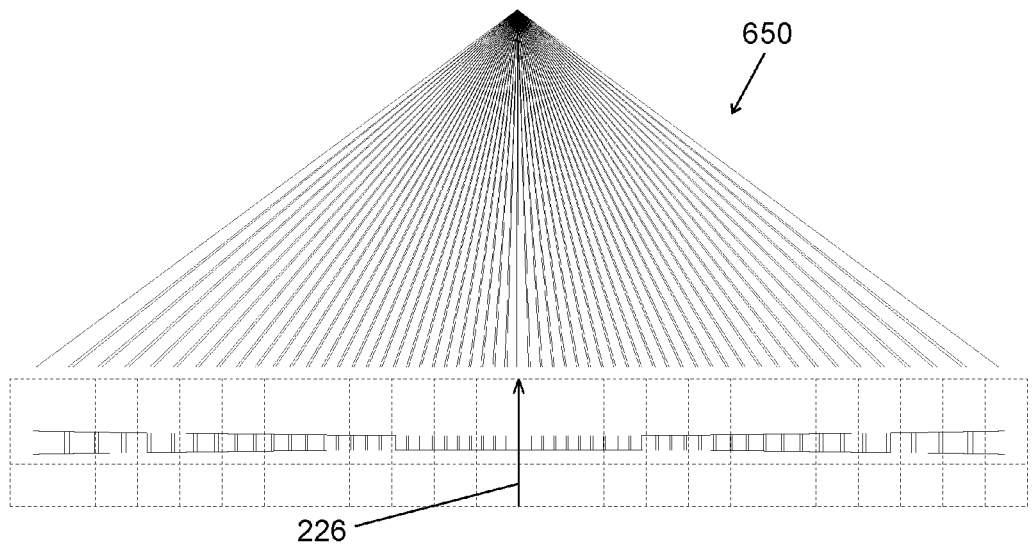
FIG. 51B shows the elevation and plan of the continuous wide-angle field of view of a WS-600 camera unit operating at 28,000 feet.

FIG. 51B shows the elevation and plan of the continuous wide-angle field of view of a WS-600 camera unit 100 operating at 28,000 feet.

Figure 52A:
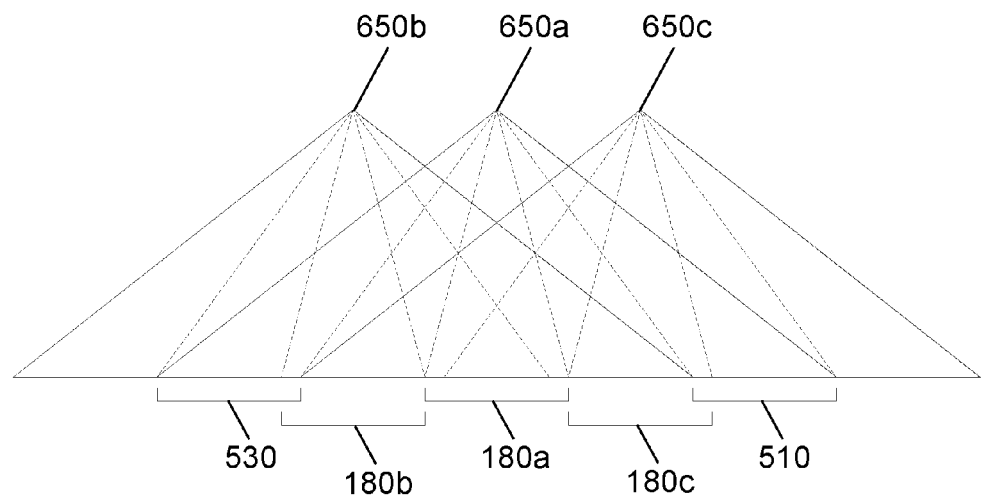
FIG. 52A shows the overlapping lateral fields of view of a wide-angle camera unit from three adjacent flight lines.

FIG. 52A shows the overlapping lateral fields of view of a wide-angle camera unit 100 from three adjacent flight lines, and illustrates how the interstitial fields of view overlap with the vertical and oblique fields of view.

Figure 52B:
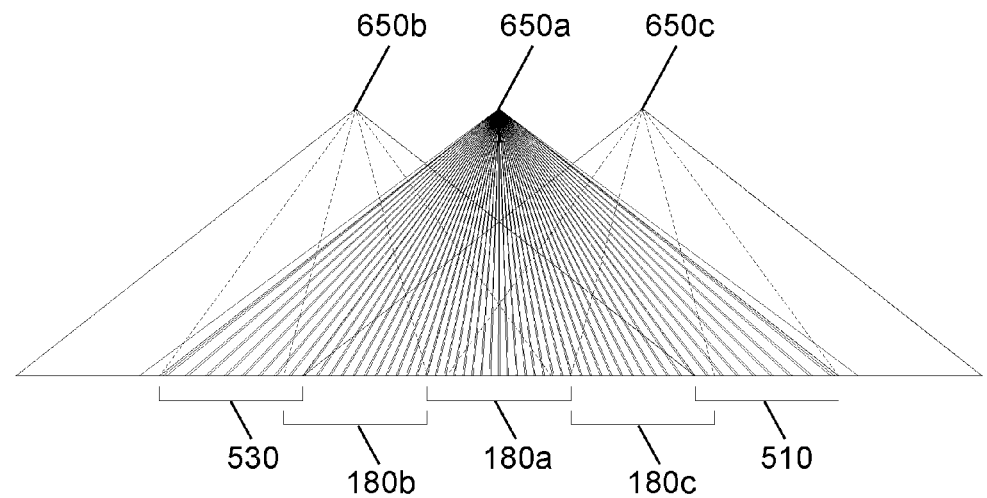
FIG. 52B shows the overlapping lateral fields of view of a wide-angle camera unit from three adjacent flight lines, showing individual camera fields.

FIG. 52B shows the overlapping lateral fields of view of a wide-angle camera unit 100 from three adjacent flight lines, showing individual camera fields.

Figure 53A:
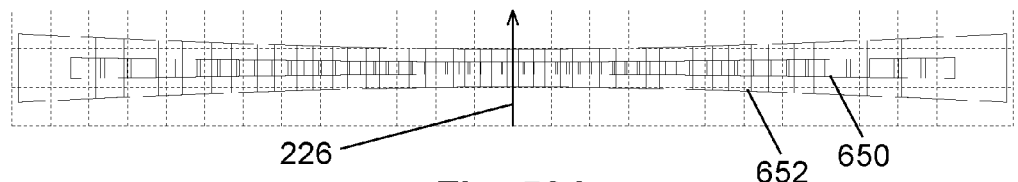
FIG. 53A shows a plan view of the fields of view of a WS-600 camera unit with both overview and detail cameras operating at 28,000 feet.
Figure 53B:
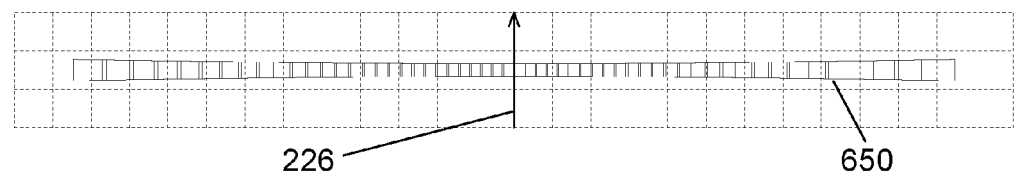
FIG. 53B shows a plan view of the field of view of a WS-600 camera unit with just detail cameras operating at 28,000 feet.

FIG. 53A shows a plan view of the continuous wide-area fields of view of a WS-600 camera unit 100, with both overview cameras 112 and detail cameras 110, operating at 28,000 feet, while FIG. 53B shows the field of view of the same camera unit with just detail cameras 110.

As discussed above, the camera unit 100 can be used to capture detail photos only, with higher overlap, to allow the creation of an orthomosaic with higher spatial accuracy, and elevation data with higher resolution and accuracy.

Longitudinal overlap, i.e. in the flight direction 220, is typically used to capture redundant photos of ground points with stereo disparity. However, when operating at higher altitudes, with longer focal lengths, the longitudinal field of view angle of a detail camera 110 is sufficiently small that little stereo disparity is present in longitudinally overlapping photos.

Figure 53C:
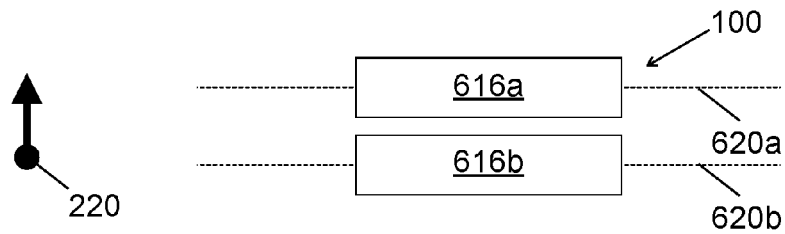
FIG. 53C shows a camera unit comprising two full-field steerable detail camera modules.

An alternative approach is to capture overlapping imagery using a second camera module that is tilted about the lateral axis. FIG. 53C shows a camera unit 100 comprising two full-field steerable detail camera modules 616 for this purpose. The first camera module 616a captures imagery vertically with respect to the lateral axis, while the second camera module 616b captures imagery at e.g. a 20-degree tilt about the lateral axis. The tilt is chosen to maximise the observability of ground points without compromising feature-matching accuracy.

Figure 53D:
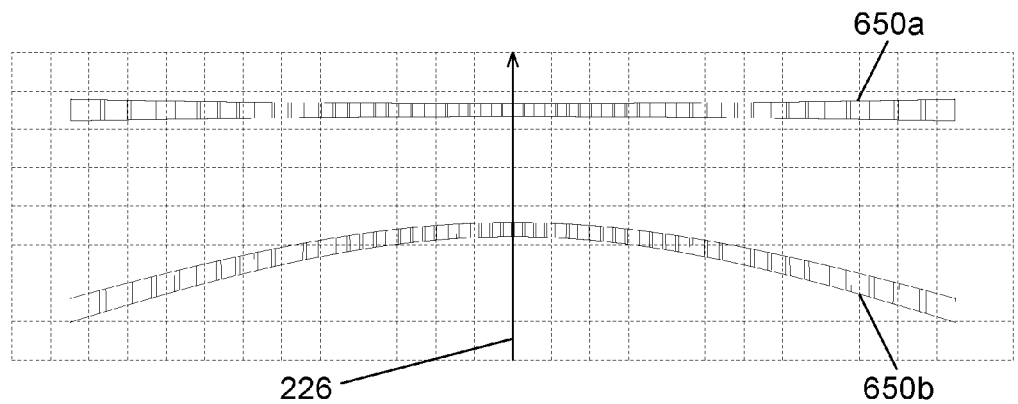
FIG. 53D shows a plan view of the fields of view of a double-field WS-600 camera unit operating at 28,000 feet.

FIG. 53D shows a plan view of the resulting un-tilted field of view 650a and tilted field of view 650b of such a double-field WS-600 camera unit 100 operating at 28,000 feet.

The traditional approach to capturing four-way obliques, as exemplified in FIG. 50B, is to capture obliques in the two lateral directions and the two longitudinal directions simultaneously. However, this results in a more consistent viewing angle in the lateral obliques than the longitudinal obliques, since the longitudinal obliques have a wider horizontal field of view to accommodate a practical flight-line spacing.

An alternative approach is to perform two orthogonal passes over the area of interest, and capture two high-quality lateral obliques during each pass.

Another approach is to capture all obliques with the same narrow horizontal field of view during a single pass, and reduce the flight-line spacing as necessary. When capturing four obliques with the same narrow horizontal field simultaneously, the optimum approach (i.e. the approach that maximises the flight-line spacing and hence the survey efficiency) is to arrange the four oblique directions at 45 degrees to the flight line.

Figure 54:
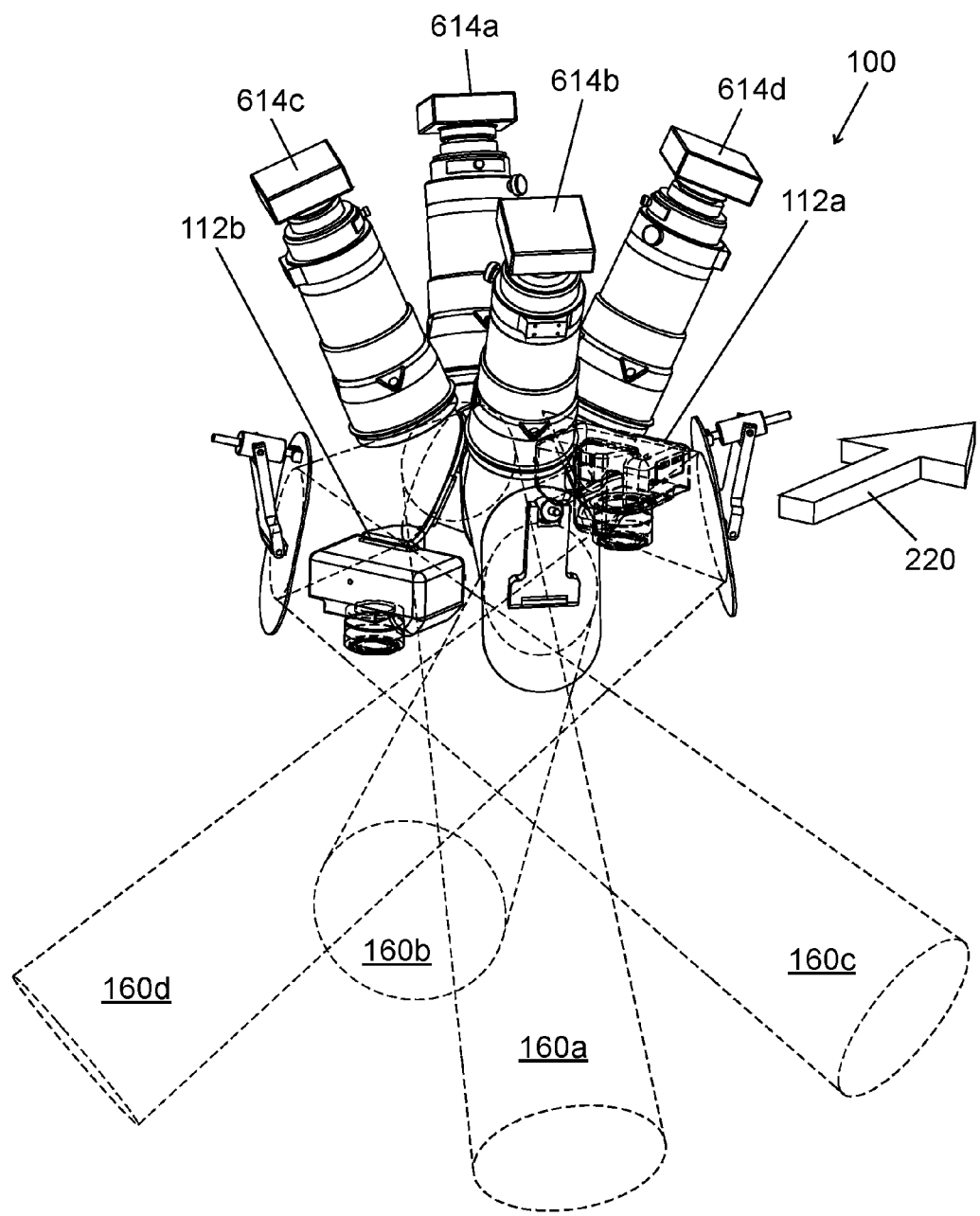
FIG. 54 shows a WS-300 HyperCamera unit comprising four half-field steerable detail camera modules arranged in an X configuration and two fixed overview cameras.

FIG. 54 shows a compact WS-300 HyperCamera unit 100 comprising four half-field steerable detail camera modules 614 arranged in an "X" configuration for the purposes of optimally capturing four high-quality oblique views in a single pass. The WS-300 camera unit 100 also optionally comprises a pair of fixed overview cameras that may be used for dual-resolution imaging or for capturing additional spectral bands such as NIR.

If obliques are desired for the four cardinal directions (north, south, east and west), then the flight lines of the flight plan can be oriented at 45 degrees to the cardinal directions.

Figure 55A:
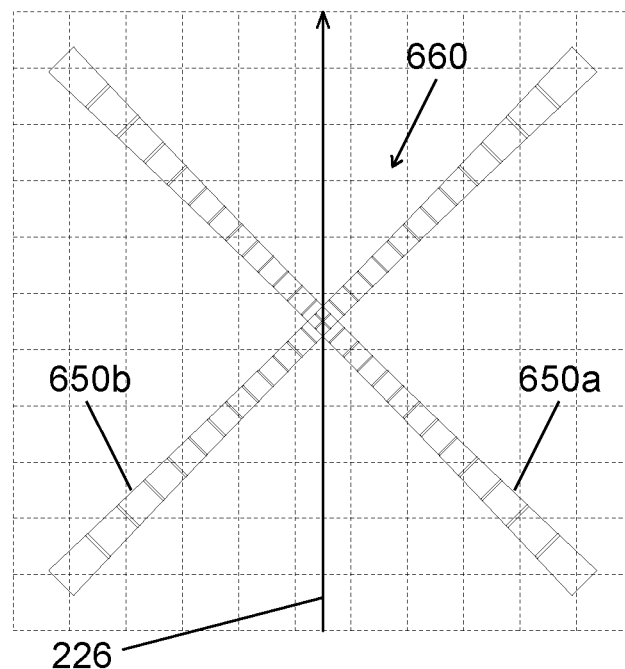
FIG. 55A shows a plan view of the fields of view of an X-configuration WS-300 camera unit operating at 16,000 feet.
Figure 55B:
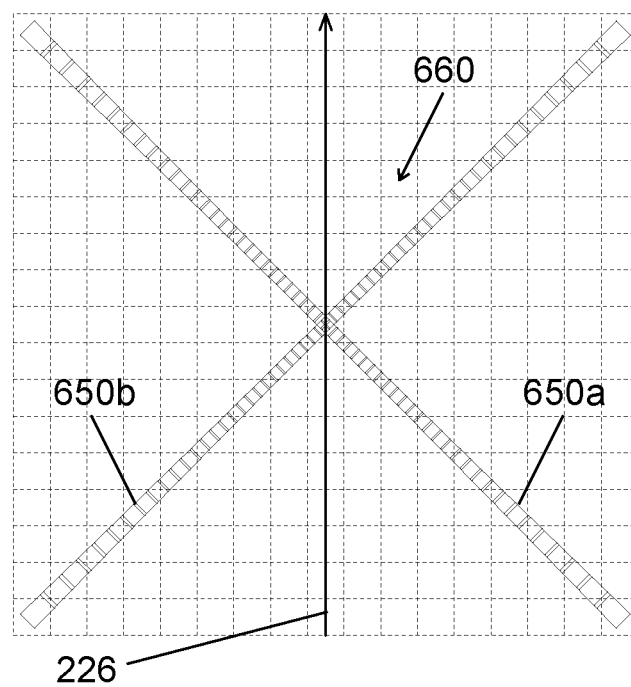
FIG. 55B shows a plan view of the fields of view of an X-configuration WS-600 camera unit operating at 28,000 feet.

FIG. 55A shows a plan view of the complete field of view 660 of an X-configuration WS-300 camera unit operating at 16,000 feet, consisting of two orthogonal fields of view 650a and 650b, while FIG. 55B shows the complete field of view 660 of an X-configuration WS-600 camera unit operating at 28,000 feet. The two overlapping fields 650 provide sufficient overlap and observability that there is no need for additional longitudinal overlap between shots, i.e. beyond the minimum required to avoid longitudinal gaps.

Figure 56A:
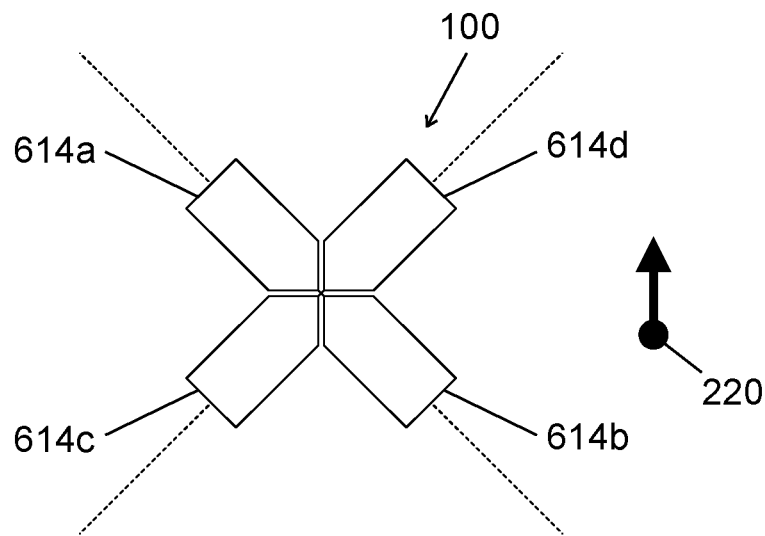
FIG. 56A shows a camera unit comprising two pairs of half-field steerable detail camera modules arranged in an X configuration.
Figure 56B:
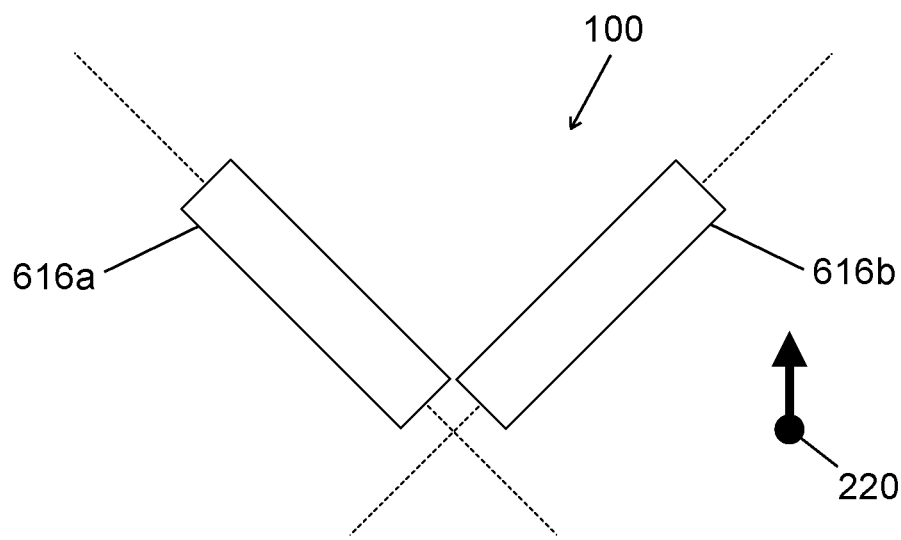
FIG. 56B shows a camera unit comprising two full-field steerable detail camera modules arranged orthogonally.

FIG. 56A shows a schematic plan view of the compact X-configuration camera unit 100 of FIG. 54, while FIG. 56B shows less compact X-configuration camera unit 100 comprising two full-field steerable detail camera modules 616 arranged orthogonally. These can be deployed over two camera holes if necessary.

In order to avoid the reduction in flight-line spacing required by the X-configuration, an additional detail camera module 616 can be used to capture a field perpendicular to the flight direction 220. This additional field may then be used to create the vertical orthomosaic, while the two orthogonal X-configuration fields are used to create oblique orthomosaics (as well as to increase the observability of all ground points).

If the flight-line spacing is not reduced to accommodate the rotated X-configuration fields, then the oblique fields of view within each wide-angle field are correspondingly larger, resulting in slightly lower-quality obliques.

Figure 57A:
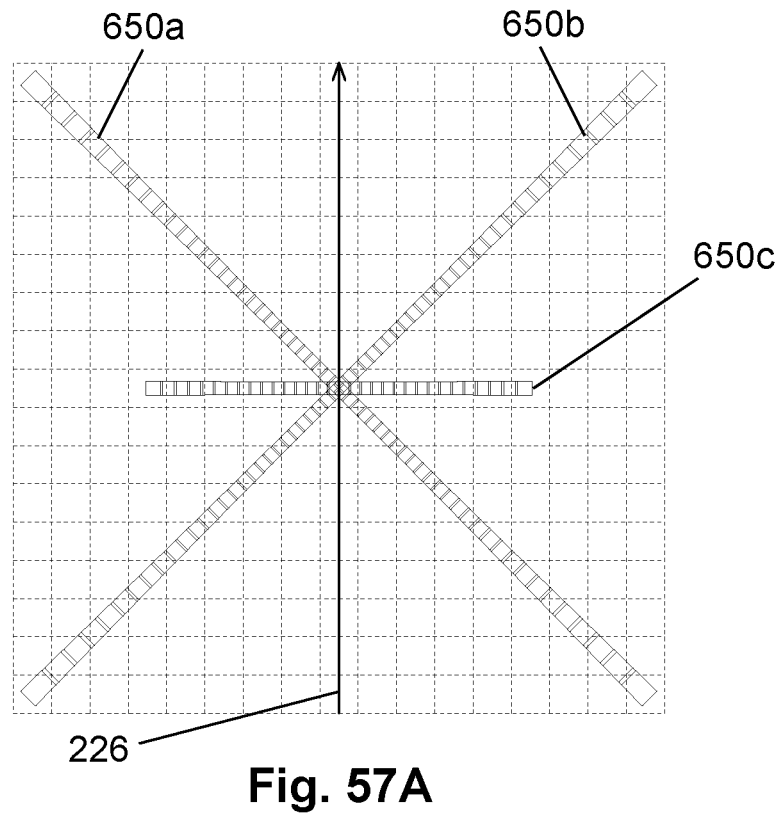
FIG. 57A shows a plan view of the fields of view of an X+1-configuration WS-600 camera unit operating at 28,000 feet.

FIG. 57A shows a plan view of the fields of view 650a, 650b and 650c of such an X+1-configuration WS-600 camera unit 100 operating at 28,000 feet.

Figure 57B:
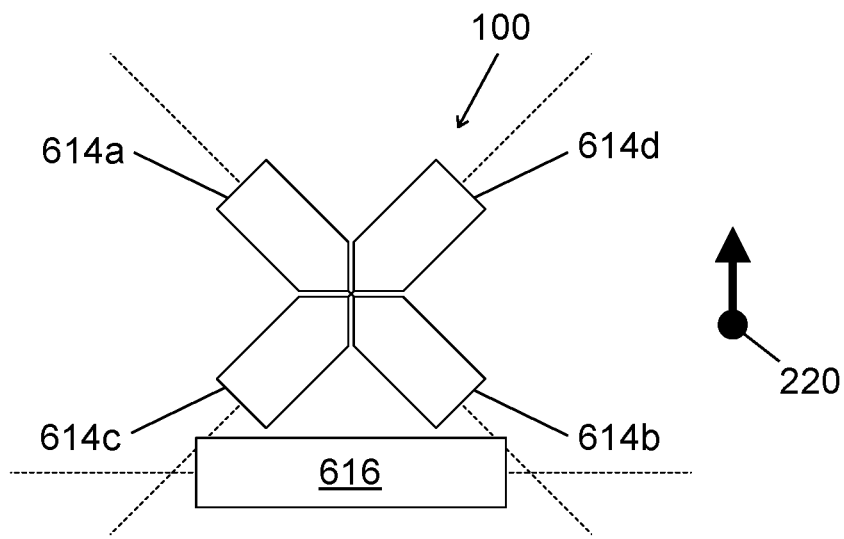
FIG. 57B shows a camera unit comprising two pairs of half-field steerable detail camera modules arranged in an X configuration, as well as a full-field steerable detail camera module.

FIG. 57B shows a schematic plan view of a corresponding camera unit 100 comprising two pairs of half-field steerable detail camera modules 614 arranged in an X configuration, as well as a full-field steerable detail camera module 616 for the perpendicular vertical field.

Figure 58A:
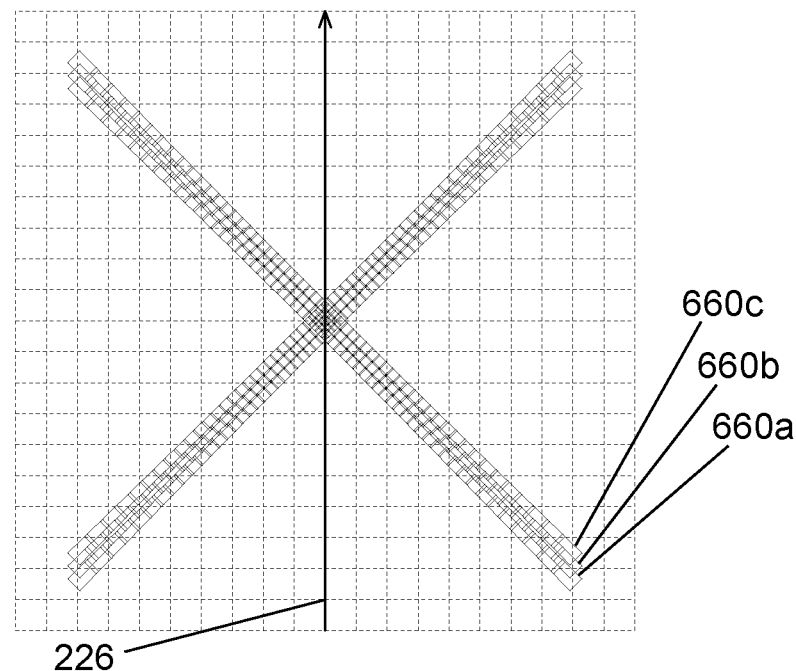
FIG. 58A shows a plan view of three successive shots of an X-configuration WS-600 camera unit operating at 28,000 feet.

FIG. 58A shows a plan view of three successive shots 660a, 660b and 660c of an X-configuration WS-600 camera unit 100 operating at 28,000 feet.

Figure 58B:
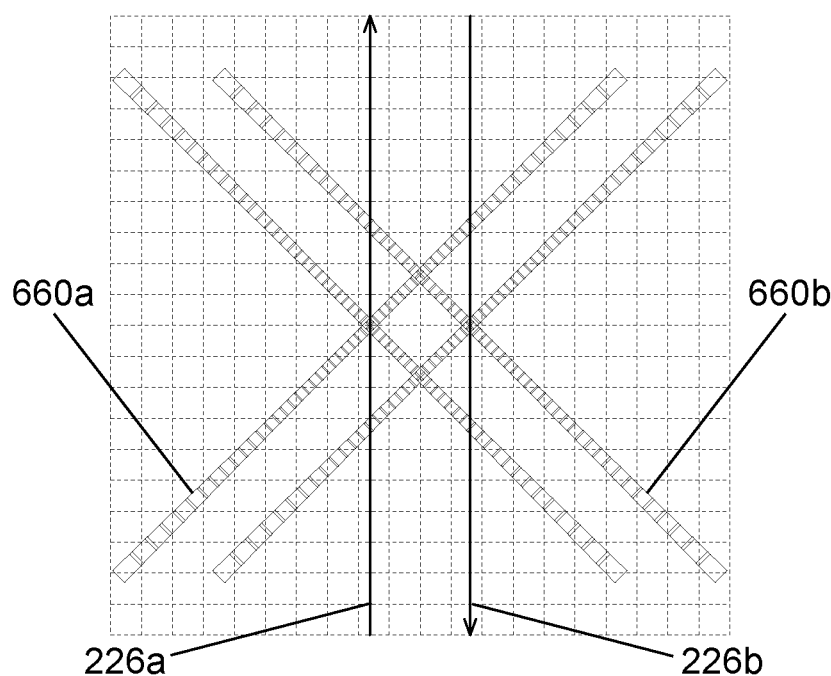
FIG. 58B shows a plan view of shots from two adjacent flight lines of an X-configuration WS-600 camera unit operating at 28,000 feet.

FIG. 58B shows a plan view of shots 660a and 660b from two adjacent flight lines 226a and 226b of an X-configuration WS-600 camera unit 100 operating at 28,000 feet.

Figure 59:
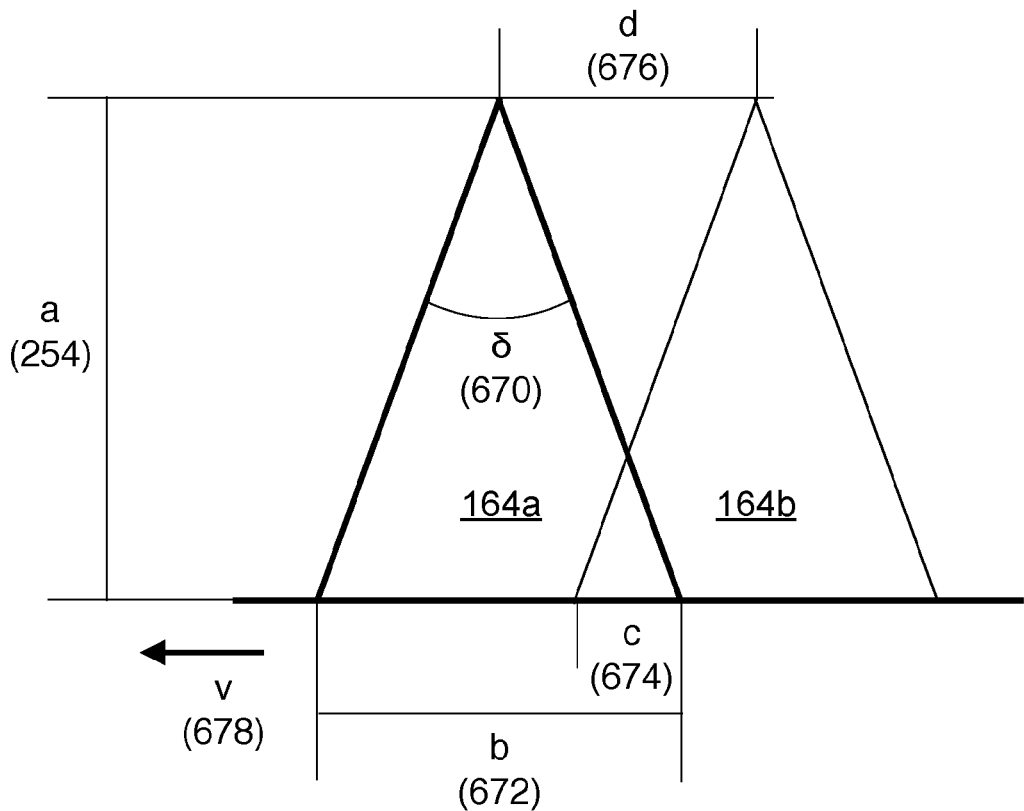
FIG. 59 shows a diagram and equations relating to the calculation of the longitudinal field of view and shot rate of an aerial camera.

The longitudinal footprint (b, 672) of an aerial camera is determined by its longitudinal field of view angle (delta, 670) and its altitude (a, 254), per EQ 11 in FIG. 59. The longitudinal shot spacing (d, 676) is determined by the longitudinal footprint (b, 672) and the desired longitudinal overlap (c, 674), per EQ 12 in FIG. 59. The shot rate (r) is determined by the shot spacing (d, 676) and the velocity (v, 678) of the aircraft, per EQ 13 in FIG. 59.

As described in relation to FIG. 43 above, the lateral field of view angle (gamma, 270) of an array of cameras is a function of the number of cameras (N), the lateral field of view angle (beta, 250) of each camera, and the lateral angular overlap (omega, 272) between adjacent cameras. Likewise, the number of cameras (N) required to cover a particular field of view angle is determined by the target lateral field of view angle (gamma, 270), the lateral field of view (beta, 250) of each camera, and the angular overlap (omega, 272) between adjacent cameras, per EQ 14 in FIG. 60.

Figure 60:
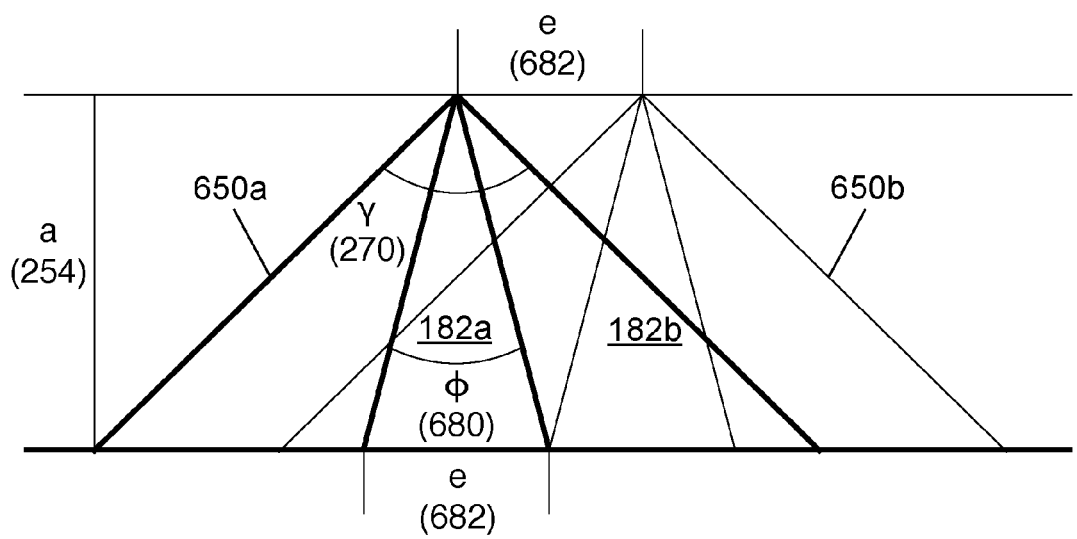
FIG. 60 shows a diagram and equations relating to the calculation of the lateral field of view of an aerial camera system and area capture rate.

If the required number of cameras (N) is realised virtually by time-multiplexing a smaller number of physical cameras (C), then the frame rate (q) of each camera is determined by the required number of cameras (N), the number of physical cameras (C), the shot rate (r), and the duty cycle (u) of the time-multiplexing beam-steering mechanism, per EQ 15 in FIG. 60.

The usable lateral field of view angle (phi, 680) is the field of view angle within which imagery is sufficiently consistent to be used to create a vertical orthomosaic. This may be as low as 20 degrees, or as high as 45 degrees, depending on the required quality of the resultant orthomosaic. This in turn dictates the flight-line spacing (e, 682), per EQ 16 in FIG. 60.

In general, the flight-line spacing (e, 682) should be minimised to maximise the observability of ground points and avoid unobserved ground points (e.g. in urban canyons). This is particularly important for generating high-quality digital surface models, true orthomosaics, and textured 3D surfaces.

The rate at which ground area is captured by an aerial camera system is determined by the flight-line spacing (e, 682) and the velocity (v, 678) of the aircraft, per EQ 17 in FIG. 60.

When the field of view is rotated by a non-zero axis rotation angle (lambda, 686), i.e. relative to a nominal line perpendicular to the flight line 226, various capture parameters change. The resultant shot spacing (d(lambda), 690) is larger, per EQ 18 in FIG. 61. The resultant shot rate (r(lambda)) is smaller, per EQ 19 in FIG. 61. The resultant flight-line spacing (e(lambda), 692) is smaller, per EQ 20 in FIG. 61. The resultant frame rate (q(lambda)) is smaller, per EQ 21 in FIG. 61. And the resultant area capture rate (R(lambda)) is smaller, per EQ 22 in FIG. 61.

Figure 62:
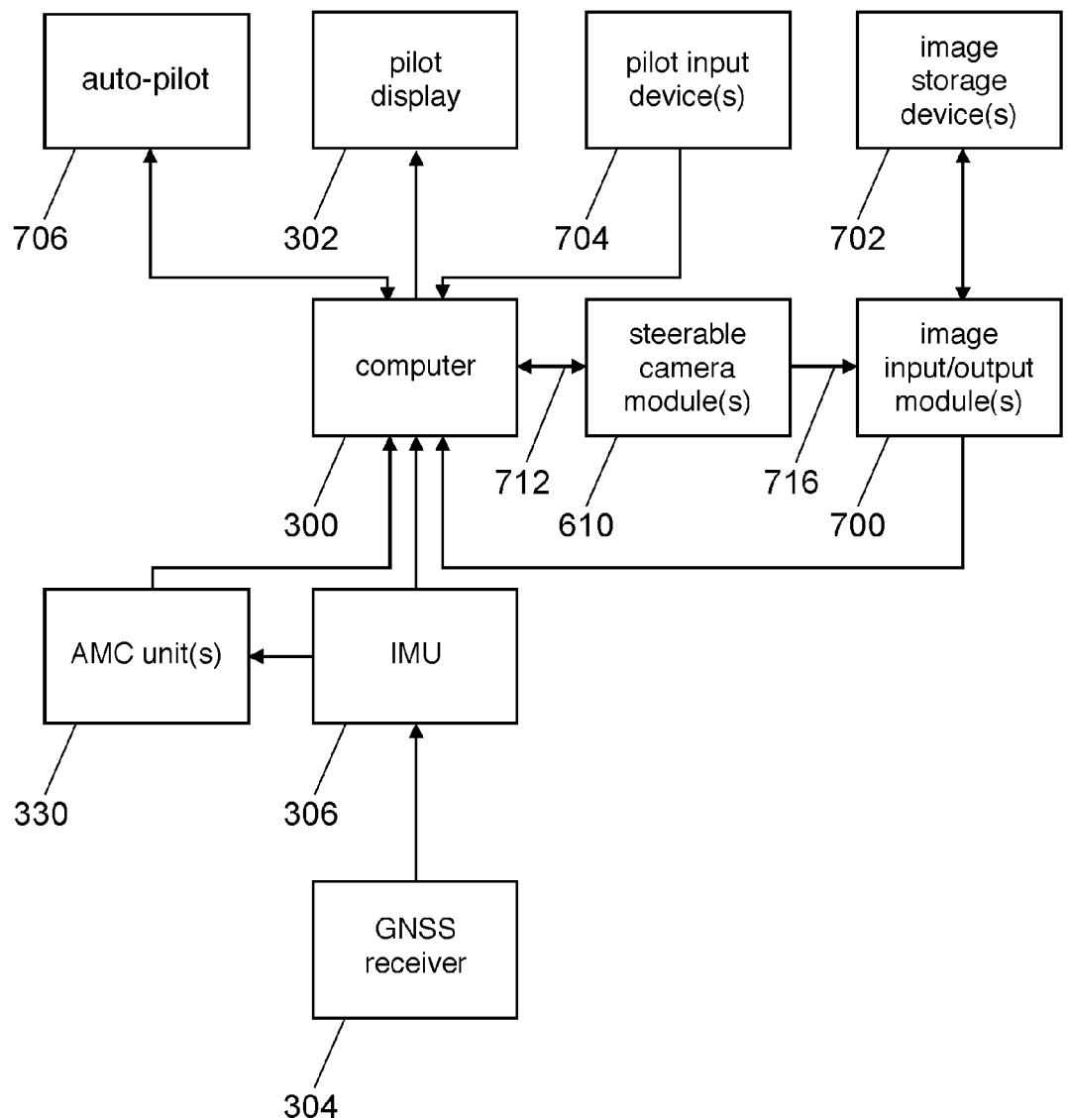
FIG. 62 shows an electronic and mechanical block diagram of a camera unit with steerable camera modules.

FIG. 62 shows an electronic and mechanical block diagram of the camera unit 100 with one or more steerable camera modules 610, and represents a variation of the block diagram in FIG. 20. Blocks have the same functions as in FIG. 20, except as described below. Power is omitted for clarity.

The computer 300 controls one or more steerable camera modules 610, described further below. Real-time imagery from the camera modules is compressed by one or more image input/output modules 700 and stored in one or more image storage devices 702. The image input/output module(s) 700 may also provide the computer with access to the imagery, both for real-time monitoring and for later retrieval. The image storage device(s) 702 comprise removable media to allow dispatch from the field to a processing facility. The input/output module(s) 700 and image storage device(s) 702 may be incorporated in each individual camera 600 (e.g. when the camera 600 is a DSLR such as a Nikon D800), or may be separate.

Image compression can utilise any suitable scheme, including JPEG or a similar DCT-based compression scheme, or JPEG2000 or a similar wavelet-based compression scheme, implemented in hardware or software.

The computer 300 may monitor the quality of photos captured by the cameras and direct the pilot (or auto-pilot) to re-fly affected parts of the flight plan. The computer 300 may monitor the photos to detect poor focus, poor exposure, the presence of cloud or other unwanted objects such as other aircraft, etc.

The pilot input device 704 allow the pilot to provide input to the computer, including to select flight plans, acknowledge alerts, navigate imagery, perform quality assurance, etc. It may comprise any suitable device such as a touch screen (in conjunction with the pilot display 302), tablet, keyboard, etc.

The computer 300 may control the aircraft auto-pilot 706 to direct the aircraft along, and between, each flight line in the flight plan.

Figure 63:
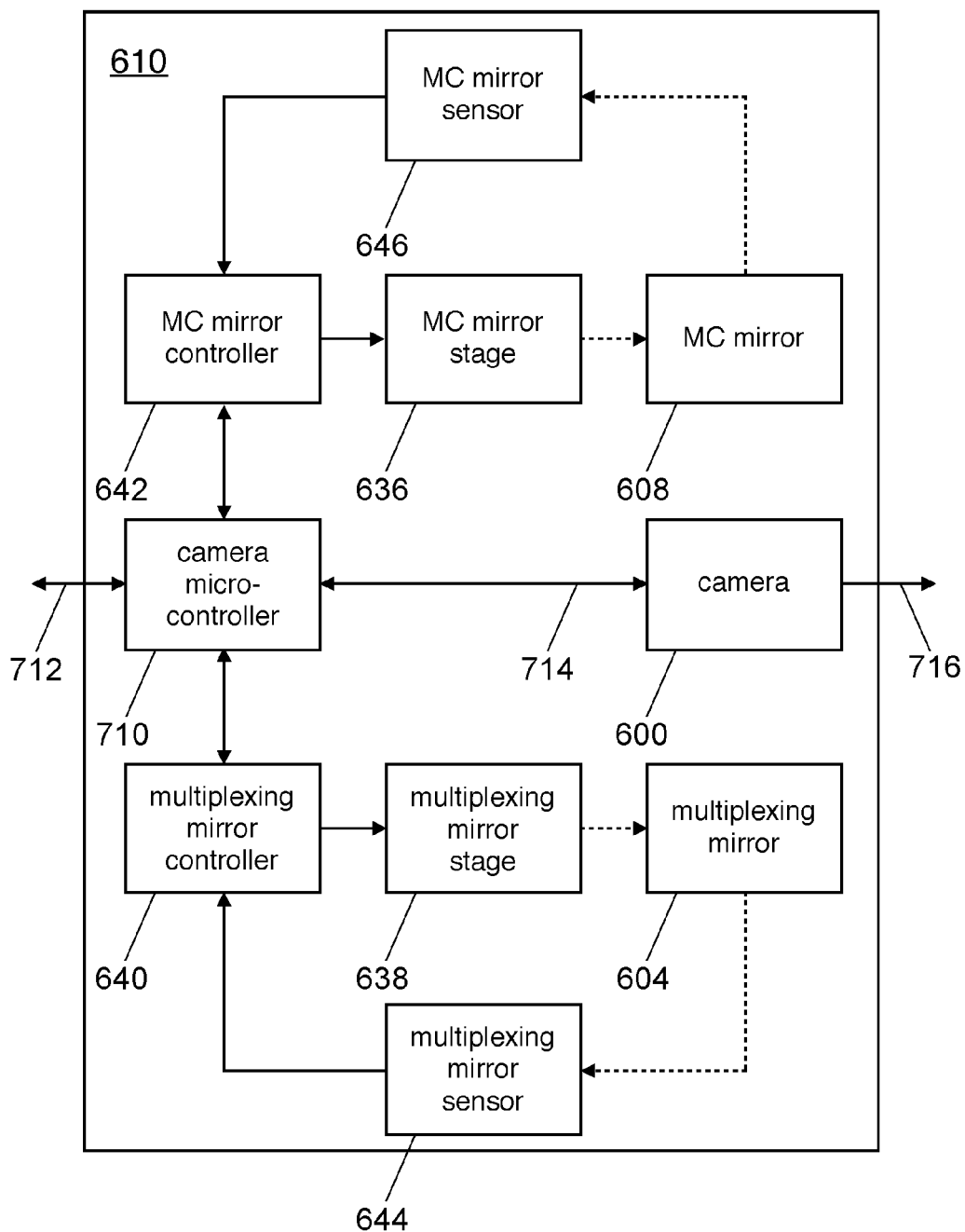
FIG. 63 shows an electronic and mechanical block diagram of a steerable camera module.

FIG. 63 shows an electronic and mechanical block diagram of the steerable camera module 610. Mechanical couplings are shown dashed.

Shot-level timing is maintained by the computer 300, and is provided by the computer 300 to a microcontroller 710 via signals to the microcontroller's control interface 712. The control interface 712 may comprise a serial, USB or Ethernet interface, or any other suitable interface.

Frame-level timing is maintained by the microcontroller 710, and is provided by the microcontroller 710 to the camera 600 via the camera's control interface 714. The microcontroller 710 provides frame-level control of the multiplexing mirror 604 via signals to its controller 640, and the motion-compensation (MC) mirror 608 via signals to its controller 642.

The microcontroller 710 reports the lateral steering angle of each photo to the computer 300, allowing the computer 300 to include the lateral steering angle in the initial estimate of the camera pose of each photo. This is subsequently refined by the bundle adjustment process (at step 412 in FIG. 21), as described above. Photo metadata, including exposure, timing and pose, may be stored by the computer 300 and/or stored alongside each photo on the image storage device(s) 702.

The camera 600 produces a stream of images on its image stream interface 716. The image stream interface 716 may comprise a serial, USB or Ethernet interface, a high-rate interface such as CoaXPress (CXP) or CameraLink (CL), utilising multiple channels if necessary, or any other suitable interface. If the image stream interface 716 comprises a CXP interface then it may also provide the camera control interface 714.

The multiplexing mirror 604 is attached to a goniometer stage 638 which is controlled by the microcontroller 710 via a controller 640. An optional position sensor 644 supports closed-loop control. The goniometer stage 638 may utilise a linear motor as described in relation to FIG. 45 above, or any other suitable actuator or motor including a linear actuator or motor (such as a voice coil actuator) and a rotating motor (such as a stepper motor, DC motor or brushless motor) coupled via a gearbox or worm drive. The controller 640 may be any suitable controller, e.g. a PI C-867 motion controller when used in conjunction with a PI M-272 piezomotor. The position sensor 644 may be of any suitable type, including an optical sensor, capacitive sensor, strain gauge sensor, and eddy-current sensor. The goniometer stage 638 may provide two axes of rotation if the multiplexing mirror is also used to provide motion compensation.

The motion-compensation (MC) mirror 608 is attached to a tip-tilt stage 636 which is controlled by the microcontroller 710 via a controller 642. An optional position sensor 646 supports closed-loop control. The tip-tilt stage 636 may utilise piezoelectric actuators as described in relation to FIG. 45 above, or any other suitable actuators or motors including linear actuators or motors (such as voice coil actuators) and rotating motors (such as stepper motors, DC motors or brushless motors) coupled via a gearbox or worm drive. The controller 642 may be any suitable controller, e.g. a PI E-616 controller when used in conjunction with a PI S-340 tip-tilt stage. The position sensor 646 may be of any suitable type, including an optical sensor, capacitive sensor, strain gauge sensor, and eddy-current sensor.

FIG. 64 shows a tabulation, for an X-configuration steerable camera unit 100 comprising 36 Mpixel cameras, of shot rate (r), frame rate (q) and area capture rate (R) as a function of altitude (a, 254), aircraft speed (v, 678) and usable field of view angle (phi, 680). The tabulation is based on a constant GSD of 7 cm (and hence a focal length that increases with altitude). The daily capture rate is based on six survey hours per day.

Up to 18,000 feet the required frame rate of the camera 600 is below the 4 Hz frame rate of the 36 Mpixel Nikon D800 DSLR, and up 22,000 feet the frame rate is below the 5 Hz frame rate of the Nikon D810 DSLR. For higher altitudes (or higher speeds at lower altitudes), a camera with a higher frame rate can be used.

A variety of high-speed machine vision cameras and high-resolution video cameras are available. Many such cameras utilise CMOS image sensors with a rolling electronic shutter. This leads to geometric distortion in the presence of motion, and makes them incompatible with most motion compensation mechanisms. A smaller number of cameras utilise CMOS image sensors with a global electronic shutter, making them suitable for use in the steerable camera module 610. Cameras which utilise CCD image sensors are also suitable, since CCDs intrinsically have a global electronic shutter. Cameras with external (e.g. mechanical shutters) can also be suitable.

Several medium-resolution and high-resolution global shutter CMOS image sensors are widely used, including the ON Semiconductor 12 Mpixel KAC-12040, 12 Mpixel VITA 12K, 16 Mpixel VITA 16K, and 25 Mpixel VITA 25K; and the CMOSIS 12 Mpixel CMV12000 and 20 Mpixel CMV20000.

The VITA 25K has a pixel pitch of 4.5 microns and supports frame rates up to 53 Hz. The CMV20000 has a pixel pitch of 6.4 microns and support frame rates up to 30 Hz (at 12 bits/pixel). The CMV12000 has a pixel pitch of 5.5 microns and support frame rates up to 180 Hz (at 12 bits/pixel) and 300 Hz (at 10 bits/pixel).

Machine vision cameras utilising the 25 Mpixel VITA 25K include the 32 fps Adimec S-25A30, the 53 fps CMOSVision Condor, and the 53 fps ISVI IC-X25CXP.

Machine vision cameras utilising the 20 Mpixel CMV20000 include the 30 fps Jai SP-20000C-PMCL, and the 30 fps Ximea CB200CG-CM.

Machine vision cameras utilising the 12 Mpixel CMV12000 include the 66 fps Adimec Q-12A65, the 62 fps Basler Beat beA4000-62kc, and the 149 fps IO Industries Flare 12M180-CX.

FIG. 65 shows a tabulation, for a constant 5 cm GSD and a 25 Mpixel X-configuration steerable camera unit 100 (e.g. assuming a camera 600 utilising the ON Semiconductor VITA 25K image sensor), of shot rate, frame rate and area capture rate. The CMOSVision Condor and the ISVI IC-X25CXP support 5 cm GSD capture up to 54,000 feet.

FIG. 66 shows a tabulation, for a constant 5 cm GSD and a 12 Mpixel X-configuration steerable camera unit 100 (e.g. assuming a camera 600 utilising the CMOSIS CMV12000 image sensor), of shot rate, frame rate and area capture rate. The Flare 12M180-CX supports 5 cm GSD capture beyond 60,000 feet.

The observability of ground points and the quality of 3D textures can be further increased by increasing the number of viewing directions beyond the four of the X-configuration.

Figure 67A:
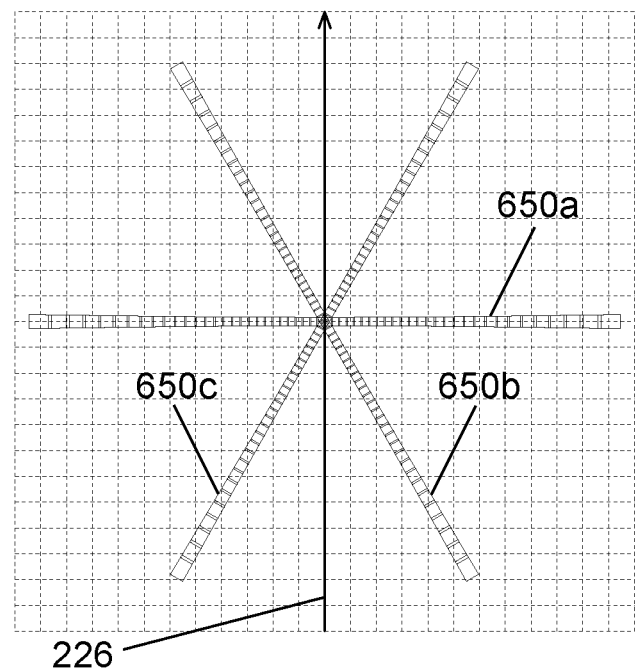
FIG. 67A shows a plan view of the fields of view of a three-field WS-600 camera unit operating at 28,000 feet.
Figure 67B:
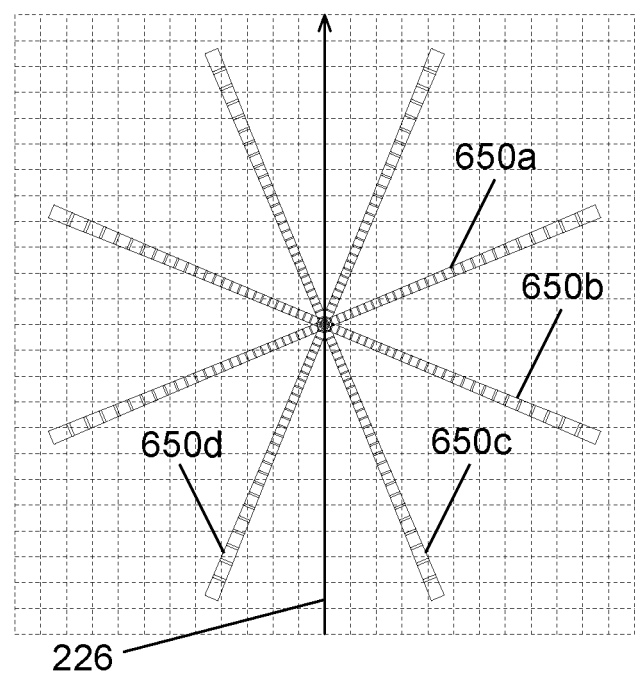
FIG. 67B shows a plan view of the fields of view of a four-field WS-600 camera unit operating at 28,000 feet.
Figure 68A:
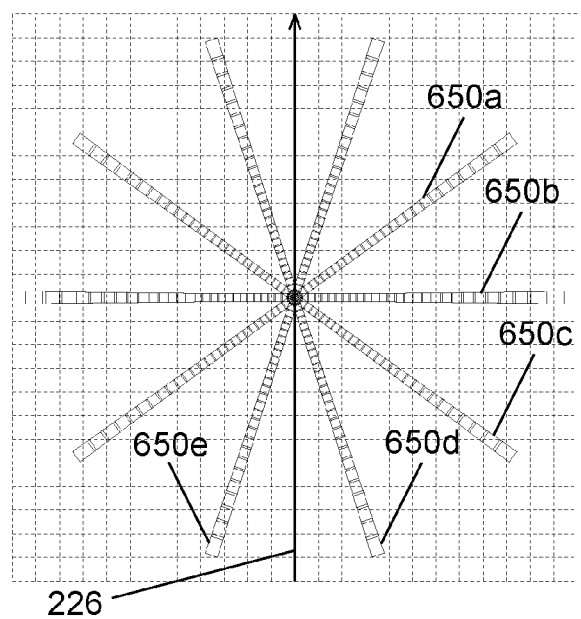
FIG. 68A shows a plan view of the fields of view of a five-field WS-600 camera unit operating at 28,000 feet.

FIG. 67A shows a plan view of the fields of view of a three-field WS-600 camera unit 100 operating at 28,000 feet. FIG. 67B shows a plan view of the fields of view of a four-field WS-600 camera unit 100 operating at 28,000 feet. FIG. 68A shows a plan view of the fields of view of a five-field WS-600 camera unit 100 operating at 28,000 feet.

These fields of view can also be captured using multiple camera units 100, with each camera unit 100 deployed over a separate camera hole. For example, four-field capture can be performed using two X-configuration camera units 100 rotated 45 degrees relative to each other.

In general, for an M-field camera unit 100, the fields should be evenly spaced angularly, i.e. 180/M degrees apart, and should be arranged symmetrically with respect to the flight direction, i.e. one field should be rotated 90/M degrees from the flight direction.

Figure 61:
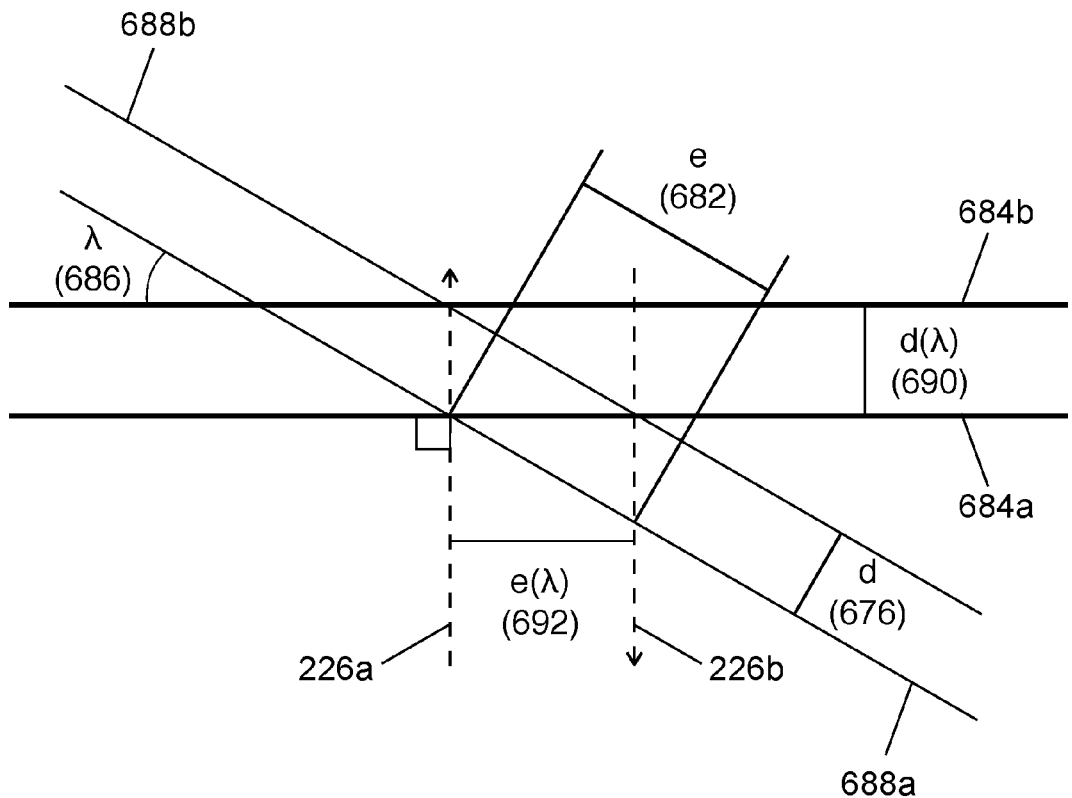
FIG. 61 shows a diagram and equations relating to the effect of field of view rotation on aerial camera system shot, frame and area capture rates.

If the absolute rotation of the fields relative to the flight direction varies (as in FIG. 67A, FIG. 67B and FIG. 68A), then the minimum adjusted flight-line spacing, given by EQ 20 in FIG. 61, is determined by the field with the smallest absolute rotation difference, while the maximum adjusted frame rate, given by EQ 21 in FIG. 61, is determined by the field with the largest absolute rotation difference.

Figure 68B:
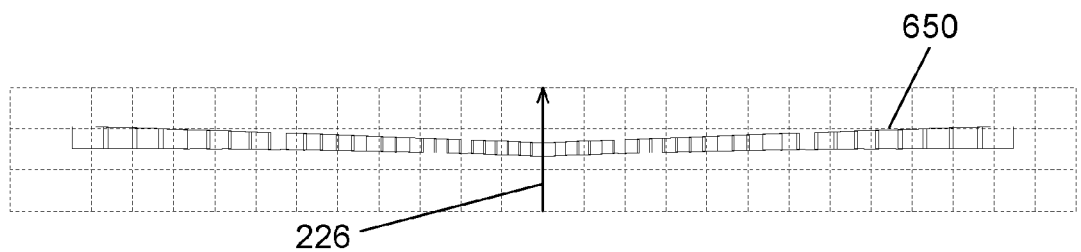
FIG. 68B shows a plan view of the staggered field of view of a single-field WS-600 camera unit operating at 28,000 feet.

Successive frames captured by a time-multiplexed camera 600 in a steerable camera unit 610 are necessarily displaced in the direction of flight due to the forward motion of the aircraft, an effect ignored for clarity in previous figures. Adjacent frames are therefore slightly staggered, as illustrated in FIG. 68B for a single-field dual-camera WS-600 camera unit 100 operating at 28,000 feet. In the figure the two cameras 600 of the camera unit 100 are simultaneously steered from the centre outwards. The induced stagger has no effect on the degree of overlap within and between flight lines since the effect is systematic.

Figure 69:
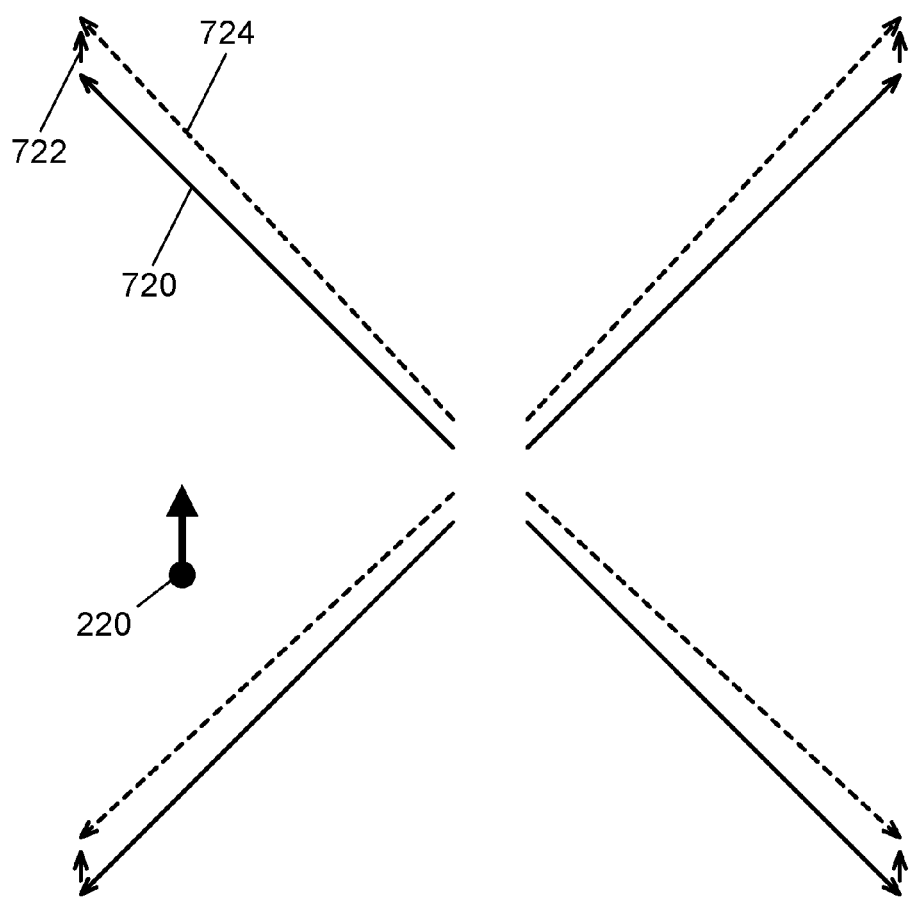
FIG. 69 shows a plan view of systematic motion vectors to be corrected.

FIG. 69 shows a plan view of the systematic motion vectors to be corrected for each of the four cameras 600 of an X-configuration camera unit 100. If the steerable multiplexing mirror 604 is moved continuously then its motion vector 720 is dominant. The motion of the aircraft adds a smaller constant forward motion vector 722, producing the resultant motion vector 724 (shown dashed).

If linear angular motion of the multiplexing mirror 604 is corrected by oscillating the motion-compensation mirror 608, then the average angular velocity of the motion-compensation mirror 608 during the exposure period is matched to the constant angular velocity of the multiplexing mirror 604, and the phase of the oscillation is aligned with the exposure interval so that the maximum correcting angular velocity is aligned with the centre of the exposure interval.

Figure 70:
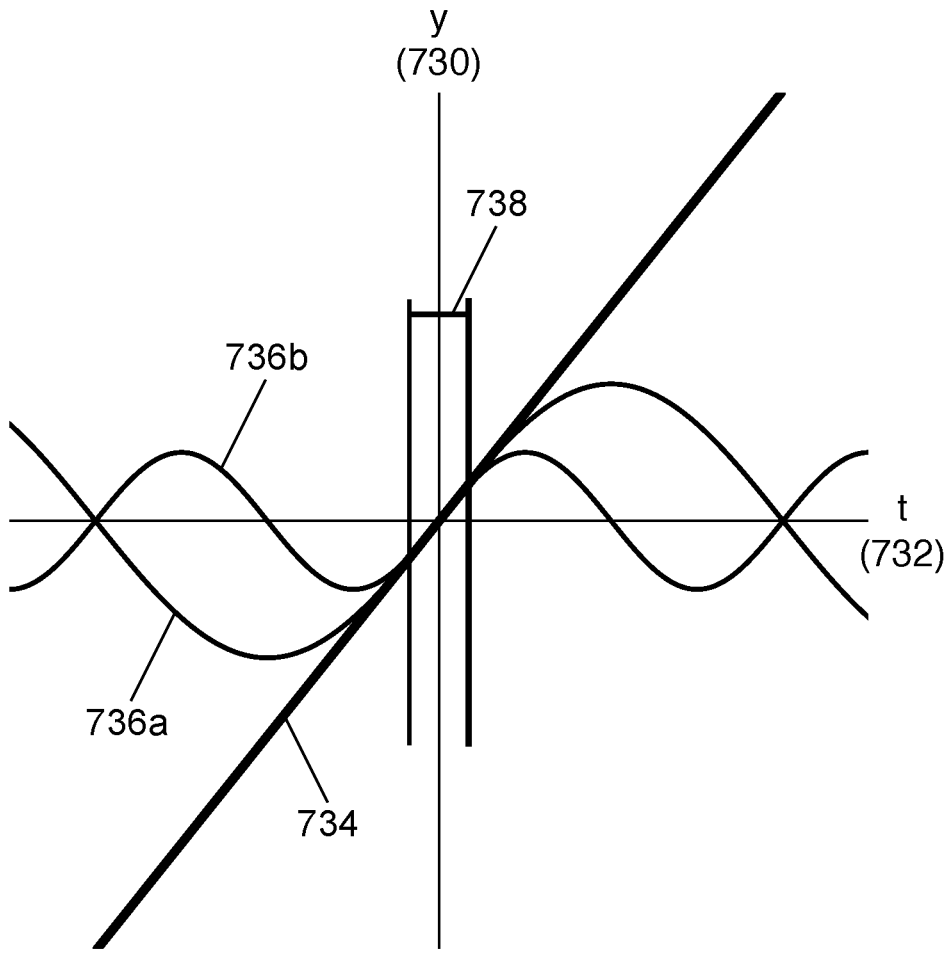
FIG. 70 shows a graph of angular position as a function of time for a multiplexing mirror and a motion-compensation mirror when the latter is used to correct the motion of the former.

FIG. 70 shows angular position (y, 730) as a function of time (t, 732) for the multiplexing mirror 604 and the motion-compensation mirror 608 when the latter is used to correct the motion of the former. Graph 734 shows the linear motion of the multiplexing mirror 604, while the graphs 736a and 736b show two possible sinusoidal motions of the motion-compensation mirror 608, each with its maximum velocity aligned with the centre of the exposure interval 738.

The angular position (y, 730) of the motion-compensation mirror 608 is a function of the amplitude (A) and frequency (f) of the oscillation, and time (t, 732), per EQ 23 in FIG. 70. The angular velocity (dy/dt) of the motion-compensation mirror 608 is the derivative of EQ 23, per EQ 24, and it is at a maximum when the cosine is one, per EQ 25. The average angular velocity of the mirror 608 over the exposure interval 738 is the integral of EQ 24, divided by the exposure interval, per EQ 26.

Since the angular velocity (dy/dt) is proportional to both the amplitude (A) and the frequency (f) of the oscillation, per EQ 24, the angular velocity of the motion-compensation mirror 608 can be matched to the angular velocity of the multiplexing mirror 604 by varying both its amplitude and its frequency. To maintain phase alignment, however, the frequency must be an integer multiple of the camera frame rate. Sinusoid 736a has twice the amplitude and half the frequency of sinusoid 736b, hence they have the same angular velocity where they're in phase (e.g. at t=0 in FIG. 70).

Figure 71:
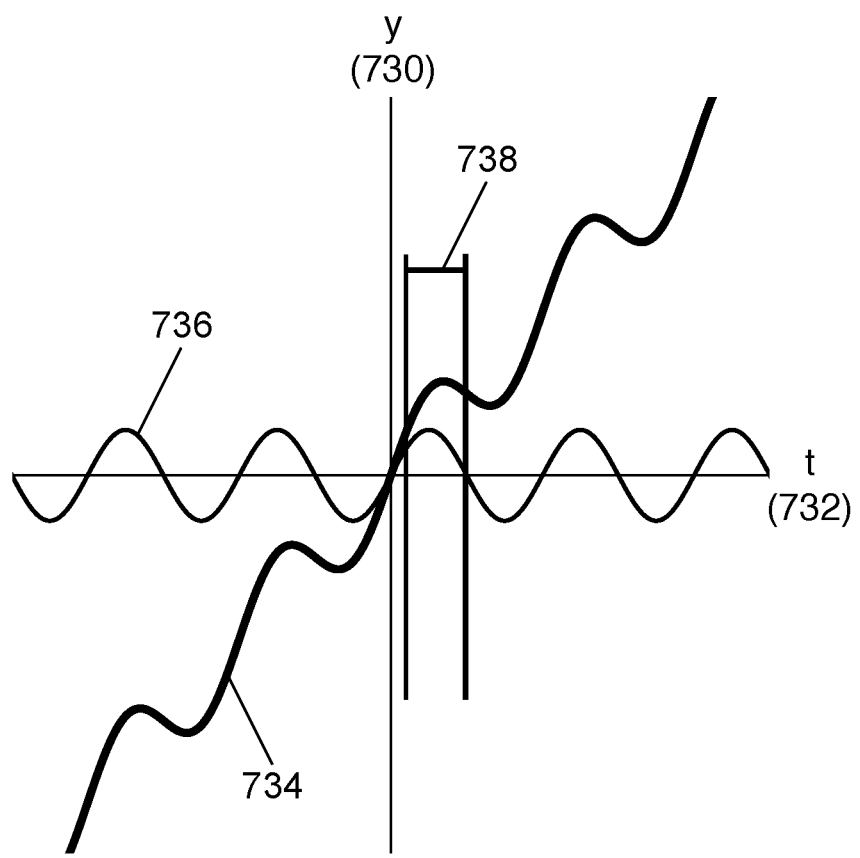
FIG. 71 shows a graph of the linear motion of a multiplexing mirror modulated by a sinusoid, periodically slowing the mirror.

As shown by graph 734 in FIG. 71, the linear motion of the multiplexing mirror 604 may be modulated by a sinusoid, periodically slowing and even reversing it. This allows the angular velocity of the motion-compensation mirror 608 to be matched to the angular velocity of the multiplexing mirror 604 via a low-amplitude sinusoid 736, with a slight phase delay to account for the asymmetry of the motion of the multiplexing mirror 604. Once again the average velocities are matched over the exposure interval.

Figures 72A, 72B:
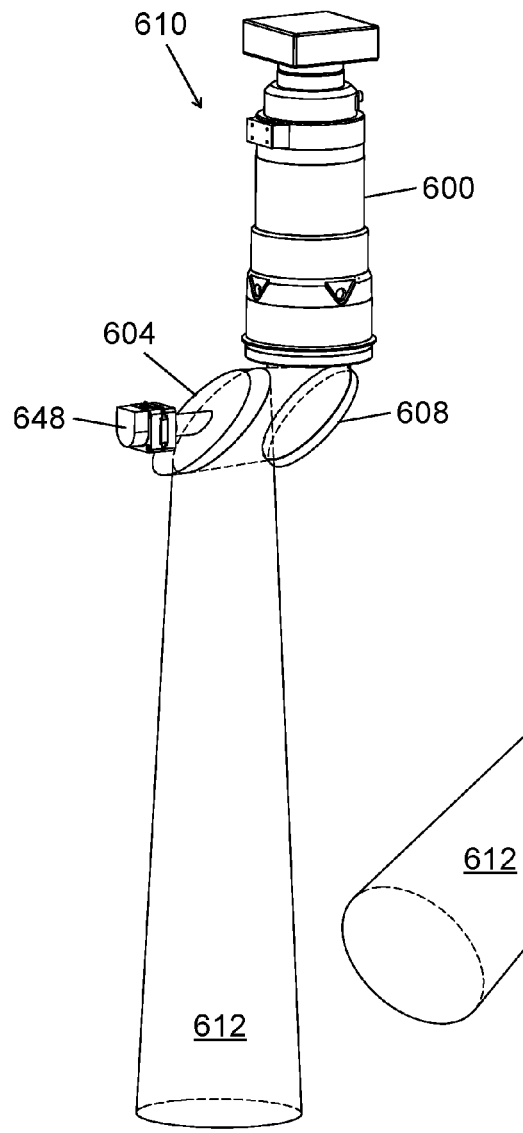
FIG. 72A shows an alternative steerable camera module utilising a spinning primary mirriro, with its mirror positioned for imaging at a vertical viewing angle.
FIG. 72B shows the steerable camera module with its mirror positioned for imaging at an oblique viewing angle.

FIG. 72A shows an alternative realisation of the steerable camera module 610, wherein the multiplexing mirror 604 is mounted at 45 degrees to the optical axis and configured to spin about the optical axis, thereby allowing the field of view 612 of the camera 600 to be steered from side to side. The mirror 604 is coupled to and spun by a rotating motor 648. The motor 648 may be any suitable rotating motor (such as a stepper motor, DC motor or brushless motor). Alternatively the mirror may be coupled to a linear actuator or linear motor via a gear.

As usual, motion-compensation mirror 608 (or fixed mirror 606 in its place) provides the function of bending the optical axis to allow more convenient vertical mounting of the camera 600. As shown, it bends the optical axis approximately 90 degrees, from vertical to horizontal. Motion-compensation mirror 608 may also provide the motion-compensation functions described earlier (in conjunction with motor or actuator 636, not shown).

FIG. 72A shows steerable camera module 610 with the multiplexing mirror 604 positioned for vertical imaging, while FIG. 72B shows the steerable camera module 610 with the multiplexing mirror 604 positioned for imaging at an oblique angle.

Figure 73A:
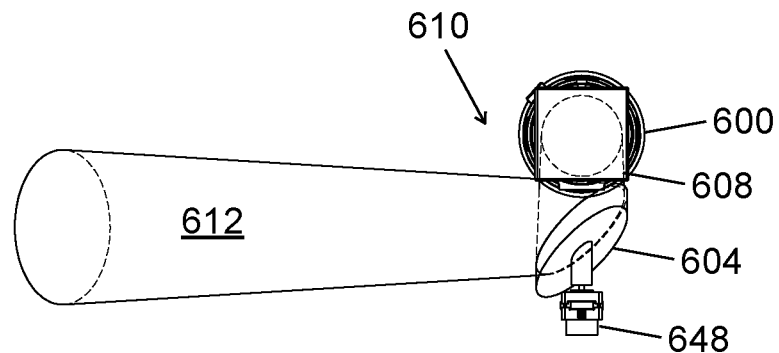
FIG. 73A shows a plan view of the steerable camera module with its mirror positioned for imaging at an oblique viewing angle.
Figure 73B:
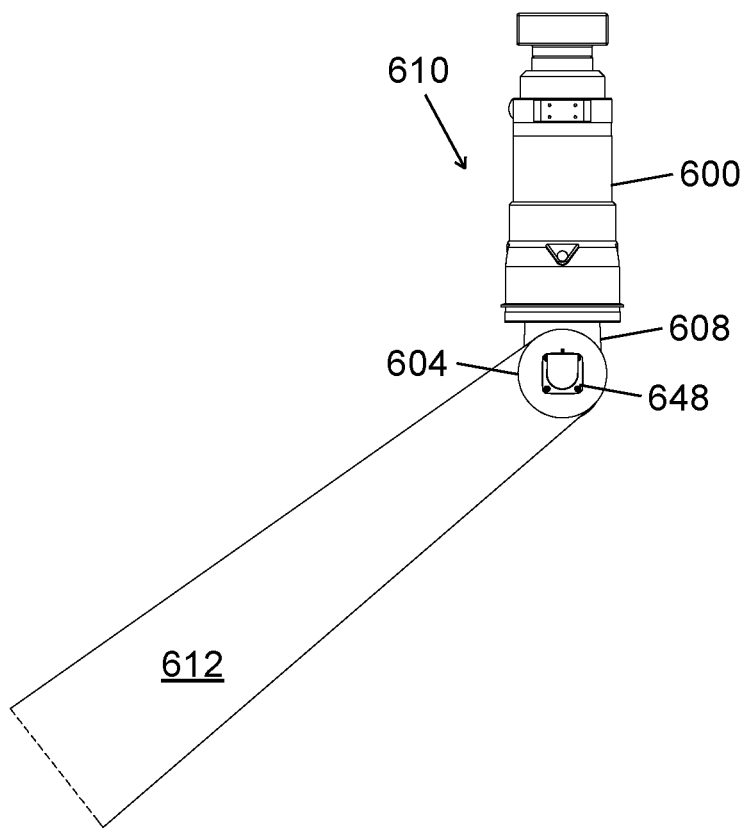
FIG. 73B shows a back elevation of the steerable camera module with its mirror positioned for imaging at an oblique viewing angle.

FIG. 73A and FIG. 73B show a plan view and back elevation, respectively, of the steerable camera module 610 of FIG. 72A, both with the multiplexing mirror 604 positioned for imaging at an oblique angle.

The steerable camera module 610 of FIG. 72A supports a wider steering range than the steerable camera module 610 of FIG. 45, thus allowing the design of more compact and/or less expensive camera units 100.

Figure 74:
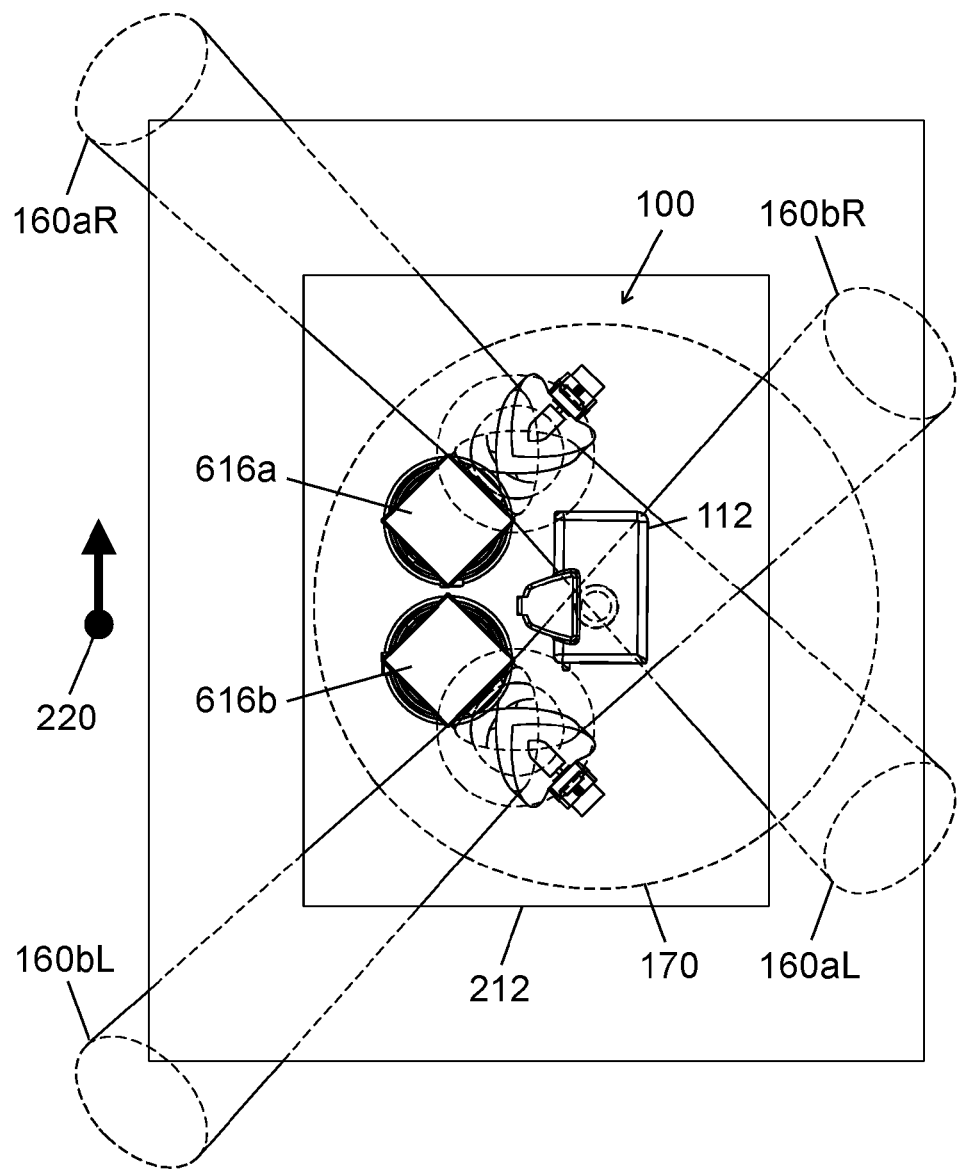
FIG. 74 shows a plan view of a WS-300 HyperCamera unit comprising two full-field steerable detail camera modules and one fixed overview camera.

FIG. 74 shows a plan view of a WS-300 HyperCamera unit 100 comprising two full-field steerable detail camera modules 616 utilising the spinning multiplexing mirror design of FIG. 72A, and one fixed overview camera 112. This camera unit 100 supports the same complete detail field of view 660 as the camera unit 100 of FIG. 54, but using two detail cameras instead of four. Each of the two detail cameras operate at a frame rate twice that of each of the four detail cameras. The field of view 160 of each camera module 616 is shown at its two oblique extremes (R=right, L=left).

Figure 75A:
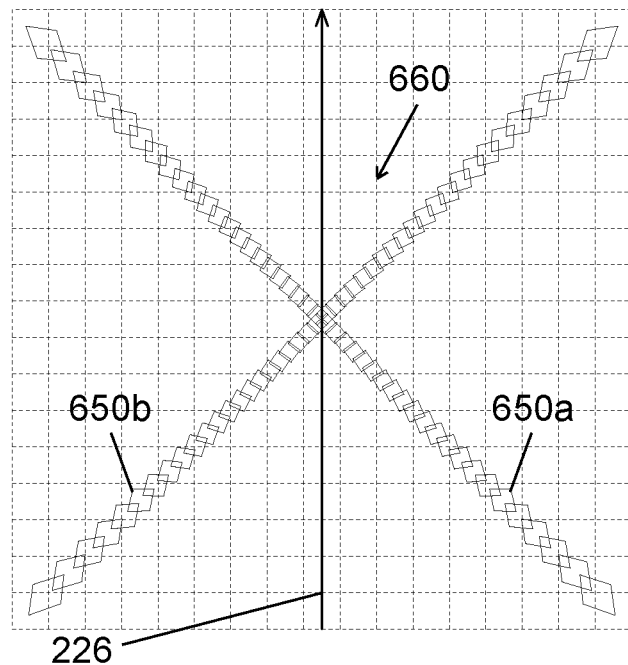
FIG. 75A shows a plan view of the fields of view of an X-configuration WS-600 camera unit using the alternative steerable camera module and operating at 28,000 feet.
Figure 75B:
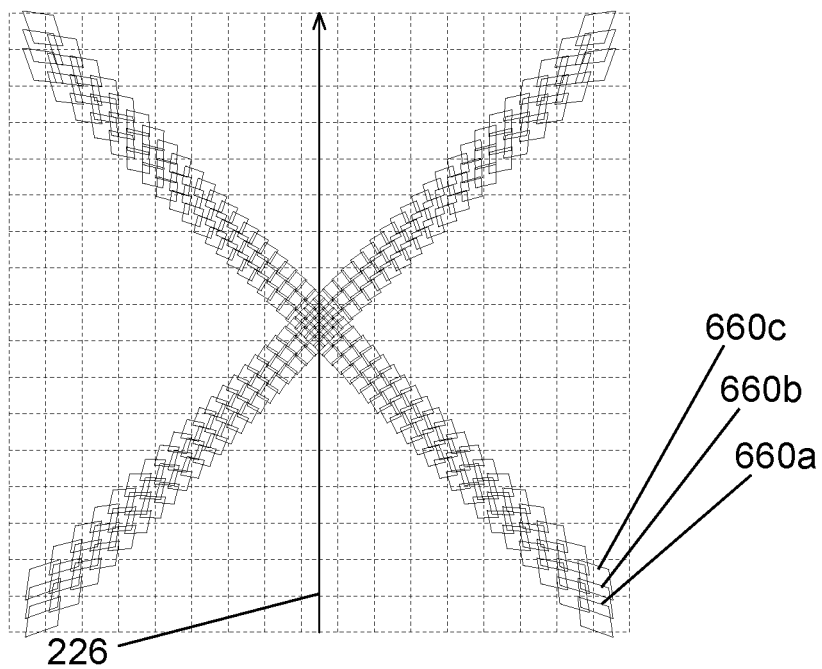
FIG. 75B shows a plan view of three successive shots of the X-configuration WS-600 camera unit using the alternative steerable camera module and operating at 28,000 feet.

FIG. 75A shows a plan view of the complete field of view 660 of an alternative X-configuration WS-600 camera unit 100 utilising the spinning design and operating at 28,000 feet. The complete field of view 660 is equivalent to the field of view 660 of FIG. 55B. While the spinning multiplexing mirror 604 induces rotation in individual camera fields, as shown in FIG. 75A, successive shots provide complete coverage, as shown in FIG. 75B.

Figure 76A:
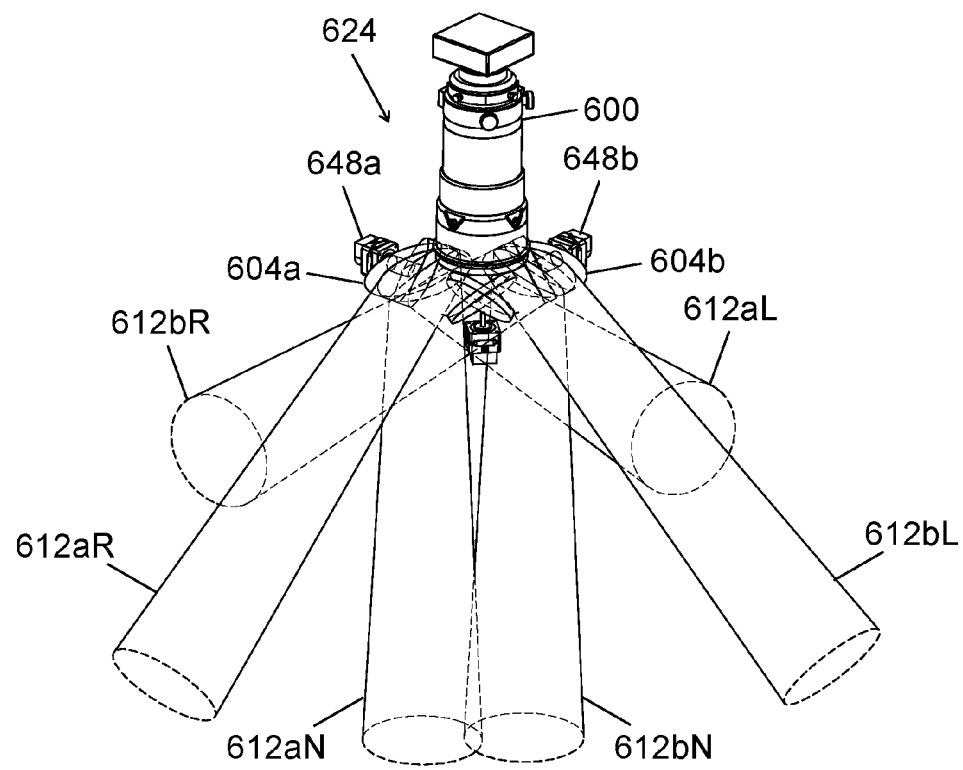
FIG. 76A shows a double-field steerable camera module.

FIG. 76A shows a double-field steerable camera module 624 comprising two full-field steerable camera modules 610 utilising the spinning design, but sharing a single camera 600 via a switching mirror 656. The mirror 656 also provides the functions of the motion-compensation mirror 608 or fixed mirror 606. The field of view 612 associated with each steering axis is shown at nadir and its two oblique extremes (N=nadir, R=right, L=left).

Figure 76B:
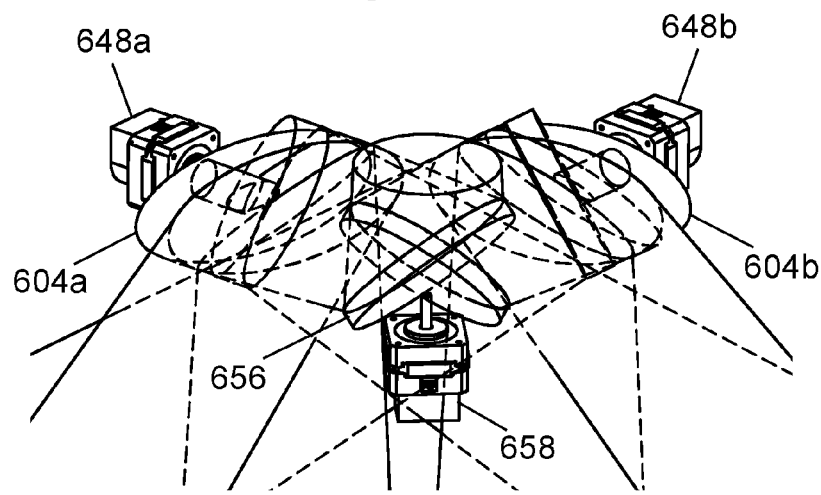
FIG. 76B shows detail of the mirror arrangement from FIG. 76A.

As shown in more detail in FIG. 76B, when the switching mirror 656 is facing in a first direction it directs the field of view of the camera 600 to a first multiplexing mirror 604a, and when it is facing in a second direction it directs the field of view of the camera 600 to a second multiplexing mirror 604b mounted at right angles to the first. The switching mirror 656 is coupled to and rotated by a rotating motor 658. The motor 658 may be any suitable rotating motor (such as a stepper motor, DC motor or brushless motor). Alternatively the mirror 656 may be coupled to a linear actuator or motor via a gear.

Figure 77:
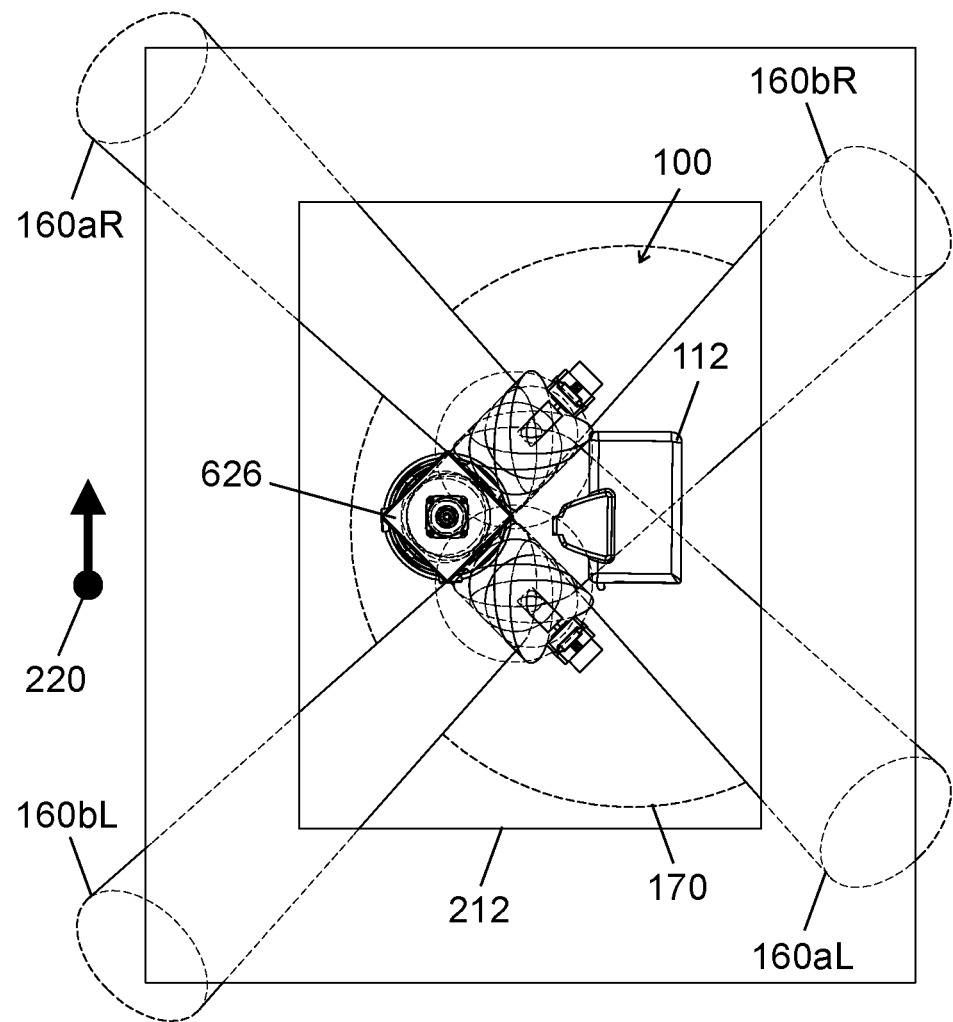
FIG. 77 shows a plan view of the WS-300 HyperCamera unit of FIG. 76A comprising a double-field steerable detail camera module and one fixed overview camera.

FIG. 77 shows a plan view of a WS-300 HyperCamera unit 100 comprising a double-field steerable detail camera module 626 utilising the spinning design, and one fixed overview camera 112. This camera unit 100 supports the same complete detail field of view 660 as the camera unit 100 of FIG. 54, but using one detail camera instead of four. The single detail camera operates at a frame rate quadruple that of each of the four detail cameras. The field of view 160 associated with each steering axis is shown at its two oblique extremes (R=right, L=left).

Figure 78A:
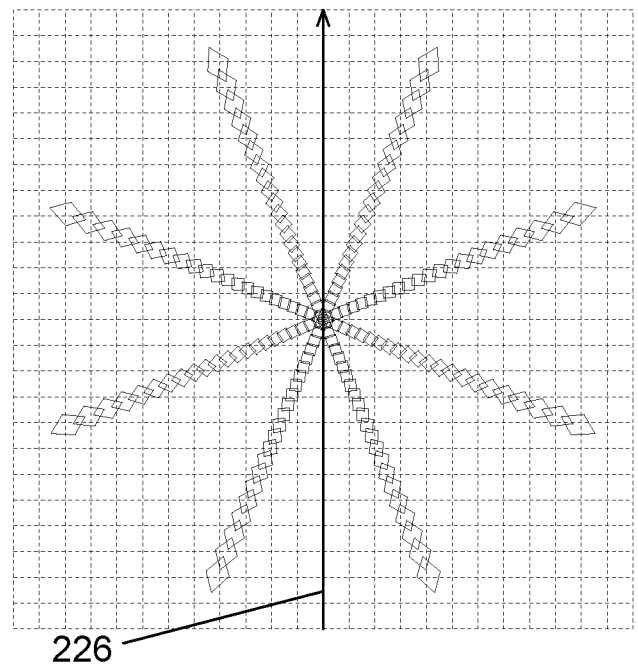
FIG. 78A shows a plan view of the fields of view of a four-field WS-600 camera unit using the alternative steerable camera module and operating at 28,000 feet.
Figure 78B:
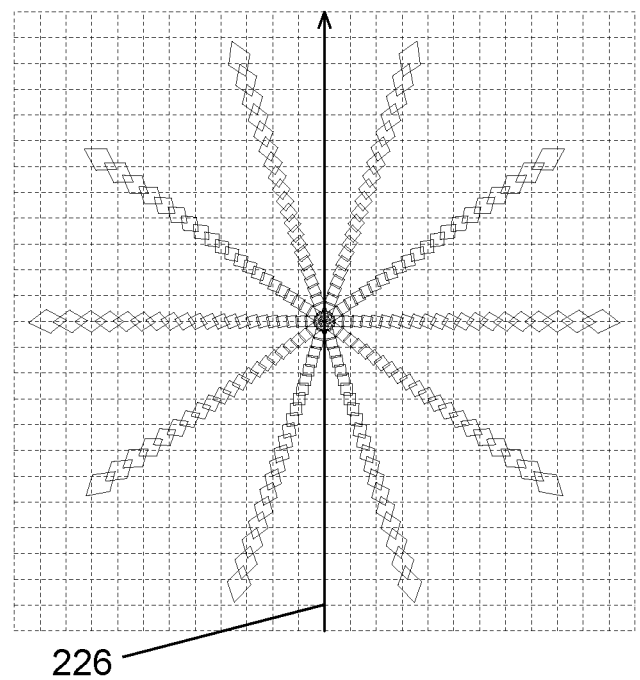
FIG. 78B shows a plan view of the fields of view of a five-field WS-600 camera unit using the alternative steerable camera module and operating at 28,000 feet.

FIG. 78A shows a plan view of the fields of view of a four-field WS-600 camera unit 100 using the spinning design, while FIG. 78B shows a plan view of the fields of view of a five-field WS-600 camera unit 100 using the spinning design, both operating at 28,000 feet.

These fields can be captured using a camera unit 100 comprising a suitable number of full-field detail camera modules 616 utilising the spinning design, or double-field detail camera modules 626 utilising the spinning design. As before, these fields of view can also be captured using multiple camera units 100 utilising the spinning design, with each camera unit 100 deployed over a separate camera hole.

For example, four-field capture can be performed using two X-configuration camera units 100 rotated 45 degrees relative to each other.

These fields can also be captured utilising a single steerable detail camera module 616 utilising the spinning design, by rotating the mirrors 604 and 608 (or 606) (and their motors) in the horizontal plane about the vertical axis of the detail camera 110. The camera 110 is ideally (but not crucially) kept fixed. The mirrors can be rotated successively to each of a set of discrete angular positions, followed by the capture of a full field at each such position. Photos can be captured with arbitrary density purely as a function of the number of discrete angular positions, subject to the maximum frame rate of the camera and the maximum spin rate of the multiplexing mirror 604. Alternatively, the mirrors can be rotated about the camera axis continuously to capture photos in a spiral pattern, with suitable motion compensation.

Figure 79:
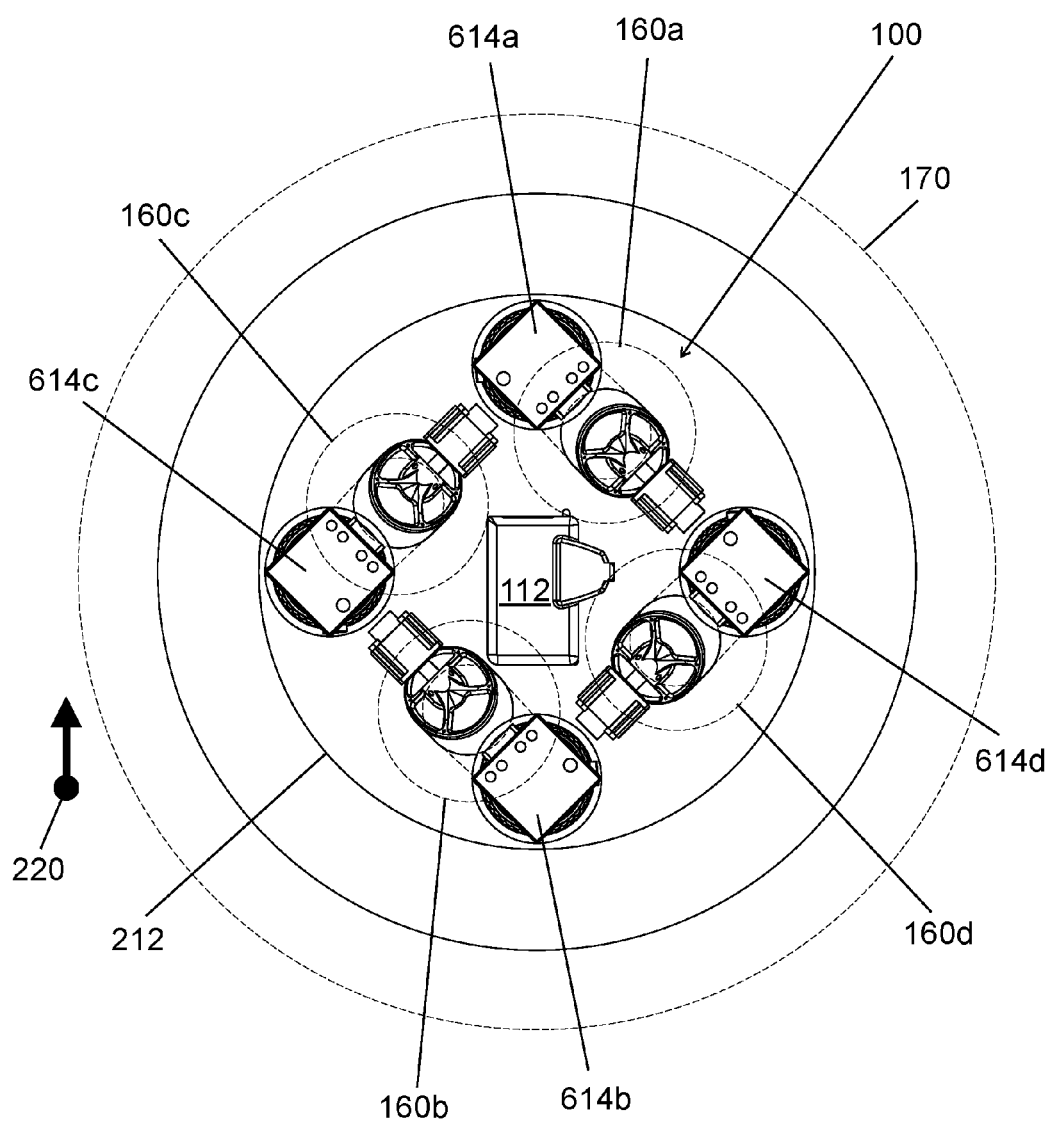
FIG. 79 shows a plan view of a WS-300 HyperCamera unit comprising four half-field spinning-mirror steerable detail camera modules, arranged in an X configuration, and one fixed overview camera.

FIG. 79 shows a plan view of a WS-300 HyperCamera unit 100 comprising four half-field steerable detail camera modules 614 utilising the spinning multiplexing mirror design of FIG. 72A, and one fixed overview camera 112. This camera unit 100 supports the same complete detail field of view 660 as the camera unit 100 of FIG. 54.

Figure 80:
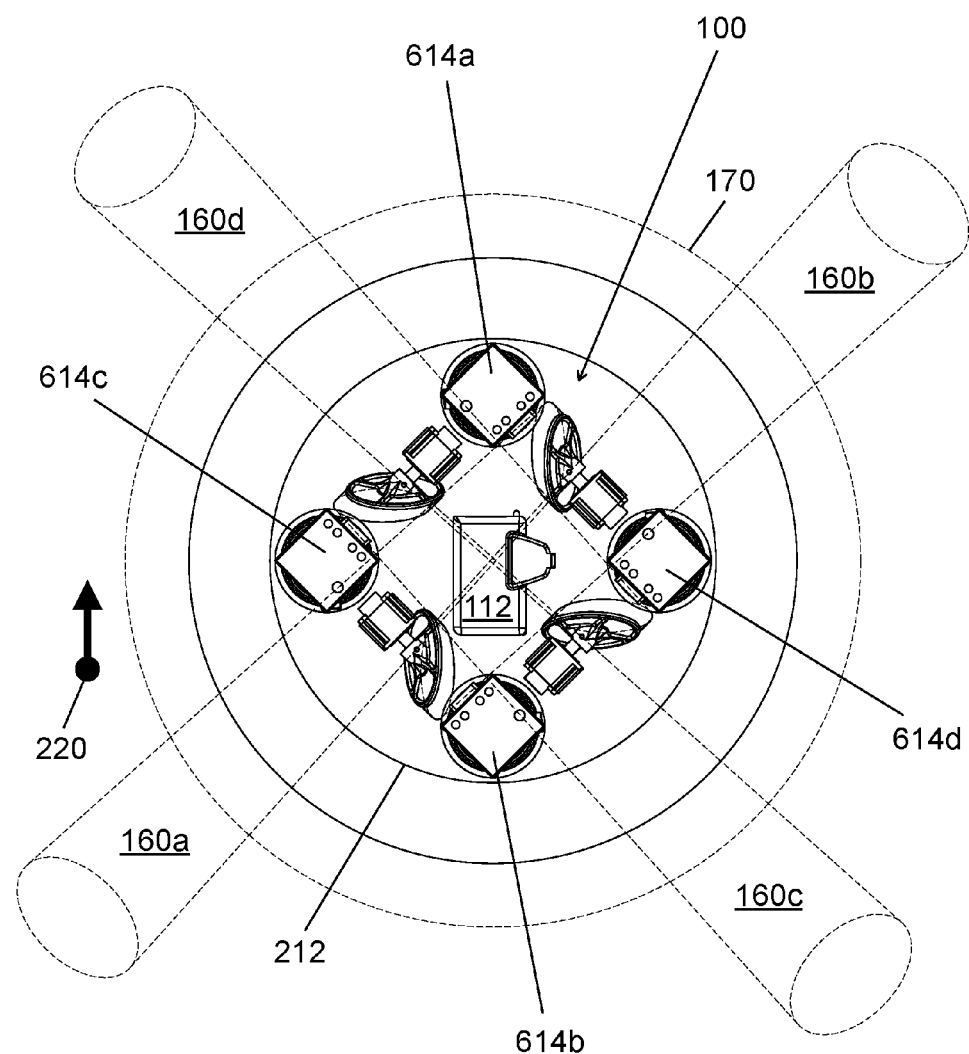
FIG. 80 shows a plan view of the WS-300 HyperCamera unit of FIG. 79, with the detail fields of view shown at an extreme angle.

FIG. 79 shows the detail fields of view 160 pointing vertically, while FIG. 80 shows the detail fields of view 160 at their oblique extremes.

Figure 81:
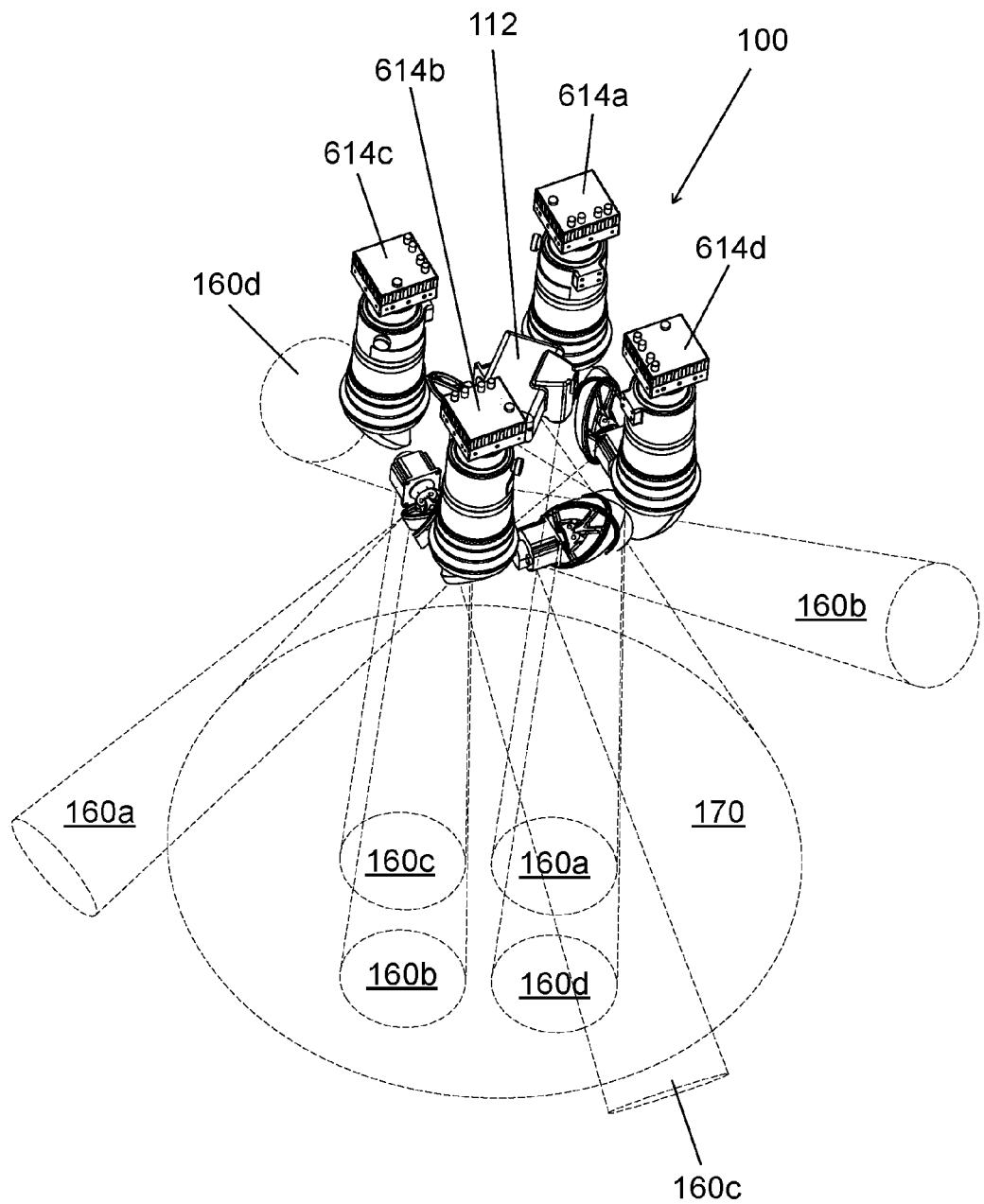
FIG. 81 shows a perspective view of the WS-300 HyperCamera unit of FIG. 79, with the detail fields of view shown at both a vertical angle and at an extreme angle.

FIG. 81 shows a perspective view of the WS-300 HyperCamera unit 100 comprising four half-field steerable detail camera modules 614, and illustrates the detail fields of views 160 pointing vertically as well as at their oblique extremes.

The present invention has been described with reference to a number of preferred embodiments. It will be appreciated by someone of ordinary skill in the art that a number of alternative embodiments of the present invention exist, and that the scope of the invention is only limited by the attached claims.

The invention claimed is:

1. A system for capturing aerial images, the system comprising:
 four steerable detail camera modules, each steerable detail camera module comprising:
  a detail camera, and
  a beam-steering mechanism in an optical path of a corresponding steerable detail camera module whereby the pointing direction of the detail camera is time-multiplexed to sweep out a wider effective field of view along a steering axis, the beam-steering mechanism comprising a first steerable mirror,
 wherein the steering axes of the four steerable detail camera modules are angularly distributed substantially 90 degrees apart, at least one of the steering axes being angled at substantially 45 degrees to a direction of flight.

2. The system of claim 1, wherein the first steerable mirror is adapted to tilt with respect to an optical axis of the corresponding steerable detail camera module to effect beam steering.

3. The system of claim 1, wherein the first steerable mirror is tilted with respect to an optical axis of the corresponding steerable detail camera module, the first steerable mirror being adapted to spin about the optical axis to effect beam steering.

4. The system of claim 1, wherein the steering axes of at least two of the steerable detail camera modules are substantially parallel.

5. The system of claim 1, wherein the wider effective field of view provided by each steerable detail camera module is asymmetric about a vertical pointing direction.

6. The system of claim 1, wherein the wider effective fields of view provided by at least two of the steerable detail camera modules together form a still wider effective field of view that is symmetric about a vertical pointing direction.

7. The system of claim 1, wherein the system is attachable, above a camera hole, to at least one of: a floor of an aircraft and a floor of a pod carried by an aircraft, thereby providing the at least one detail camera with a view of the ground below the aircraft through the camera hole.

8. The system of claim 1, the system comprising at least one overview camera, a focal length of the overview camera being shorter than a focal length of detail cameras of the four steerable detail camera modules.

9. The system of claim 1, wherein each detail camera has a lens selected from the group comprising: a dioptric lens, a catoptric lens, and a catadioptric lens.

10. The system of claim 1, wherein, in each steerable detail camera module, the first steerable mirror is stationary during an exposure period of the detail camera.

11. The system of claim 1, wherein, in each steerable detail camera module, the first steerable mirror has a non-zero angular velocity during an exposure period of the detail camera, and the corresponding steerable detail camera module comprises a second steerable mirror in the optical path configured to correct the effect, on the detail camera, of the angular velocity of the first steerable mirror during the exposure period, thereby to ensure the detail camera points in a consistent direction during the exposure period.

12. The system of claim 11, wherein, in each steerable detail camera module, the angular velocity of the second steerable mirror varies with time sinusoidally, and the average angular velocity of the second steerable mirror is equal to the average angular velocity of the first steerable mirror during the exposure period.

13. The system of claim 11, wherein, in each steerable detail camera module, the angular velocity of the second steerable mirror is constant during the exposure period.

14. The system of claim 1 further comprising:
at least one angular motion compensation (AMC) unit, at most one AMC unit for each steerable detail camera module, the at least one AMC unit configured to correct the effect, on the detail camera of the corresponding steerable detail camera module, of angular motion of the aircraft, thereby to ensure the detail camera points in a consistent direction over time.

15. The system of claim 14, wherein AMC is provided via a steerable mirror in the optical path of the corresponding steerable detail camera module.

16. The system of claim 1 further comprising:
at least one forward motion compensation (FMC) mechanism, at most one FMC mechanism for each steerable detail camera module, the at least one FMC mechanism configured to correct the effect, on the detail camera of the corresponding steerable detail camera module, of forward motion of the aircraft, thereby to reduce motion blur in photos captured by the detail camera.

17. The system of claim 16, wherein FMC is provided via a steerable mirror in the optical path of the corresponding steerable detail camera module.

18. The system of claim 16, wherein FMC is provided via time delayed integration of adjacent lines of pixels in an image sensor of the detail camera of the corresponding steerable detail camera module.

19. The system of claim 16, wherein FMC is provided by moving an image sensor of the detail camera of the corresponding steerable detail camera module.

* * * * *